(12) United States Patent
Hoofard et al.

(10) Patent No.: US 12,234,111 B2
(45) Date of Patent: Feb. 25, 2025

(54) SYSTEMS AND METHODS FOR AUTOMATED LOADING AND UNLOADING AT A DOCK STATION

(71) Applicant: ASSA ABLOY Entrance Systems AB, Landskrona (SE)

(72) Inventors: Richard K. Hoofard, Dallas, TX (US); Daryl Day, Frisco, TX (US); L. Blake Whitley, Arlington, TX (US)

(73) Assignee: ASSA ABLOY Entrance Systems AB, Landskrona (SE)

( * ) Notice: Subject to any disclaimer, the term of this patent is extended or adjusted under 35 U.S.C. 154(b) by 583 days.

(21) Appl. No.: 17/475,039

(22) Filed: Sep. 14, 2021

(65) Prior Publication Data

US 2022/0144564 A1    May 12, 2022

Related U.S. Application Data

(63) Continuation of application No. 16/259,713, filed on Jan. 28, 2019, now Pat. No. 11,142,413.

(51) Int. Cl.
*B65G 67/04* (2006.01)
*B65G 67/24* (2006.01)
(Continued)

(52) U.S. Cl.
CPC ............ *B65G 67/04* (2013.01); *B65G 67/24* (2013.01); *B65G 69/24* (2013.01); *G05D 1/0225* (2013.01); *G05D 1/0229* (2013.01)

(58) Field of Classification Search
CPC ......... B65G 67/04; B65G 67/24; B65G 69/24
See application file for complete search history.

(56) References Cited

U.S. PATENT DOCUMENTS

| 1,775,909 A | 9/1930 | Mikkelsen |
| 2,362,981 A | 11/1944 | Philemon |

(Continued)

FOREIGN PATENT DOCUMENTS

| CN | 101716959 A | 6/2010 |
| DE | 102004037933 B3 | 2/2006 |

(Continued)

OTHER PUBLICATIONS

Dock Lighting Goes Green with the FT Ultra LED Docklight:, APS Resource, News Release. 1 page.

(Continued)

*Primary Examiner* — Saul Rodriguez
*Assistant Examiner* — Willie W Berry, Jr.
(74) *Attorney, Agent, or Firm* — Perkins Coie LLP

(57) ABSTRACT

An autonomous dock station system having an automated material lift truck (AMT), a pallet conveyor, and a facility guidance system can automatically load and/or unload a trailer at a dock station. The autonomous dock station system can coordinate these components according to a workflow procedure. In some embodiments, the workflow procedure can begin with the pallet conveyor supplying a loaded pallet to a specified position. The AMT, initially guided by fixed guidance elements of the facility guidance system, can lift the pallet off the conveyor and transport it to a trailer entrance where the AMT switches from the facility guidance system to a trailer guidance system. The AMT can then carry the pallet to an unloading position, move the pallet to one side of the trailer as needed, unload the pallet and return to the pallet conveyor. The workflow procedure can repeat until the trailer is full.

20 Claims, 41 Drawing Sheets

(51) Int. Cl.
  B65G 69/24 (2006.01)
  G05D 1/00 (2006.01)

(56) References Cited

U.S. PATENT DOCUMENTS

| | | |
|---|---|---|
| 3,635,277 A | 1/1972 | Bahnsen |
| 3,894,571 A | 7/1975 | Hinchliff |
| 4,009,051 A | 2/1977 | Kazis et al. |
| 4,010,571 A | 3/1977 | McGuire et al. |
| 4,286,911 A | 9/1981 | Benjamin |
| 4,476,853 A | 10/1984 | Arbogast |
| 4,590,118 A | 5/1986 | Yatabe et al. |
| 4,625,456 A | 12/1986 | Lafontaine |
| 4,626,983 A | 12/1986 | Harada et al. |
| 4,661,758 A | 4/1987 | Whittaker |
| 4,744,121 A | 5/1988 | Swessel et al. |
| 4,843,373 A | 6/1989 | Trickle et al. |
| 4,936,731 A | 6/1990 | Noble |
| 4,988,254 A | 1/1991 | Alexander |
| 5,026,242 A | 6/1991 | Alexander |
| 5,047,748 A | 9/1991 | Trickle |
| 5,056,847 A | 10/1991 | Stillwell et al. |
| 5,168,262 A | 12/1992 | Okayama |
| 5,168,267 A | 12/1992 | Trickle |
| 5,181,401 A | 1/1993 | Hodan |
| 5,196,965 A | 3/1993 | Lang et al. |
| 5,277,240 A | 1/1994 | Epema et al. |
| 5,323,098 A | 6/1994 | Hamaguchi et al. |
| 5,403,142 A | 4/1995 | Stewart |
| 5,576,533 A | 11/1996 | Tantraporn |
| 5,775,107 A | 7/1998 | Sparkman |
| 5,831,540 A | 11/1998 | Sullivan et al. |
| 5,886,863 A | 3/1999 | Nagasaki et al. |
| 5,886,883 A | 3/1999 | Rail |
| 5,898,585 A | 4/1999 | Sirichote et al. |
| 5,915,446 A | 6/1999 | De |
| 6,082,952 A | 7/2000 | Alexander |
| 6,179,036 B1 | 1/2001 | Harvey |
| 6,276,744 B1 | 8/2001 | Huber et al. |
| 6,367,259 B1 | 4/2002 | Timm |
| 6,369,462 B1 | 4/2002 | Siri |
| 6,390,245 B1 | 5/2002 | Metz |
| 6,476,572 B2 * | 11/2002 | Lounsbury ............ H02J 7/0013 14/71.3 |
| 6,523,823 B1 | 2/2003 | Bakoledis |
| 6,543,375 B1 | 4/2003 | Sargent et al. |
| 6,663,527 B2 | 12/2003 | Phelan et al. |
| 6,781,516 B2 | 8/2004 | Reynard et al. |
| 6,787,259 B2 | 9/2004 | Colborn et al. |
| 6,810,817 B1 | 11/2004 | James |
| 6,812,849 B1 | 11/2004 | Ancel |
| 6,917,298 B2 | 7/2005 | Romano et al. |
| 6,972,226 B2 | 12/2005 | Deppe et al. |
| 6,975,226 B2 | 12/2005 | Reynard et al. |
| 7,032,720 B2 | 4/2006 | Jette et al. |
| 7,045,764 B2 | 5/2006 | Beggs et al. |
| 7,119,673 B2 | 10/2006 | Eager et al. |
| 7,162,762 B1 | 1/2007 | Gleason |
| 7,165,486 B2 | 1/2007 | Alexander et al. |
| 7,230,819 B2 | 6/2007 | Muchow et al. |
| 7,256,703 B2 | 8/2007 | Duvernell et al. |
| 7,264,092 B2 | 9/2007 | Jette |
| 7,274,300 B2 | 9/2007 | Duvernell et al. |
| 7,333,016 B2 | 2/2008 | Ancel |
| 7,380,375 B2 | 6/2008 | Maly |
| 7,730,981 B2 | 6/2010 | Mccabe et al. |
| 7,750,890 B2 | 7/2010 | Fitzgibbon et al. |
| 7,864,030 B2 | 1/2011 | Jette |
| 7,956,718 B2 | 6/2011 | Murphy et al. |
| 8,065,770 B2 | 11/2011 | Proffitt et al. |
| 8,112,949 B2 | 2/2012 | Eungard |
| 8,181,401 B2 | 5/2012 | Eungard |
| 8,286,757 B2 | 10/2012 | Nelson |
| 8,307,589 B2 | 11/2012 | Eungard |
| 8,307,956 B2 | 11/2012 | Andersen et al. |
| 8,345,010 B2 | 1/2013 | Fitzgibbon et al. |
| 8,364,334 B2 | 1/2013 | Au et al. |
| 8,407,842 B2 | 4/2013 | Story et al. |
| 8,410,895 B2 | 4/2013 | Murphy et al. |
| 8,421,611 B1 | 4/2013 | Coshow et al. |
| 8,490,669 B2 | 7/2013 | Fletcher et al. |
| 8,497,761 B2 | 7/2013 | Mcneill et al. |
| 8,510,888 B2 | 8/2013 | Eungard |
| 8,547,234 B2 | 10/2013 | Maly et al. |
| 8,590,087 B2 | 11/2013 | Swessel et al. |
| 8,590,674 B2 | 11/2013 | Jette |
| 8,775,710 B1 | 7/2014 | Miller et al. |
| 8,893,764 B2 | 11/2014 | Mascari et al. |
| 8,959,838 B1 | 2/2015 | Marinelli |
| 8,976,006 B2 | 3/2015 | Krupke et al. |
| 8,978,562 B2 | 3/2015 | Nagamine et al. |
| 9,211,889 B1 | 12/2015 | Hoetzer et al. |
| 9,230,419 B2 | 1/2016 | Beggs et al. |
| 9,274,522 B2 | 3/2016 | Boos et al. |
| 9,283,935 B2 | 3/2016 | Fujioka |
| 9,517,902 B2 | 12/2016 | Harrington |
| 9,564,072 B2 | 2/2017 | Senfleben et al. |
| 9,623,859 B2 | 4/2017 | Lavoie et al. |
| 9,633,537 B2 | 4/2017 | Beggs et al. |
| 9,656,691 B2 | 5/2017 | Heimberger et al. |
| 9,771,225 B2 | 9/2017 | Stone et al. |
| 9,776,511 B2 | 10/2017 | Brooks et al. |
| 9,777,529 B2 | 10/2017 | Mcneill et al. |
| 9,926,148 B2 | 3/2018 | Hochstein et al. |
| 9,957,121 B2 | 5/2018 | Sveum et al. |
| 10,032,380 B2 | 7/2018 | Mushynski et al. |
| 10,053,904 B2 | 8/2018 | Mcneill et al. |
| 10,081,504 B2 | 9/2018 | Walford et al. |
| 10,096,187 B2 | 10/2018 | Deneen et al. |
| 10,106,342 B2 | 10/2018 | Avalos |
| 10,113,352 B2 | 10/2018 | McNeill et al. |
| 10,227,190 B2 | 3/2019 | Brooks et al. |
| 10,444,965 B2 | 10/2019 | Daley et al. |
| 10,494,205 B1 | 12/2019 | Hoofard et al. |
| 10,878,386 B2 | 12/2020 | Hoofard et al. |
| 10,947,069 B2 | 3/2021 | Brooks et al. |
| 11,124,372 B2 | 9/2021 | Hoofard et al. |
| 11,142,413 B2 | 10/2021 | Hoofard et al. |
| 11,225,824 B2 | 1/2022 | Hoofard et al. |
| 11,256,264 B2 | 2/2022 | Hoofard et al. |
| 11,262,747 B2 | 3/2022 | Hoofard et al. |
| 11,305,953 B2 | 4/2022 | Hoofard et al. |
| 11,507,926 B2 | 11/2022 | Hoofard et al. |
| 11,668,131 B2 | 6/2023 | McNeill et al. |
| 2002/0089427 A1 | 7/2002 | Aratani et al. |
| 2003/0167238 A1 | 9/2003 | Zeif et al. |
| 2004/0146384 A1 | 7/2004 | Whelan |
| 2004/0182619 A1 | 9/2004 | Mcgregor et al. |
| 2005/0050438 A1 | 3/2005 | Cheung et al. |
| 2005/0102041 A1 | 5/2005 | Duvernell et al. |
| 2005/0102042 A1 | 5/2005 | Reynard et al. |
| 2005/0126081 A1 | 6/2005 | Patel et al. |
| 2005/0262549 A1 | 11/2005 | Ritt et al. |
| 2006/0119132 A1 | 6/2006 | Rivers et al. |
| 2006/0137261 A1 | 6/2006 | Maly |
| 2006/0145853 A1 | 7/2006 | Richards et al. |
| 2006/0158752 A1 | 7/2006 | Perkes |
| 2006/0181391 A1 | 8/2006 | Mcneill et al. |
| 2006/0235737 A1 | 10/2006 | Fleurant et al. |
| 2006/0289128 A1 | 12/2006 | Ressel et al. |
| 2007/0062422 A1 | 3/2007 | Wotring |
| 2007/0157614 A1 | 7/2007 | Goldman |
| 2007/0258798 A1 | 11/2007 | Foster et al. |
| 2007/0283806 A1 | 12/2007 | Morrison |
| 2008/0011799 A1 | 1/2008 | Chang |
| 2008/0022596 A1 | 1/2008 | Boerger et al. |
| 2008/0124203 A1 | 5/2008 | McDonald |
| 2008/0127435 A1 | 6/2008 | Maly et al. |
| 2008/0143290 A1 | 6/2008 | Chavakula |
| 2009/0013497 A1 | 1/2009 | Squyres et al. |
| 2009/0093688 A1 | 4/2009 | Mathur |
| 2010/0073197 A1 | 3/2010 | Eagleton et al. |
| 2010/0146719 A1 | 6/2010 | Swessel et al. |
| 2010/0289623 A1 | 11/2010 | Roesner |

(56) References Cited

U.S. PATENT DOCUMENTS

| | | |
|---|---|---|
| 2011/0075441 A1 | 3/2011 | Swessel et al. |
| 2011/0203059 A1 | 8/2011 | Whitley et al. |
| 2011/0301800 A1 | 12/2011 | Furuno et al. |
| 2011/0313893 A1 | 12/2011 | Weik |
| 2012/0025964 A1 | 2/2012 | Beggs et al. |
| 2012/0125545 A1 | 5/2012 | Ehrlich |
| 2012/0304558 A1 | 12/2012 | Iglesias et al. |
| 2013/0024334 A1 | 1/2013 | Kozlay |
| 2013/0038731 A1 | 2/2013 | Brey et al. |
| 2013/0117078 A1 | 5/2013 | Weik et al. |
| 2013/0134938 A1 | 5/2013 | Bianco |
| 2013/0188050 A1 | 7/2013 | Winget |
| 2013/0261958 A1 | 10/2013 | Herron |
| 2013/0312205 A1 | 11/2013 | Riviere et al. |
| 2013/0327914 A1 | 12/2013 | Mcneill et al. |
| 2013/0332217 A1 | 12/2013 | Mcneill et al. |
| 2014/0070767 A1* | 3/2014 | Morris .......... B60L 53/18 320/109 |
| 2014/0075842 A1 | 3/2014 | Mcneill et al. |
| 2014/0137447 A1 | 5/2014 | Mama |
| 2014/0222971 A1 | 8/2014 | Cooper et al. |
| 2014/0225509 A1 | 8/2014 | Wiegel et al. |
| 2014/0247347 A1 | 9/2014 | Mcneill et al. |
| 2015/0009046 A1 | 1/2015 | Senfleben et al. |
| 2015/0013083 A1 | 1/2015 | Palmersheim |
| 2015/0039552 A1 | 2/2015 | Moyne |
| 2015/0047132 A1 | 2/2015 | Sveum et al. |
| 2015/0047133 A1 | 2/2015 | Sveum |
| 2015/0294166 A1 | 10/2015 | Kuehnle et al. |
| 2016/0075526 A1 | 3/2016 | Avalos |
| 2016/0090072 A1 | 3/2016 | Eppley et al. |
| 2016/0104364 A1 | 4/2016 | Brooks et al. |
| 2016/0131482 A1 | 5/2016 | Lavoie |
| 2016/0178382 A1 | 6/2016 | Penna et al. |
| 2016/0288833 A1 | 10/2016 | Heimberger et al. |
| 2016/0362135 A1 | 12/2016 | Xu et al. |
| 2016/0368489 A1 | 12/2016 | Aich et al. |
| 2016/0369619 A1 | 12/2016 | Parmeshwar et al. |
| 2017/0017392 A1 | 1/2017 | Castaneda et al. |
| 2017/0043967 A1 | 2/2017 | Walford et al. |
| 2017/0044817 A1 | 2/2017 | Mcneill et al. |
| 2017/0073005 A1 | 3/2017 | Jawad et al. |
| 2017/0106794 A1 | 4/2017 | Constantine |
| 2017/0168501 A1 | 6/2017 | Aoki et al. |
| 2017/0174209 A1 | 6/2017 | Lavoie |
| 2017/0205824 A1 | 7/2017 | Nordbruch et al. |
| 2017/0213404 A1 | 7/2017 | Sivalingam et al. |
| 2017/0320685 A1 | 11/2017 | Hoofard et al. |
| 2018/0035606 A1 | 2/2018 | Burdoucci |
| 2018/0278897 A1 | 9/2018 | Seaman et al. |
| 2018/0346029 A1 | 12/2018 | Kabos et al. |
| 2019/0002216 A1 | 1/2019 | Walford et al. |
| 2019/0039425 A1 | 2/2019 | Dodd et al. |
| 2019/0056736 A1 | 2/2019 | Wood et al. |
| 2019/0064835 A1 | 2/2019 | Hoofard et al. |
| 2019/0144218 A1 | 5/2019 | Hoofard et al. |
| 2019/0187716 A1 | 6/2019 | Cantrell et al. |
| 2019/0202646 A1 | 7/2019 | Brooks et al. |
| 2019/0301224 A1 | 10/2019 | Barton |
| 2019/0302764 A1 | 10/2019 | Smith et al. |
| 2019/0392402 A1 | 12/2019 | Vandergon et al. |
| 2020/0018110 A1 | 1/2020 | Lindley et al. |
| 2020/0125074 A1 | 4/2020 | Ramos et al. |
| 2020/0133259 A1 | 4/2020 | Van Wiemeersch et al. |
| 2020/0334631 A1 | 10/2020 | Conlon |
| 2020/0361326 A1 | 11/2020 | Krucinski et al. |
| 2022/0170311 A1 | 6/2022 | McNeill et al. |

FOREIGN PATENT DOCUMENTS

| | | |
|---|---|---|
| EP | 2215612 B1 | 8/2012 |
| EP | 2660170 A1 | 11/2013 |
| FR | 2797246 A1 | 2/2001 |
| FR | 2869470 A1 | 10/2005 |
| WO | 2005045169 A1 | 5/2005 |
| WO | 2006066013 A2 | 6/2006 |
| WO | 2006076538 A2 | 7/2006 |
| WO | 2008014026 A1 | 1/2008 |
| WO | 2008014206 A1 | 1/2008 |
| WO | 2008036087 A1 | 3/2008 |
| WO | 2009070509 A1 | 6/2009 |
| WO | 2010077977 A1 | 7/2010 |
| WO | 2011037839 A1 | 3/2011 |
| WO | 2015023666 A1 | 2/2015 |
| WO | 2015023669 A1 | 2/2015 |
| WO | 2015084167 A1 | 6/2015 |
| WO | 2015166339 A1 | 11/2015 |
| WO | 2016007321 | 1/2016 |
| WO | 2016209141 A1 | 12/2016 |
| WO | 2017100716 A1 | 6/2017 |
| WO | 2019173811 A2 | 9/2019 |
| WO | 2019209773 A1 | 10/2019 |

OTHER PUBLICATIONS

Pentalift introduces industry's first solar powered dock leveler! www.pentalift.com, Jun. 14, 2011, 1 page.

APS&GO—LED Communication System Specification Sheet, APS Resource, For APS1102, Nov. 2009, 2 pages.

Bin et al., Constrained Model Predictive Control for Backing-up Tractor-Trailer System, Proceeding of the 10th World Congress on Intelligent Control and Automation, Jul. 6-8, 2012, Beijing, China, pp. 2165-2170.

Desantis et al., Path-Tracking for Tractor-Trailers with Hitching of Both the On-Axle and the Off-Axle Kind, Proceedings of the 2002 IEEE International Symposium on Intelligent Control, 2002.

Energy Saving Products Brochure, APS Resource, Mar. 2009, 4 pages.

FT Ultra LED Flex Arm Docklight Specification Sheet, APS Resource, Form APS 1168, Nov. 2009, 2 pages.

Fuchs C et al: "3D pose estimation for articulated vehicles using Kalman-filter based tracking", Pattern Ricognition. Image Analysis, Allen Press, Lawrence, KS, US, vol. 26, No. 1, Jul. 23, 2016 (Jul. 23, 2016), pp. 109-113.

High Impact LED Dock Light Specification Sheet, APS Resource, Form APS1171, Nov. 2009, 2 pages.

Kelley Company; product brochure; 2008; 8 pages.

Kelley Company; Vehicle Restraints brochure; 2008; 8 pages.

Manual and Automatic Light Communication Systems, User's Manual, Serco, Oct. 2009, 28 pages.

McGovern et al., An Articulated Truck on a Spreadsheet, Level 3, Issue 1, Nov. 2003, 23 pages.

Model G307K2 Kadet 2 Operator Interface with 7" TFT Display, Red Lion Controls, Inc., Nov. 23, 2015, 4 pages.

Oreh et al., A New Method for Directional Control of a Tractor Semi-Trailer, Australian Journal of Basic and Applied Sciences, 6(12): 369-409, 2012.

Rite-Hite Corporation, Rite-Vu Light Communication Systems Brochure, 6 pages [Not dated].

Safety & Lighting Products Brochure, APS Resource, Sep. 2004, 2 pages.

Serco Vehicle Restraints brochure; 2008; 4 pages.

Serco; Loading Dock Solutions brochure; 2008; 8 pages.

Smart Power Systems International GmbH, Web pages for Hybrid DC/AC Power Supply, Jun. 1, 2004.

Tofael Ahamed: "Navigation of an Autonomous Tractor Using Multiple Sensors", Thesis, Feb. 22, 2008 (Feb. 22, 2008), XP055527539, retrieved from the Internet: URL: https://tsukuba.repo.nii.ac.jp, [retrieved on 2018-I1-27], Chapter 9.

\* cited by examiner

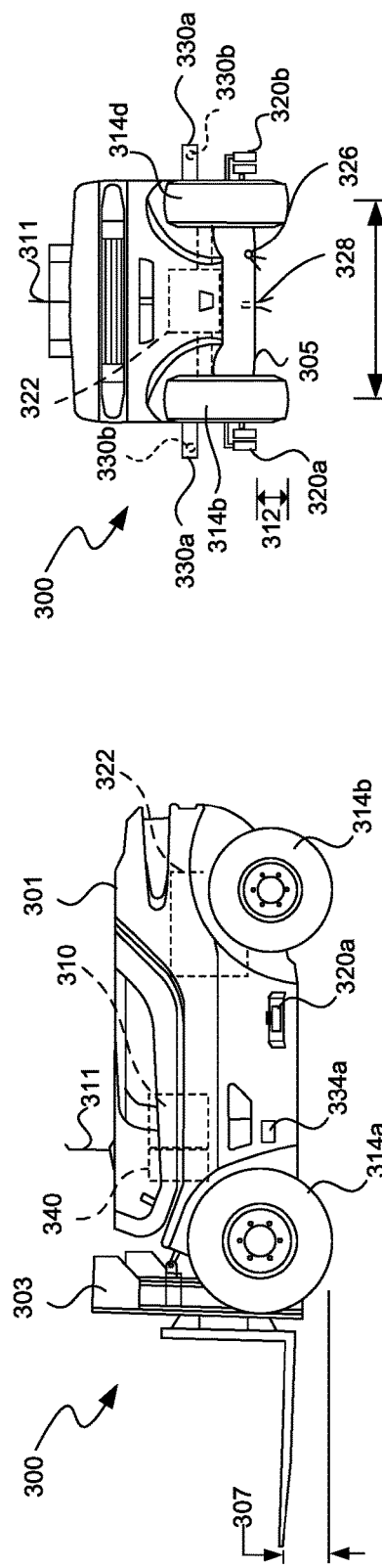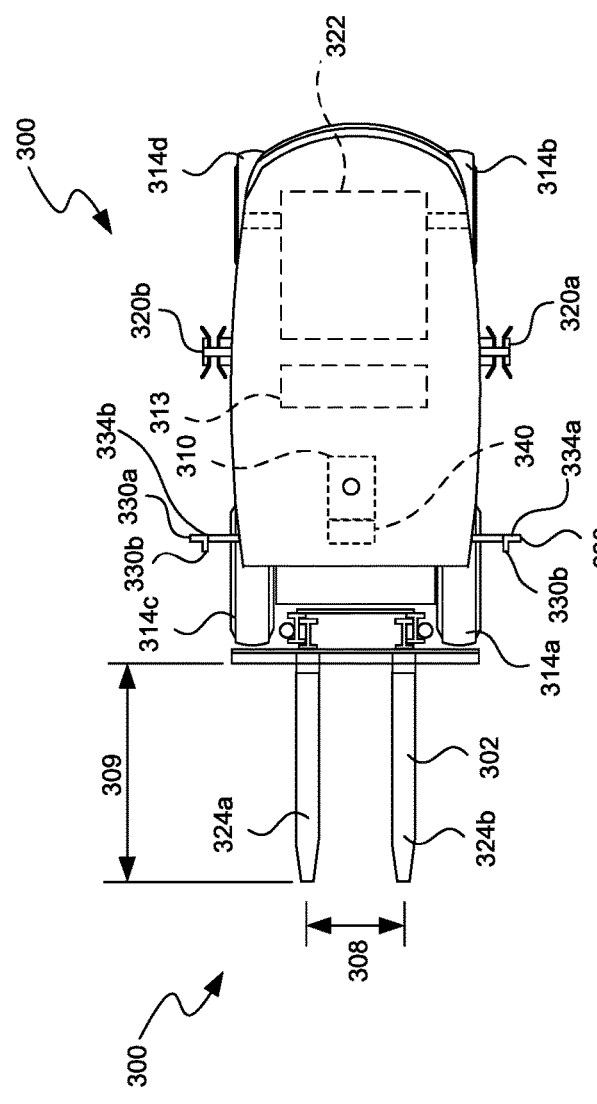

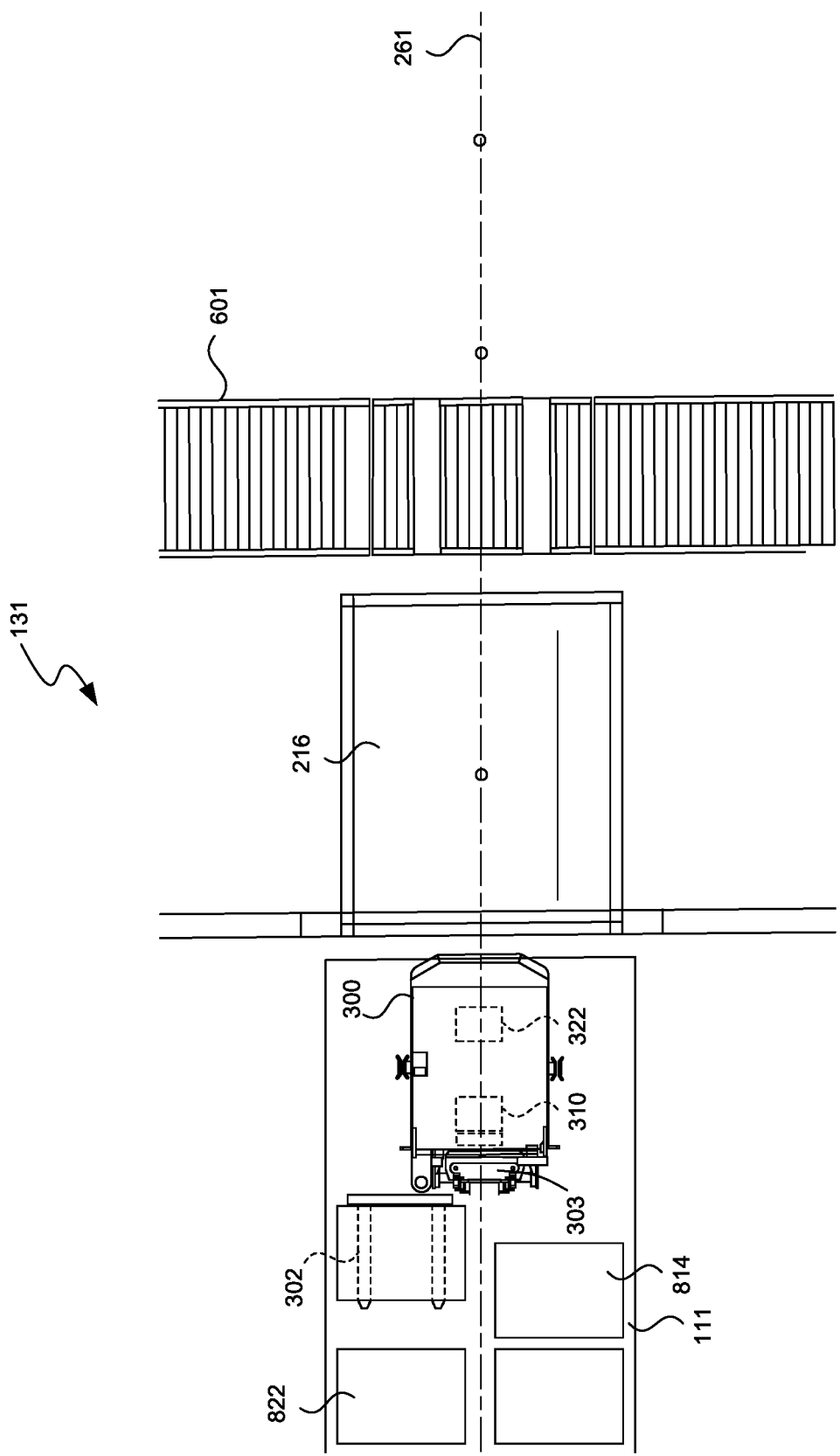

SYSTEMS AND METHODS FOR AUTOMATED LOADING AND UNLOADING AT A DOCK STATION

CROSS-REFERENCE TO RELATED APPLICATIONS

This application is a continuation of U.S. patent application Ser. No. 16/259,713, filed on Jan. 28, 2019, entitled SYSTEMS AND METHODS FOR AUTOMATED LOADING AND UNLOADING AT A DOCK STATION, which is hereby incorporated by reference in its entirety.

TECHNICAL FIELD

The present disclosure is directed to distribution centers and, more particularly, to systems and methods for automating the process of loading and/or unloading a trailer at a dock station.

BACKGROUND

Commercial enterprises often include distribution, processing, and/or manufacturing centers. Distribution centers are often used to receive, process, and re-ship goods, materials, and/or other items, and typically include at least one dock station configured for loading and/or unloading over the road (OTR) transport vehicles such as semi-trailers. A dock station typically includes various components to facilitate operations at the dock station. For example, a representative dock station might include a dock door, a dock leveler, a vehicle restraint, a truck presence sensor, a barrier gate, an inflatable shelter, a dock signal light, a control panel, a dock fan, and/or other dock station components. Examples of dock station equipment, distribution centers, and systems for controlling operations at such facilities are described in, for example, U.S. Pat. Nos. 4,843,373; 5,047,748; 5,168,267; 5,831,540; 6,781,516; 6,975,226; 7,119,673; 7,256,703; 7,274,300; and 8,497,761; in U.S. Patent Publication Nos. 2002/0089427; 2003/0167238; 2013/0332217; 2014/0075842; and 2015/145605; and in U.S. patent application Ser. Nos. 15/305,296; 15/145,605; and 16/109,603, each of which is incorporated herein by reference in its entirety.

The movement of materials and equipment in a distribution center is an important aspect of any supply and distribution chain. Materials and equipment are routinely moved many times in a facility throughout their life cycle. As such, many transport systems have been developed to help move items efficiently via various modes of transportation, including fork lifts, pallet jacks, conveyor systems, etc. One common item used in many modes of material transport is a pallet that is used to carry equipment and/or materials. The term "pallet" is used herein to refer to any of the various types of material-handling pallets or platforms well known in the art.

Loading and unloading packages, boxes, products, and/or other cargo from the interior of trucks, trailers, semi-trailers, flat beds, cargo carriers, and the like can be expensive, time-consuming, labor-intensive, and at times potentially dangerous. Forklift trucks have been used to load pallets of items to and from semi-trailers for many years, but there are a number of limitations on their use. For example, semi-trailers occasionally have been known to disengage from dock stations, and this can be especially dangerous for forklift truck operators. Notably, one potential concern is trailer creep (also called "trailer walk" or "dock walk"), which occurs when the lateral and vertical forces exerted each time a forklift truck enters and exits the trailer causes the trailer to slowly move away from the dock. In extreme cases, it is possible that the forklift can fall into the resulting gap between the trailer and the dock leveler if the operator is not paying attention.

Dock station procedures can vary widely based on the type of material packaging (i.e. palletizing), trailer positioning procedures, availability of material for loading, and many other factors. At even the most efficient facilities running 24 hours a day, the average number of trailers serviced at a single dock station in a 24-hour day may not exceed 20. This can result in an overall cycle rate of 72 minutes on average per trailer per loading or unloading cycle.

Previous attempts at providing robotic material handling systems used all-in-one solutions in which the robotic system was designed to perform many tasks such as maneuvering a complicated shop floor, accessing materials from a variety of positions and heights, and delivering those materials to various places in the distribution or manufacturing center, all while operating around other machinery and human operators. Such systems are generally very complex, however, making them very costly. For example, these systems typically require numerous sensors (e.g., cameras, LIDAR, RADAR, etc.), complicated algorithms and guidance systems, machine learning, etc. These complications have resulted in these systems being prone to error as the programming may not have sufficient information, may encounter a situation it has not been trained for, or interconnected systems may provide conflicting results, to name just a few of the reasons these systems may take unwanted actions. Due to such limitations, existing robotic systems may be unable to efficiently or safely handle cargo, causing items to shift or tip over. Consequently, human assistance is often needed to stack or unload the cargo resulting in delay as the robotic system is removed from the cargo space in order to allow the human operator access to the cargo.

In addition, current robotic systems and ancillary conveyor equipment are typically extremely heavy, and most of the weight must be supported by the floor of the trailer. Some trailers are unable to support such a heavy load, and even when a trailer can support the weight, the movement of the weight into the cargo space increases the risk of trailer creep. Furthermore, trailers can be prone to shaking or even tipping when the added weight from these robotic systems move into contact with the trailer.

BRIEF DESCRIPTION OF THE DRAWINGS

FIGS. 3A-3D are partially schematic side, rear, top and top views, respectively, of an automated material lift truck (AMT)

FIGS. 9A-9L are a series of partially schematic top views illustrating a process for operating an AMT to automatically load a trailer, in accordance with some embodiments of the present technology.

The systems and additional embodiments introduced here may be better understood by referring to the following Detailed Description in conjunction with the accompanying drawings, in which like reference numerals indicate identical or functionally similar elements.

DETAILED DESCRIPTION

Figure 1:
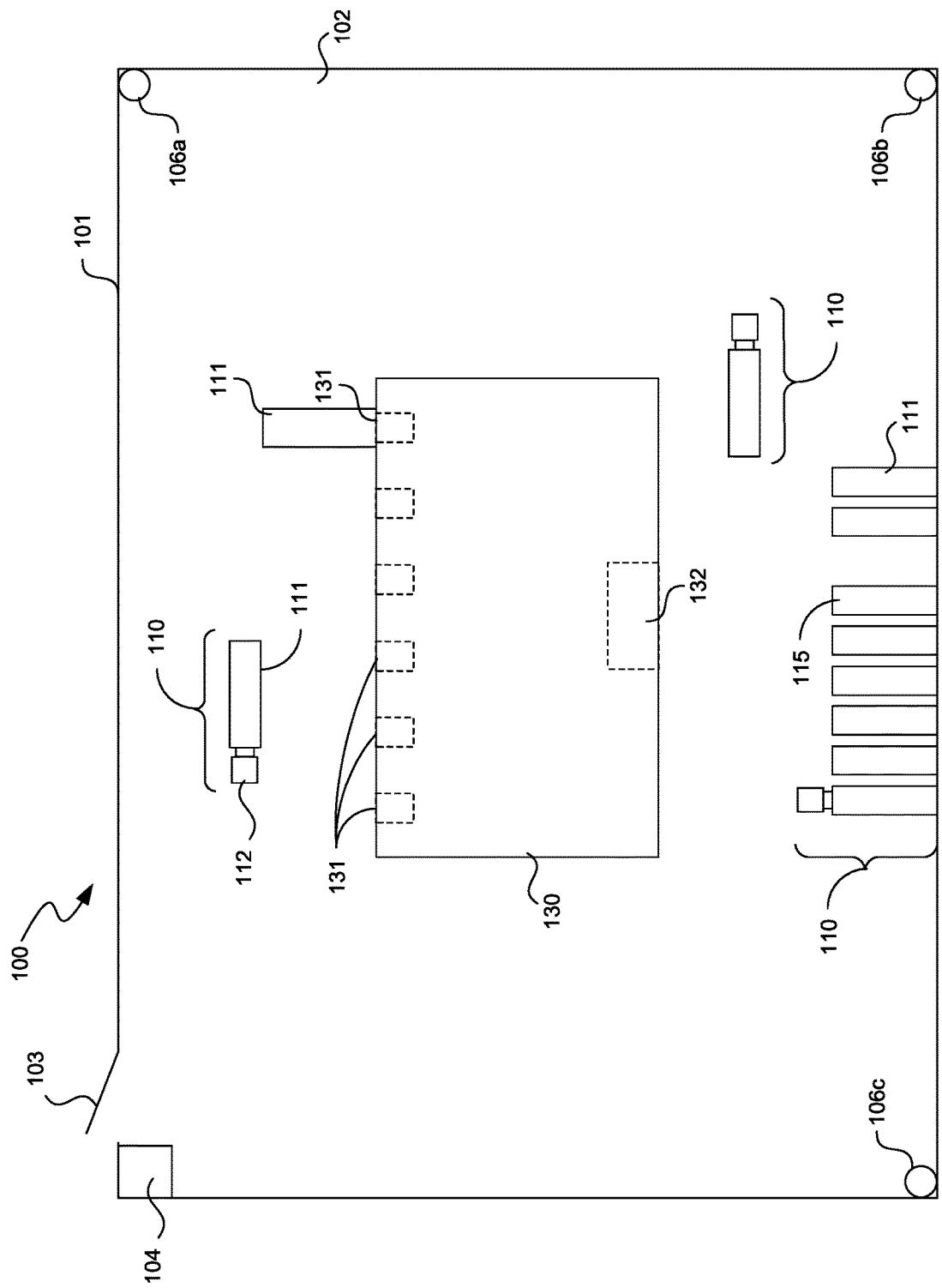
FIG. 1 is a partially schematic plan view of a distribution center configured in accordance with some embodiments of the present technology.

Embodiments of the present technology are directed to an autonomous dock station system for automatically loading and/or unloading OTR trailers and/or other vehicles ("trailers") at a dock station. The autonomous dock station system can utilize an automated material lift truck ("AMT") (which may also be referred to as an autonomous AMT) in conjunction with a pallet conveyor to autonomously load or unload a trailer by following a workflow procedure. In an example workflow procedure for loading a trailer, the autonomous dock station system can provide a loaded pallet to a specified position via the pallet conveyor. The AMT, initially guided by a facility guidance system (including, e.g., fixed guidance elements in the facility, such as a rail or RFID tags embedded in the floor), can engage the pallet and lift it off the pallet conveyor. The AMT can then transport the pallet to an entrance of the trailer where the AMT switches from the facility guidance system to a trailer guidance system that directs movement of the AMT based on AMT sensor signals. Using the trailer guidance system, the AMT can carry the pallet down the length of the trailer until the AMT reaches an unloading position. As the AMT approaches the unloading position, the AMT can detect whether there is already a pallet on one side of a dock station centerline. If not, the AMT can shift the pallet to that side of the dock station centerline; if so, the AMT can shift the pallet to the other side of the dock station centerline. Once the AMT reaches the unloading position, the AMT can lower the pallet into place and reverse direction to return to the pallet conveyor and retrieve another loaded pallet. This sequence can repeat until the trailer is full and/or all pallets designated for the trailer have been loaded.

Some embodiments of the present technology operate autonomously with automatic dock systems (such as conveyors, robotic material handling equipment, etc.); dock management systems (such as loading dock control panels, central processing centers, inventory of management systems, etc.); and the like. In some embodiments, an Enterprise Resource Planning (ERP) system, in conjunction with the automatic dock systems and/or other dock management systems, can coordinate delivery of loaded pallets to a dock station and/or retrieval of pallets from the dock station using the pallet conveyor. The dock management systems can control equipment at the dock station, such as by raising and lowering a dock door, engaging and storing a vehicle restraint, illuminating signal lights, etc. In some embodiments, one or more AMTs can be shared among multiple dock stations and the dock management systems can coordinate when each of the AMTs should perform loading and/or unloading procedures at a particular dock station, e.g., based on a load/unload schedule. Such a load/unload schedule can also control which pallets are delivered to a particular dock station via the pallet conveyor for loading and/or how unloaded pallets removed from the pallet conveyor are further handled. In various embodiments, upon being instructed to load or unload a trailer at a particular dock station, the AMT can automatically navigate to the dock station using the facility guidance system (e.g., using fixed guidance elements, a LIDAR system, location beacons, or other navigation).

In some embodiments of the present technology, an AMT can include a body, a material handling unit (e.g., a "fork") operably coupled to the body by a boom, a power supply, drive and steering mechanisms, and a truck control system for autonomous control. While the material handling unit may be referred to herein as a "fork" for ease of reference, a fork can be any configuration capable of engaging with a load, such as a tray, a bucket, a standard or specialized fork-lift style fork, a hook, a cable, etc. As used herein the "front" of the AMT is a side of the AMT from which the fork extends, the "rear" of the AMT is opposite the front, and the "sides" of the AMT are remaining sides (left and right) of the AMT. In some embodiments, the AMT can include one or more sensors, e.g., one or more front sensors for sensing an area in front of the AMT, one or more side sensors for sensing an area to one or more sides of the AMT, and/or one or more fixed guidance sensors for sensing fixed guidance elements of a facility guidance system. In various embodiments, the sensors can be RADAR sensors, LIDAR sensors, inferred sensors, radio sensors, magnetic sensors, cameras, contact sensors, pressure sensors, and/or other electromagnetic or mechanical sensor configurations.

In some embodiments of the present technology, one or more of the front sensors can provide measurements or sensor signals to the truck control system to identify objects or obstructions in the front of the AMT. A truck control system can use input from the front sensors while inside a trailer to locate a truck unloading position (the position in the trailer at which the AMT should be positioned to unload the pallet) and/or a pallet unloading position (the position in the trailer at which the pallet will be placed). The truck control system can locate the truck unloading position by identifying obstruction locations in the trailer that are closest to an opening of the trailer. For example, when identified obstructions are on both sides of a trailer centerline (e.g., the obstructions are two pallets side-by-side, are the back wall of the trailer, or are oversized objects taking up both sides of the trailer centerline), the truck control system can place the pallet to begin a new row of pallets within the trailer. Otherwise, when the identified obstruction is on just one side of the centerline, the truck control system can perform a parallel pallet placement. When performing a pallet placement in a new row, the truck unloading position can be an area offset from the identified obstruction based on the length of the loaded pallet and the pallet unloading position can be on a side of the centerline selected by default (e.g., new rows can always begin by first placing a pallet on the left side of the centerline). When performing a parallel pallet placement, the truck unloading position can be an area adjacent to the identified obstruction and the pallet unloading position can be the unobstructed side of the centerline. In some cases, these areas can be further offset by a safety margin to help prevent collisions.

In some embodiments, instead of or in addition to using the front sensors to determine the truck unloading position and/or the pallet unloading position, the truck control system can identify the truck unloading position and the pallet unloading position based on a record of where the AMT deposited a previous pallet in the trailer. For example, the truck control system can have a record of how far back and to what side of the centerline it last deposited a previous pallet and can determine where to place the next pallet based on the last pallet placement position.

In some embodiments, the front sensors can be used in other situations to control AMT movement, e.g., by sensing objects in an area forward of the AMT. For example, when the truck control system identifies an object that corresponds to an action specified at a current point in a workflow procedure, the truck control system can take the specified action. When the truck control system identifies an object that does not correspond to an action specified at a current point in the workflow procedure or is unable to identify an object determined to be in the forward area, the truck control system can pause the workflow procedure and/or send an alert message. For example, the truck control system can notify the central processing center which can provide an alert to a dock station manager via an email, text message, push notification to an application, etc.

In some embodiments, the sensor signals from any of the AMT sensors can be provided to a dock control panel, central processing center, or another external entity for analysis. The external entity can then send workflow procedure instructions back to the truck control system to take appropriate actions, or the external entity can notify dock station personnel to address the situation when the sensor signals do not indicate a particular action to take.

In some embodiments of the present technology, one or more side sensors of the AMT can be part of a trailer guidance system that senses a distance to one or both trailer walls that are on either side of the AMT. In other embodiments, the trailer guidance system can be external to the AMT and can include, e.g., an external camera or other sensor that tracks both the position of the AMT and its location relative to other objects such as trailer walls. The trailer guidance system, in conjunction with the truck control system, can control movements of the AMT as the AMT enters or leaves the trailer and while the AMT is inside the trailer. For example, the truck control system can control the AMT to travel along a centerline of the dock station (inside the trailer this can be the line that is equidistant to each of the trailer side walls), based on measurements from the trailer guidance system.

At times when the AMT is not entering, leaving, or inside the trailer, movement of the AMT can be controlled by the truck control system in conjunction with a facility guidance system. The facility guidance system can include fixed guidance elements that the truck control system can recognize and correlate to particular locations at a dock station. In some embodiments, a first set of the fixed guidance elements can provide location or direction controls for executing workflow procedure instructions at a dock station, while a second set of fixed guidance elements can be used to guide an AMT between dock stations.

In some embodiments, the fixed guidance elements can include a track or rail affixed to or embedded in a floor portion of the dock station that mechanically controls movement of the AMT through contact with the AMT. In other embodiments, the fixed guidance elements can include one or more electromagnetic (EM) devices that emit or respond to EM radiation. As used herein, EM radiation includes any type of radiation or magnetic fields, such as radio waves, microwaves, infrared, visible light, ultraviolet, and/or X-rays. Examples of EM devices include radio-frequency identification (RFID) tags, magnets, radio emitters, metal disks, and the like. The AMT can interface with these EM devices by sensing the radiation or field emitted by, bounced off of, or otherwise associated with the EM devices. In some embodiments, the AMT can emit an EM signal which is sensed by the EM device. The EM device can then signal another device via, e.g., wired or wireless communication, to tell the other device where the AMT is located. In some embodiments, the fixed guidance elements can include passive metal medallions and/or guide rails (e.g., embedded guide rails) that sensors on the AMT can detect, e.g., visually or by receiving a signal based on the medallion or rail, such as a magnetic field. The truck control system of the AMT can use this system to determine location or movement information.

In some embodiments, the EM devices can form a track or path that the AMT can follow. In other embodiments, radiation from various of the EM devices can be encoded with location information that the truck control system can decipher. In yet further embodiments, the fixed guidance elements can include one or more visual indicators and the AMT can include a camera to capture one or more images of the one or more visual indicators which the truck control system can recognize. Thus, as with the other EM devices, the visual indicators can form a track that the AMT can follow or the AMT can decipher a location based on information encoded in the visual indicators. In some embodiments, the fixed guidance elements can use a combination of one or more of mechanical components, EM components, visual components, passive medallions, etc. or any combination thereof. In some embodiments, instead of using fixed guidance elements, the facility guidance system can direct movement of the AMT through other forms of navigation such as GPS, local beaconing systems, LIDAR, RADAR, and/or other reflection or image-based systems.

In some embodiments of the present technology, the truck control system can cause the AMT to follow a workflow procedure, such as the workflow procedure described above. In some embodiments, the truck control system can store instructions that define steps of the workflow procedure. In addition or alternatively, the truck control system can communicate with an external system (e.g., the central processing system or the dock station control panel) to receive location information or workflow procedure instructions. In some embodiments, the truck control system can also communicate with various other sensor systems integrated with the truck or included with the dock station. For example, the truck control system can interface with the facility guidance system to determine a current location or to identify a track or path to follow. Also, the truck control system can receive input signals from the trailer guidance system to control movements of the AMT for entering, exiting, and moving within the trailer. In some embodiments of the present technology, the workflow procedure can include instructions for raising, lowering, or moving the fork horizontally by manipulating the fork boom.

In some embodiments, the dock station control panel and/or the central processing center can monitor and communicate workflow procedure instructions to the pallet conveyor and the AMT. The dock station control panel or the central processing center can also control automatic charging of the AMT, orchestrate which dock station an AMT should be working at, and/or coordinate loads to place on pallets for delivery to the dock station via the pallet conveyor.

In some embodiments, the pallet conveyor can deliver pallets to a dock station for loading into a trailer and can receive pallets offloaded from a trailer for delivery elsewhere, e.g., to a holding facility, for loading onto another trailer or further processing. The pallet conveyor can include various conveyor line mechanisms for moving pallets, such as a series of rollers, a belt or other moveable surface, overlapping plates, etc. The central processing center can coordinate which pallets should be loaded onto the pallet conveyer at any given time and at which dock station the pallet should stop for pick up by the AMT. In some embodiments, the pallet conveyor can have multiple conveyor lines, e.g., one for moving pallets in one direction along a series of dock stations and another for moving pallets in the opposite direction.

In various embodiments, the autonomous dock station system described herein can provide automated trailer loading and unloading with a minimum or at least a reduced amount of manned support, thereby increasing the operational efficiency of distribution centers. For example, in some embodiments, it is contemplated that the autonomous dock station system can load 22 pallets of approximately 2,000 lbs. each into a trailer in 25 minutes. Combined with an average cycle time of two minutes for the dock leveler, restraint and door systems, and allowing 10 minutes for positioning the transport vehicle at the dock station, the overall load or unload time can be less than 40 minutes. Thus, a dock station could potentially service up to 36 trailers a day as compared to a maximum of 20 trailer loading or unloading cycles provided by conventional systems. The autonomous dock station system can thus increase the material throughput of each individual dock station and reduce the number of dock stations required at a given distribution center. In addition to these efficiency increases, embodiments of the autonomous dock station system described herein can save energy by employing efficient AMTs and reducing environmental energy lost through dock doors being opened at times other than when an AMT needs to pass through them. Finally, by automating many portions of the loading and unload procedures, the autonomous dock station system can reduce human labor costs while also reducing the likelihood of injury to dock station personnel.

Certain details are set forth in the following description and in FIGS. 1-13 to provide a thorough understanding of various embodiments of the present technology. In other instances, well-known structures, systems, operations, materials, etc. often associated with distribution centers, logistics yards, transport vehicles (including over the road ("OTR") tractors and trailers as well as dedicated terminal tractors), dock stations, dock station equipment, processing and storage systems, wireless communication systems, etc. have not been set forth in the following disclosure to avoid unnecessarily obscuring the description of the various embodiments of the technology. Those of ordinary skill in the art will recognize, however, that the present technology can be practiced without one or more of the details set forth herein, and/or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Many of the details, dimensions, angles and other features shown in the Figures are merely illustrative of particular embodiments of the disclosure. Accordingly, other embodiments can add other details, dimensions, angles and features without departing from the spirit or scope of the present invention. In addition, those of ordinary skill in the art will appreciate that further embodiments of the invention can be practiced without several of the details described below.

In general, identical reference numbers in the Figures identify identical, or at least generally similar, elements. To facilitate the discussion of any particular element, the most significant digit or digits of any reference number generally refers to the Figure in which that element is first introduced. For example, element 110 is first introduced and discussed with reference to FIG. 1.

Distribution Center

FIG. 1 is a partially schematic plan view of a distribution center 100 configured in accordance with embodiments of the present technology. By way of example, the distribution center 100 may be part of a processing center, a manufacturing center, or any other facility that includes dock stations and an adjacent area for the transfer of goods, materials, etc. In some embodiments, the distribution center 100 can include a boundary or enclosure 101 (e.g., a wall or fence) that surrounds the distribution center 100 and a corresponding logistics yard 102 to provide security. The enclosure 101 can include a vehicle entrance/exit gate 103 with a guard booth 104.

Multiple tractor/trailer combinations 110 may be present in the logistics yard 102 at any given time. Some of the tractor/trailer combinations 110 include a tractor 112 that is operably coupled to and separable from a cargo trailer 111, e.g., an OTR trailer. These vehicles are commonly referred to as "semi-trucks" and "semi-trailers," respectively. It should be understood, however, that the term "tractor/trailer combination" and the like, as used herein, can generally refer to other types of carrier vehicles, such as integral units, which are generally known as straight trucks. Accordingly, the present technology is not limited to use with only tractor/trailer combinations and may be used in virtually any distribution-type facility with virtually any type of vehicle including tractor/trailer combinations, straight trucks, vans, and the like. In addition to the tractor/trailer combinations 110, the yard 102 can also contain a plurality of individual tractors 112 and/or individual trailers 111 at any given time. The trailers 111, for example, may be parked in corresponding parking locations 115 prior to loading and/or unloading.

The distribution center 100 can include a building 130 (e.g., a warehouse, manufacturing facility, or other facility for shipping/receiving goods, materials, etc.). In the illustrated embodiment, the building 130 includes a plurality of dock stations 131 (which may also be referred to herein as "docks," "dock stations," "loading docks," and the like). Each dock station 131 is configured to facilitate loading and unloading of goods and materials from, for example, the trailers 111. As described in further detail below, the building 130 can include a central processing center 132 (shown schematically) to coordinate operations in the logistics yard 102 and at the dock stations 131. The central processing center 132 can also interact with and/or control a facility enterprise resource planning (ERP) system, an associated material handling system, and/or other operational systems associated with the distribution center 100. In the illustrated embodiment, the central processing center 132 is depicted as being located or integrated within the building 130. In other embodiments, however, the central processing center 132 is not limited by location and may be located remotely from the building 130 and/or in virtually any other location.

In some embodiments, the tractors 112 include autonomous tractors and the central processing center 132 includes automated processing systems configured to communicate instructions to the tractors 112, receive feedback from the tractors 112, and automatically respond to the feedback. Furthermore, the central processing center 132 may be utilized to gather dock station status data from one or more control panels or an AMT and provide workflow procedure instructions to the AMT. The central processing center 132 can also generate/compile reports, alerts, and notices regarding operations in the logistics yard 102, the dock stations 131, the AMT, and any associated material handling systems or software packages.

In some embodiments, the distribution center 100 can include a local positioning system to locate the positions of vehicles in the yard relative to, for example, a ground map of the distribution center 100. For example, the distribution center 100 can include a plurality of beacons 106 (identified individually as a first beacon 106a, a second beacon 106b and a third beacon 106c) positioned in known locations around the logistics yard 102 (e.g., in different corners of the yard 102). In some embodiments, the beacons can include wireless transmitters (e.g., Wi-Fi, Zigbee, Z-Wave, Bluetooth, etc.) to enable wireless positioning of the tractor 112 and/or the trailer 111 in the logistics yard 102. For example, the beacons 106 can include wireless access points each having a unique identifier (e.g., a media access control or "MAC" address). The tractor 112 can include a wireless receiver and can determine its location using conventional triangulation techniques based on, for example, the radio signal strength (RSS) of the wireless signals received from the respective beacons 106. It should be understood that in some embodiments of the present technology, the local positioning systems described above can be used in conjunction with a conventional GPS or other location tracking system for guidance of the tractor 112. Additionally, in some embodiments, an AMT associated with one or more dock stations can track its location using the positioning system described above.

Bluetooth and WiFi are just two of the types of communication technology that the central processing center 132, the tractor 112, dock station control panels, and/or other dock station components can utilize to communicate with and/or control one another at the distribution center 100. In other embodiments, other types of suitable communications can be used such as wireless local area network systems (WLAN), dead reckoning systems, Zigbee systems, Z-wave systems, thread, LoRa, etc.

Dock Station

Figure 2A:
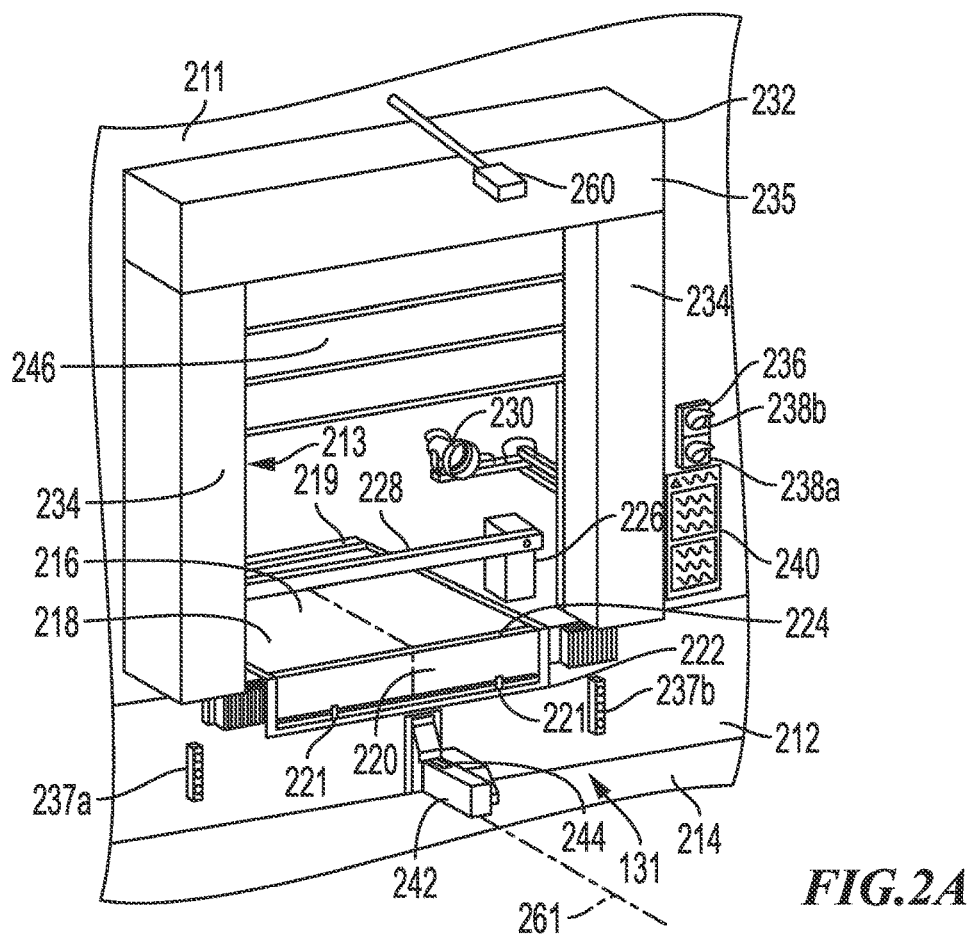
FIGS. 2A and 2B are isometric views of a dock station configured in accordance with some embodiments of the present technology.
Figure 2B:
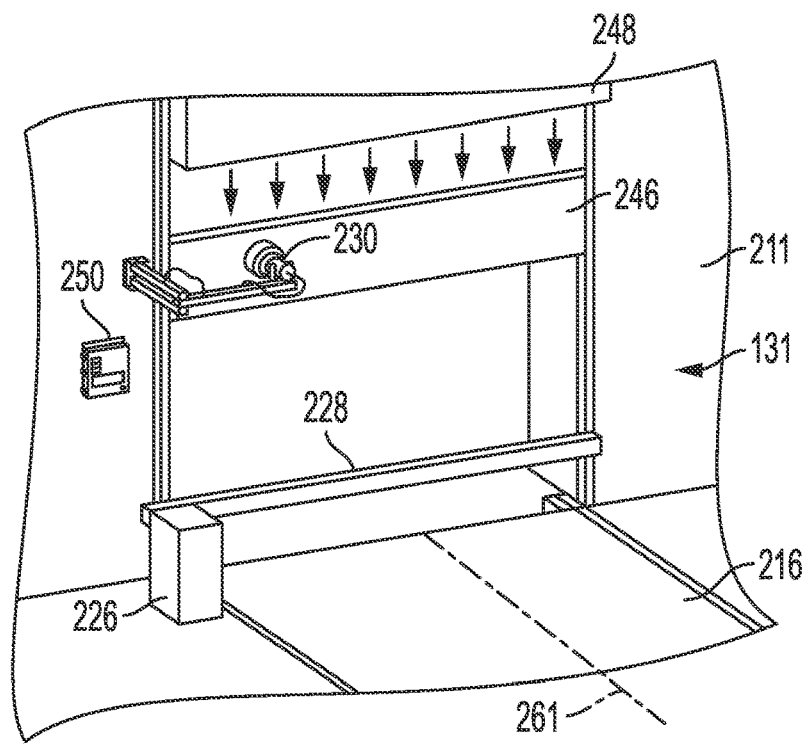

FIG. 2A is an exterior isometric view of a dock station 131 configured in accordance with some embodiments of the present technology. FIG. 2B is an interior isometric view of the dock station 131 configured in accordance with some embodiments of the present technology. The dock station 131 includes a driveway 214 in front of an elevated opening 213 in a warehouse or other building 211. The opening 213 can include a barrier gate 226 positioned directly behind a door 246 (e.g., a powered rollup or overhead door), which is shown partially open. The barrier gate 226 can include a barrier arm 228 that can be electrically operated to rotate from a horizontal, blocking position or as shown in a vertical, open position. A vehicle restraint 242 (e.g., an electrically-actuated mechanical restraint) is mounted to, or near, a dock face 212 and includes a movable hook 244. The hook 244 can be raised to engage a rear impact guard ("RIG") of a truck or tractor trailer 111 to secure the vehicle at the dock station 131 in a known manner and prevent, for example, inadvertent "early departure" and/or "trailer creep" of the trailer 111 away from the dock face 212 during the loading or unloading process. After loading/unloading, the hook 244 can be lowered or otherwise retracted to release the trailer 111.

In the illustrated embodiment, the dock station 131 further includes a dock shelter 232. The dock shelter 232 can include inflatable side members 234 extending vertically along each side of the opening 213, and an inflatable head member 235 extending horizontally across the top of the opening 213. Prior to use, the side members 234 and the head member 235 can be at least partially deflated. After the trailer 111 backs into the dock station 131 and is engaged by the vehicle restraint 242, the side members 234 and the head member 235 can be inflated (via, e.g., an electrically-driven air pump) to form an environmental seal between the trailer and the dock wall in a known manner. In other embodiments, the dock station 131 can include other types of dock seals (e.g., compressible foam seals) in place of, or in addition to, the dock shelter 232, or a dock shelter can be omitted.

The dock station 131 can also include a dock leveler 216 positioned adjacent to the opening 213. The dock leveler 216 can include a deck 218 pivotally attached to a frame 219 at the rear of a pit 222 formed in the floor of the building 211. A lip 220 is can be pivotally attached to a forward edge portion of the deck 218 via one or more hinges 224. In a stored position (shown), an outer edge portion of the lip 220 is supported by keepers 221 mounted at the front of the pit 222 near the dock face 212. In operation, the deck 218 rotates upwardly away from the pit 222 and then downwardly as the lip 220 rotates outward and eventually comes to rest on the bed of a truck or trailer 111 parked at the dock station 131. Once engaged, the deck 218 and the lip 220 provide a ramp for dock workers, fork lifts, AMTs, etc. to move back and forth and transfer goods, materials, etc. into and/or out of the vehicle. A dock light 230 can be movably mounted to an interior wall of the building 211 to one side of the opening 213 to illuminate the interior of the vehicle during the loading and/or unloading process.

Additionally, an air curtain 248 (having, e.g., an electrically-driven blower fan) can be positioned above the opening 213 and configured to direct a "curtain" of air downwardly across the opening 213 to prevent air and/or contaminants from flowing between the building 211 and the vehicle when the dock door 246 is open.

A signal light assembly 236 can be mounted to the building 211 adjacent the opening 213 to provide visual signals, e.g., to vehicle drivers. For example, the signal assembly 236 can include a green light 238a that, when illuminated, indicates to a vehicle driver that it is safe to back a trailer up to the dock station 131. Or, if the vehicle is already at the dock station 131, the green light 238a indicates that the vehicle restraint 242 has been disengaged from the trailer and it is safe to move the vehicle away from the dock station 131. The light assembly 236 can also include a red light 238b that, when illuminated, indicates to a vehicle driver that the restraint 242 is engaged with the trailer and it is therefore not safe to move the vehicle away from the dock station 131. In some embodiments, instead of the arrangement of the round green light 238a positioned vertically with the round red light 238b (as shown in FIG. 2A), the signal light assembly can include the green light 238a as an O shape while the red light 238b can have an X shape. In various embodiments, the green light 238a with the O shape can overlap with the red light 238b or can be non-overlapping such as in a vertical arrangement. These instructions can be posted in writing on a sign 240 positioned adjacent to the signal light assembly 236. In addition to the signal lights 238a and 238b, in some embodiments the dock station 131 can also include a first guide light 237a mounted to the dock face 212 on one side of the opening 213, and a second guide light 237b mounted to the dock face 212 on the opposite side of the opening 213. The guide lights 237a are positioned so that they can be illuminated and easily viewed by vehicle drivers with rear view mirrors to help them align their trailers with the opening 213 as they back the trailers up to the dock station 131. In addition, a truck presence sensor 260 may be included to indicate to the control panel 250 whether a transport vehicle is present at the dock or not.

The various pieces of dock station equipment and associated systems described above (e.g., the vehicle restraint 242, the light assembly 236, the dock shelter 232, the door 246, the loading light 230, the air curtain 248, the dock leveler 216 and the barrier gate 226) can be at least generally similar in structure and function to dock station equipment known in the art. For example, the dock station equipment described above can be at least generally similar in structure and function to dock station equipment described in: U.S. Pat. Nos. 8,893,764; 8,510,888; 8,490,669; 8,407,842; 8,307,589; 8,181,401; 8,112,949; 7,165,486; 7,119,673; 6,082,952; and 5,831,540; U.S. Provisional Application No. 61/988,081, filed May 2, 2014, and titled SYSTEMS AND METHODS FOR AUTOMATICALLY CONTROLLING DOCK STATION EQUIPMENT; and PCT Application No. PCT/IB2015/000698, filed Apr. 30, 2015, and titled SYSTEMS AND METHODS FOR AUTOMATICALLY CONTROLLING DOCK STATION EQUIPMENT; each of which is incorporated herein by reference in its entirety.

In some embodiments, the control panel 250 is mounted to an interior wall of the building 211 to one side of the dock door 246 at about eye level. The control panel 250 is operably connected (via, e.g., wired or wireless connections) to the dock station equipment described above. The control panel 250 can include an "intelligent" graphical user interface (that can include, e.g., a touchscreen) that enables the dock operator to quickly and easily operate the dock station equipment to safely engage a truck or trailer for unloading and/or loading, and then safely release the vehicle and secure the dock area after the unloading/loading process. As described in greater detail below, in some embodiments, the control panel 250 can wirelessly communicate with a truck control system of an AMT, providing the AMT with instructions that conform to a workflow procedure.

Automated Material Lift Truck (AMT)

Figure 3D:
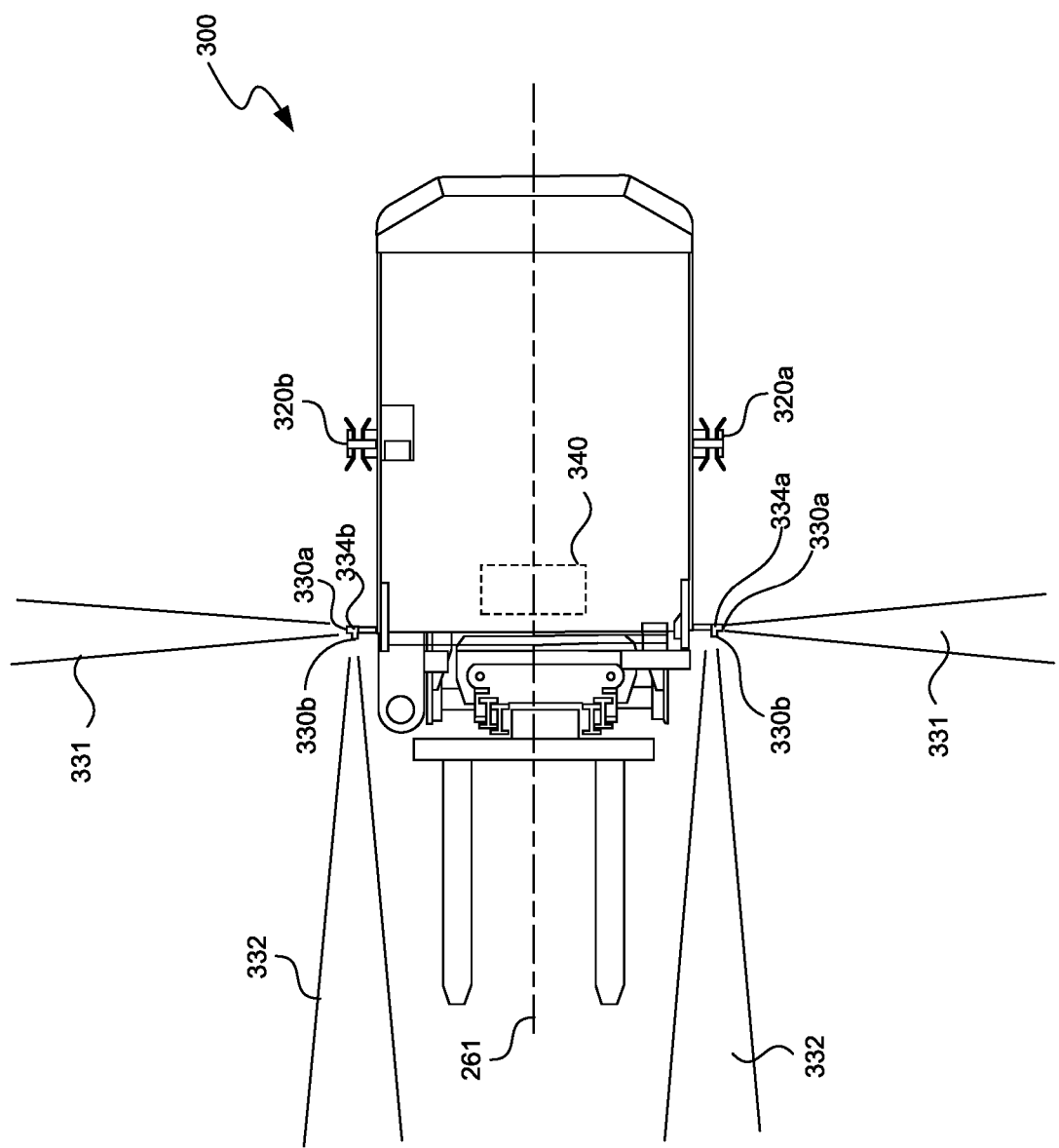
Figure 3E:
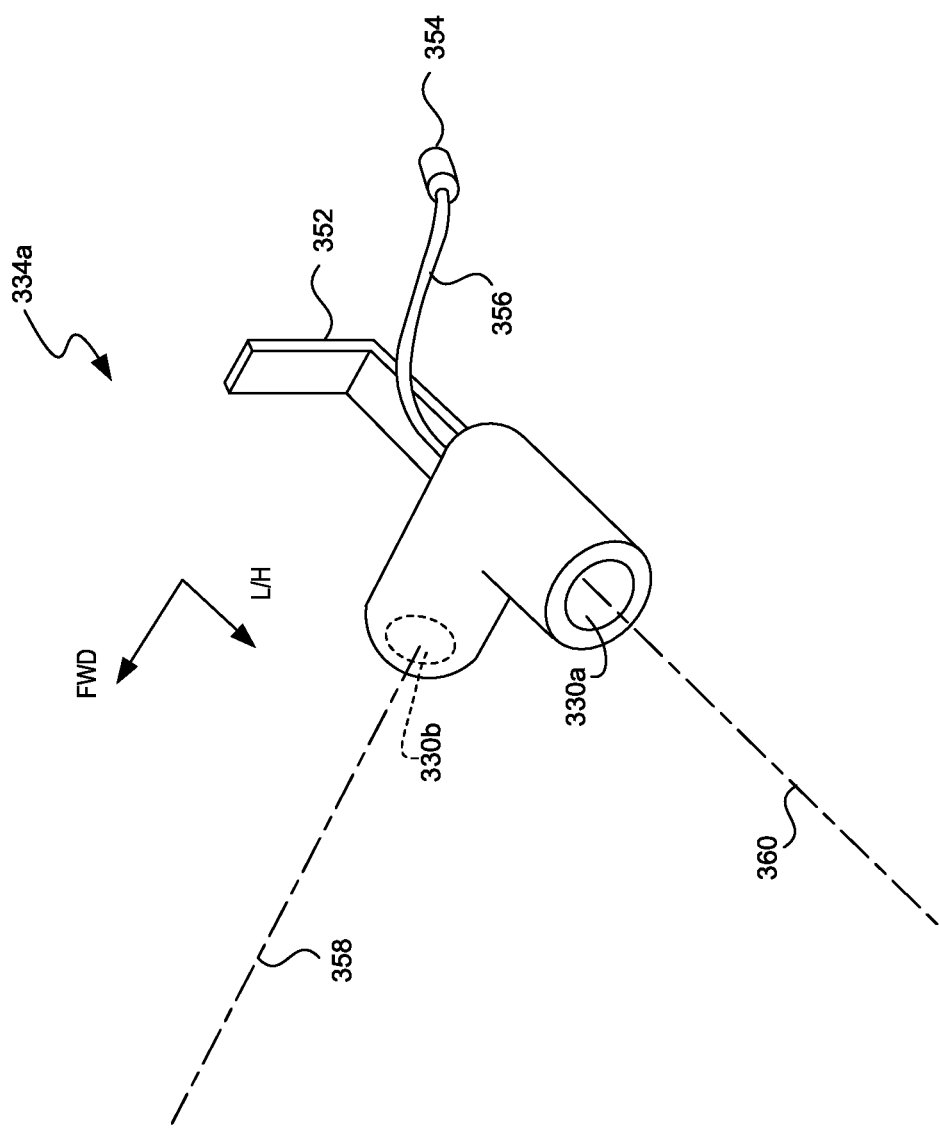
FIG. 3E is an enlarged isometric view of a sensor component of the AMT configured in accordance with some embodiments of the present technology.

FIGS. 3A-3E are a series of views illustrating an AMT 300 configured in accordance with some embodiments of the present technology. More specifically, FIG. 3A is a partially schematic side view of the AMT 300; FIG. 3B is a partially schematic rear view of the AMT 300; FIG. 3C is a first partially schematic top view of the AMT 300; FIG. 3D is a second partially schematic top view of the AMT 300, and FIG. 3E is a partially schematic enlarged isometric view of a left-side sensor assembly 334a of the AMT 300. As described in greater detail below, the AMT 300 can be used to transport a pallet from a pallet loading position into the trailer 111 or vice versa.

Figure 13:
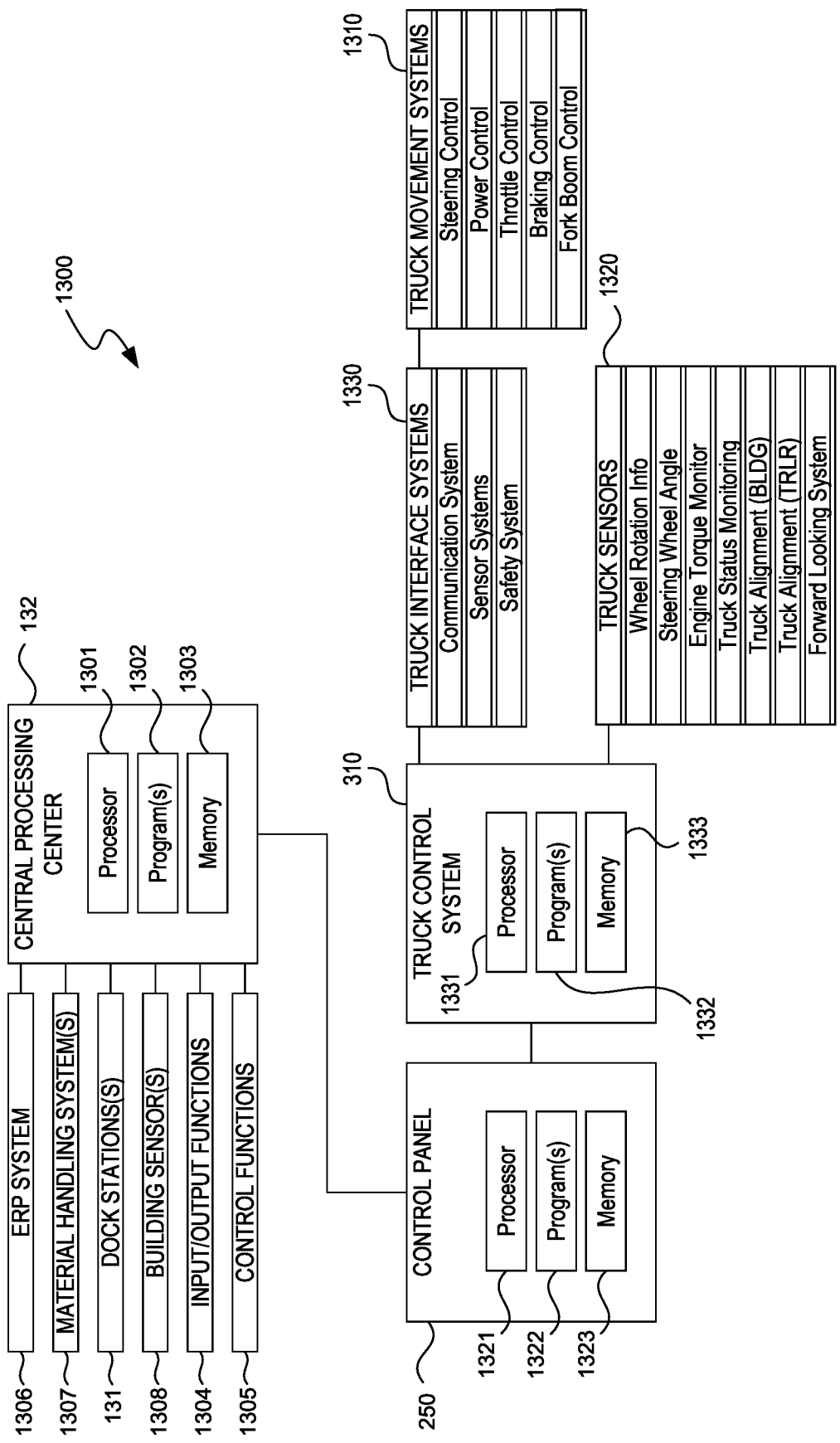
FIG. 13 is a block diagram of a dock station system configured in accordance with some embodiments of the present technology.

Referring to FIGS. 3A-3C together, the AMT 300 can include a body 301 containing a power supply 313 (e.g., a battery, fuel, etc.), a drive system 322 (e.g., including an electric motor or an internal combustion engine, etc., coupled to a drive shaft and control elements (such as truck sensors, truck control systems, etc., as shown schematically in FIG. 13), and wheels 314a-314d. The AMT 300 can also include a fork boom 303 that couples a fork 302, with two fork tines 324a and 324b, to the body 301. In various embodiments, the fork 302 can be a standard fork lift fork or a customized fork optimized to have a fork spacing width 308 configured to fit into pallet divots (e.g., cavities or openings) in a particular pallet, and a length 309 that matches the length of the particular pallet (e.g., a length greater than the combined length of pallet sections 1101a and 1101b of FIG. 11, described below). The fork boom 303 can raise and lower the fork 302 to a variety of heights 307, enabling the AMT 300 to pick up and maneuver pallets or other loads. In some embodiments, the fork boom 303 can also move the fork 302 laterally, such as to a center position (e.g., aligned with the dock station centerline 261 (FIG. 2B)) for travel, or to a left or right position relative to the body 301 for, e.g., placing a pallet to the left or right of the dock station centerline 261 while the body 301 remains centered on the dock station centerline 261. The wheels 314 can include a powered wheel pair 314b and 314d and a steering wheel pair 314a and 314c, with each pair spaced apart a lateral distance 306 so that the wheels 314 can pass through openings 603 in a pallet conveyor 601 (described below with reference to FIG. 6A).

As described in greater detail below, the top of the pallet conveyor 601 (FIG. 6A) can be at a height that is less than a clearance height 312 of an undercarriage 305 of the AMT 300. In some embodiments, a hydraulic system of the fork boom 303 can move the fork 302 through a vertical range of 6 to 12 inches. In some embodiments, the fork boom 303 may not include a tilt mechanism, while in other embodiments the fork boom 303 can include a tilt mechanism to rotate the angle of the fork 302 and tilt a pallet on the fork 302 toward the AMT body 301. Providing limited vertical movement without a tilt mechanism can remove the need for a complex hydraulic system with excessive vertical range or complex tilt mechanisms found in conventional material transport vehicles. In some embodiments, the various components and features of the AMT 300 described above can be at least generally similar in structure and function to such components and features as found on conventional fork trucks, which are well known in the art.

Referring to FIGS. 3A and 3C together, the AMT 300 can also include a truck control system 310 which can connect to an antenna 311. In combination, the truck control system 310 and the antenna 311 can wirelessly communicate with external entities, such as the dock control panel 250 and/or the central processing center 132. The truck control system 310 can generate vehicle steering and throttle commands for the drive system 322 to navigate a path of travel for the AMT 300. As described in greater detail below, in some embodiments the path of travel can be determined by proceeding through a workflow procedure based on information received by the truck control system 310 via interfacing with a facility guidance system and/or a trailer guidance system.

In some embodiments, the truck control system 310 is capable of: wireless communication between the AMT 300 and the central processing center 132 and/or the control panel 250, and actuating the fork boom 303 and/or the drive system 322 in accordance with steps of a workflow procedure (determined by the truck control system 310, the central processing center 132, and/or the control panel 250). An example series of movements to load pallets onto the fork 302, drive the AMT 300 into the trailer 111, and unload the pallets from the fork 302 are described below with reference to FIGS. 7-9.

In various embodiments, the truck control system 310 can be a stand-alone dedicated controller, a shared controller integrated with other control functions (e.g., integrated with other on-board or off-board vehicle control systems), or an off-board computing system (e.g., at the dock station control 250 panel and/or the central processing center 132). Using the various on-board and/or off-board computing systems that can make up the truck control system 310, the truck control system 310 can perform a workflow procedure. For example, in some embodiments an off-board computing system can transmit commands to the truck control system 310 to perform corresponding actuations of the drive system 322, the fork boom 303, etc.

Referring next to FIGS. 3C, 3D and 3E together, the truck control system 310 can include a sensor system 340 that receives and processes sensor signals from a left-side sensor assembly 334a and a right-side sensor assembly 334b, which can each include a side sensor 330a and/or a front sensor 330b. FIG. 3E is an isometric view of the left-side sensor assembly 334a. The right-side sensor assembly 334b can be a mirror of the left-side sensor assembly 334a. As shown in FIG. 3E, in some embodiments the sensors 330a and 330b can be active sensors which emit electromagnetic (EM) signals 360 and 358, respectively, and take a reading of the reflection from the surrounding area, or the sensors 330a and/or 330b can be passive sensors, taking in light or other ambient EM radiation to determine information about the surrounding area. Example types of the sensors 330a and 330b4 can include RADAR sensors, LIDAR sensors, inferred sensors, radio sensors, magnetic sensors, cameras, contact sensors, pressure sensors, and/or other electromagnetic or mechanical sensor configurations. Each pair of the sensors 330a and 330b can be attached to the respective side of the AMT 300 with a suitable bracket 352, and can be connected to the sensor system 340 by a wire 356 and a connector 354.

As shown in FIG. 3D, the side sensors 330a can be for sensing objects to one or both sides of the AMT 300, e.g., in a zone or area 331, and/or for sensing distances from such objects to the side of the AMT 300. The truck control system 310 can use input from the sensor system 340, based on signals from the side sensors 330a, to guide movements of the AMT 300 while traveling within the trailer 111. For example, the side sensors 330a can sense the distances to walls of the trailer 111, which the truck control system 310 can use to maintain the AMT 300 on or at least near the dock station centerline 261 (FIG. 2A) within the trailer 111. The front sensors 330b can sense objects to the front of the AMT 300, e.g., in a zone or area 332, and/or distances to such objects from the front of the AMT 300. In some embodiments, the truck control system 310 can use input from the sensor system 340, based on signals from the front sensors 330b, to determine where to place a pallet within the trailer 111 (i.e., a pallet unload position) and where the AMT 300 should be positioned to place the pallet at the pallet unload position (i.e., a truck unload position). The truck control system 310 can determine how far down the trailer 111 these unload positions are located and to which side of the dock station centerline 261 the pallet unload position is located. In some embodiments, the truck control system 310 can use signals based on the front sensors 330b to determine where a pallet is within a trailer, e.g., how far down the trailer a closest pallet is located and on which side of the dock station centerline 261 the pallet is located.

In some embodiments, the sensor system 340 can be a sub-component of the truck control system 310 or can be a stand-alone processing system for processing sensor signals and determining parameters. The sensor system 340 can determine parameters such as distance measurements, object identification, and the like. The parameters can then be communicated from the sensor system 340 to the truck control system 310.

A trailer guidance system can include a combination of the truck control system 310 and the sensor system 340. In some implementations, the trailer guidance system can also include external building sensors, such as location beacons or cameras that provide signals to the truck control system 310 directly or via the control panel 250 and/or the central processing center 132.

In some embodiments, the truck control system 310 can also use the sensor system 340 to guide the AMT 300 while outside the trailer 111. For example, the truck control system 310 can use input from the sensor system 340 based on signals from the front sensors 330b to determine whether there is an object blocking a path of the AMT 300, and whether to, e.g., pause movement or deviate from the path to avoid a collision.

Returning to FIG. 3B, in some embodiments the sensor system 340 can also receive signals from a fixed guidance sensor 326 to determine where fixed guidance elements of a fixed guidance system are located. In various embodiments, the fixed guidance sensor 326 can include a pressure sensor, an EM sensor, an electro-optical sensor, an RF sensor, and/or a camera coupled to, e.g., a lower portion of the AMT 300. The guidance sensor 326 can detect or sense the fixed guidance elements, which can include, for example, rails, electronic or magnetic devices, visual indicators, and/or other fixed elements that protrude above a floor surface of the dock station, are flush with the floor surface, and/or are embedded in the floor surface, or are fixedly attached to other surfaces of the dock station. For example, the fixed guidance elements can include a plurality of individual sensor target elements 902-906 (described below with reference to FIGS. 9A-9D) that are placed at specific fixed locations at the dock station, e.g., along the dock station centerline 261.

In some embodiments, the AMT 300 can physically connect with fixed guidance elements such as rails, using a rail guide 328 (described in more detail below with reference to FIGS. 6B and 6C). Such rails can be composed of various shapes or materials to fulfill the task of guiding the AMT 300. For example, they can have a profile that protrudes above the floor of the dock station, is flush with the floor, is grooved, is hollow, etc. In other embodiments, such rails can include elongate channels or grooves that are formed in the floor of the dock station and movably receive a rail guide that extends downwardly from the AMT 300. In some embodiments, a combination of fixed guidance elements can be used such as a rail aligned with the dock station centerline 261 and individual sensors or sensor targets positioned at various locations that correspond to steps in a workflow (e.g., the locations of fixed guidance elements 902-904 described below in reference to FIGS. 9A-9D).

In some embodiments, the fixed guidance elements can be multiple electro-magnetic guidance elements arranged in, e.g., a grid or along multiple pathways at, e.g., a dock station. A series of the electro-magnetic guidance elements can be independently powered to provide unique paths of movement for the AMT 300. For example, in some cases the truck control system 310 can be configured to follow a specified set of fixed guidance elements for travel along different pathways. For example, the truck control system 310 can follow a workflow procedure that specifies a first path of movement along a first list or series of fixed electromagnetic guidance elements when loading at a first dock station, and specifies a second path of movement along a second list or series of fixed electromagnetic guidance elements for traveling between the first dock station and a second dock station. The lists or series of fixed guidance elements can be programmed into the truck control system 310 or can be supplied by an external source, such as the control panel 250 or the central processing center 132. The lists or series of fixed guidance elements can also be updated as fixed guidance elements are replaced or as pathways change.

The fixed guidance elements of the fixed guidance system can be placed at various points in a workflow procedure that correspond to specific actions for the AMT 300 to take for loading or unloading a trailer. For example, sensor targets 903 and 904 (described below in reference to FIGS. 9A and 9B) are located at points where, during a loading process, the AMT 300 advances to the sensor target 903 from the sensor target 904, and when the sensor target 903 is detected by the sensor system 340, the AMT 300 stops and performs activities associated with loading a pallet onto the fork 302. For example, the AMT 300 can raise the fork 302 to pick up the pallet. When the action is complete, the AMT 300 proceeds forward to the next action in the workflow procedure.

AMT Charging

Figure 4:
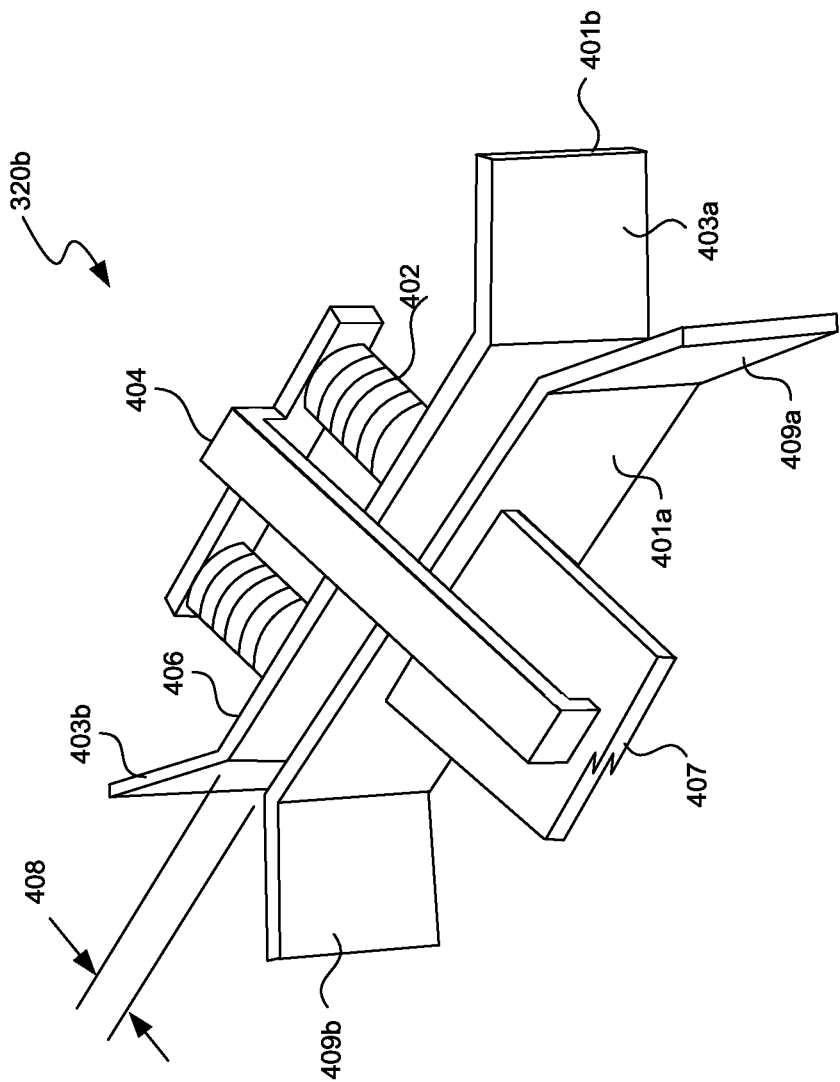
FIG. 4 is a partially schematic isometric view of a charging connection for an AMT configured in accordance with some embodiments of the present technology.

As shown in FIGS. 3A-3D, in some embodiments the AMT 300 can further include a first charging connection 320a on the left side of the AMT 300 and a second charging connection 320b on the right side of the AMT 300. Referring now to FIG. 4, FIG. 4 is an enlarged isometric view of the second charging connection 320b configured in accordance with some embodiments of the present technology. In the illustrated embodiment, the charging connection 320b includes a guide plate 401a in opposing relation to a connection plate 401b. The guide plate 401a can be fixedly attached to the AMT 300 by a suitable bracket 407. The connection plate 401b can be resiliently coupled to a distal end portion of an arm member 404 by one or more biasing members 402 (e.g., coil springs) that bias the connection plate 401b toward the guide plate 401a. A proximal end portion of the arm member 404 can be fixedly attached to the bracket 407. The guide plate 401a can include angled end portions 409a and 409b that extend generally outward relative to corresponding angled end portions 403a and 403b, respectively, of the connection plate 401b. Although only the second charging connection 320b is shown in FIG. 4, it should be understood that the first charging connection 320a can be a mirror image of the second charging connection 320b. As described in greater detail below, during normal operation the two charging connections 320a and 320b can make electrical connections to, e.g., an electrical power source (e.g., facility power) that enables the power supply 313 of the AMT 300 (e.g., a battery) to remain charged without requiring extended downtime for charging. For example, the first charging connection 320a can provide a cathode connection for charging the power supply 313, while the second charging connection 320b can provide an anode connection, or vice versa.

Figure 5:
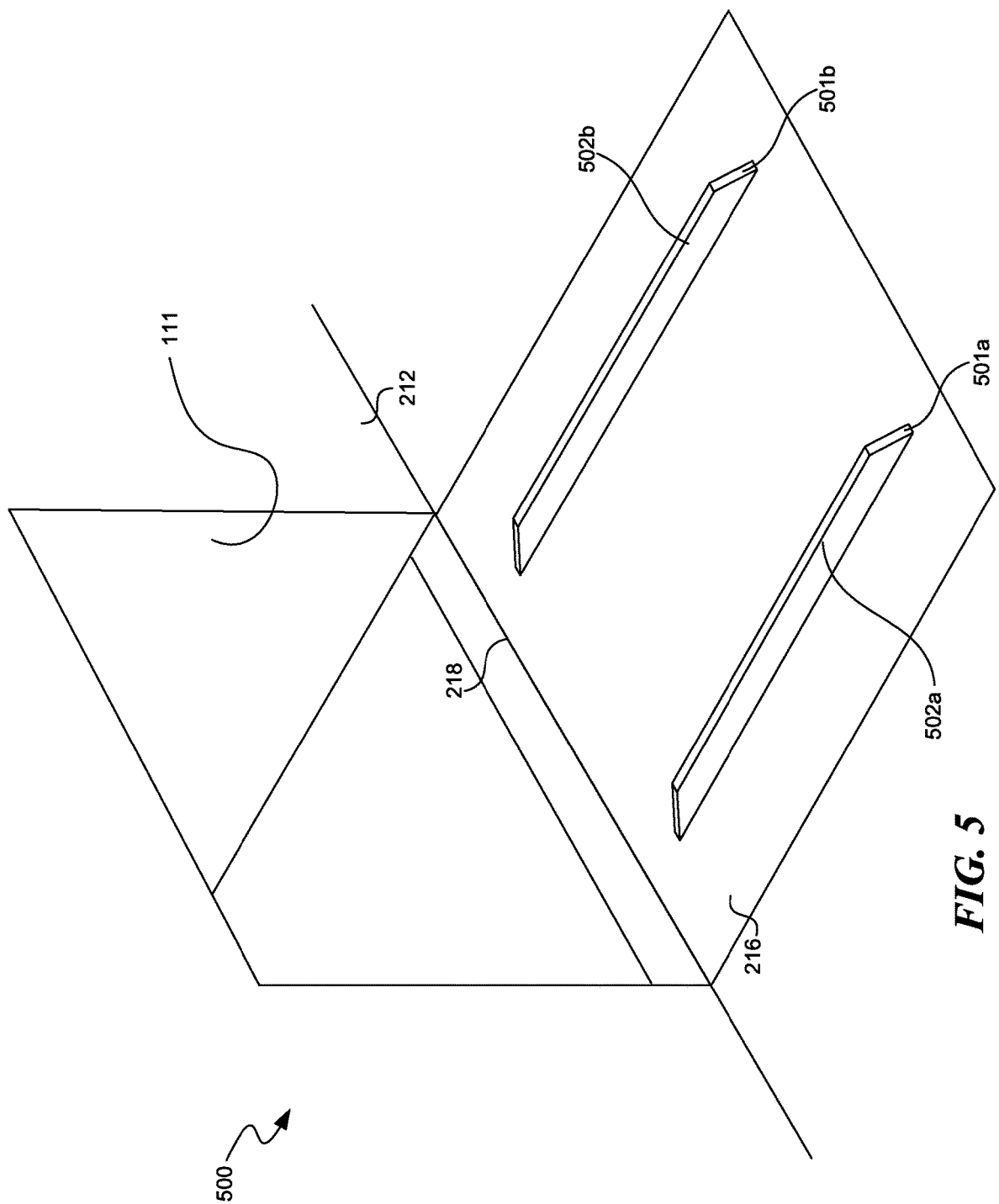
FIG. 5 is a partially schematic isometric view of an AMT charging station configured in accordance with some embodiments of the present technology.

FIG. 5 is an isometric view of a dock charging station 500 configured in accordance with some embodiments of the present technology. In some embodiments, the deck 218 of the dock leveler 216 includes a first raised charging rail 501a and a second raised charging rail 501b that is spaced from and extends parallel to the first charging rail 501a. The first and second charging rails 501a and 501b can be operably coupled to a power supply, such as dock station facility power. The first charging rail 501a has a surface 502a which can provide a cathode connection, and the second charging rail 501b has a surface 502b which can provide an anode connection.

Referring now to FIGS. 3C, 4 and 5 together, the charging rails 501a and 501b can be spaced apart on the deck 218 a distance that is at least approximately equal to the distance between the guide plate 401a of the first charging connection 320a and the guide plate 401a of the second charging connection 320b, plus a suitable clearance margin, e.g., about two inches. In operation, the AMT 300 moves over the dock leveler deck 218 each time the AMT 300 enters or exits the trailer 111. When the AMT 300 drives onto the rear edge portion of the deck 218 for entering the trailer 111, the AMT 300 will be aligned so that one or both of the angled plates 403b and 409b of the first charging connection 320a contact an inclined leading edge portion 504a of the first charging rail 501a. This contact aligns the AMT 300 so that as it continues to move forward the first charging rail 501a is received in the space 408 (FIG. 4). A similar guiding interaction occurs between the second charging connection 320b and the second charging rail 501b. As the AMT 300 moves over the charging rails 501a and 501b, the biasing force of the springs 402 of the first charging connection 320a keep the connection plate 401b of the first charging connection 320a in contact with the first charging rail 501a, thereby providing a cathode connection for charging the power supply 313 of the AMT 300. Similarly, the biasing force of the springs 402 of the second charging connection 320b keep the connection plate 401b of the second charging connection 320b in contact with the second charging rail 501b, thereby providing an anode connection for charging the power supply 313. In this configuration, the charging rails 501a and 501b can provide some amount of charge through charging connections 320a and 320b each time the AMT 300 passes over the deck 218. Additionally, the charging rails 501a and 501b can also ensure that the AMT 300 stays on the desired path as it traverses the dock leveler 216.

In some embodiments, the AMT 300 can park on the deck 218, keeping the power supply 313 charged by making contact with the charging rails 501a and 501b between loading or unloading operations. In some embodiments, the deck 218, a pallet-preload position 802 (FIG. 8A), or another location can include an inductive charging element which can inductively charge the power supply 313 each time the AMT 300 is positioned near the inductive charging element. The inductive charging element can be in addition to or instead of the charging rails 501a and 501b.

Autonomous Dock Station System

Figure 6A:
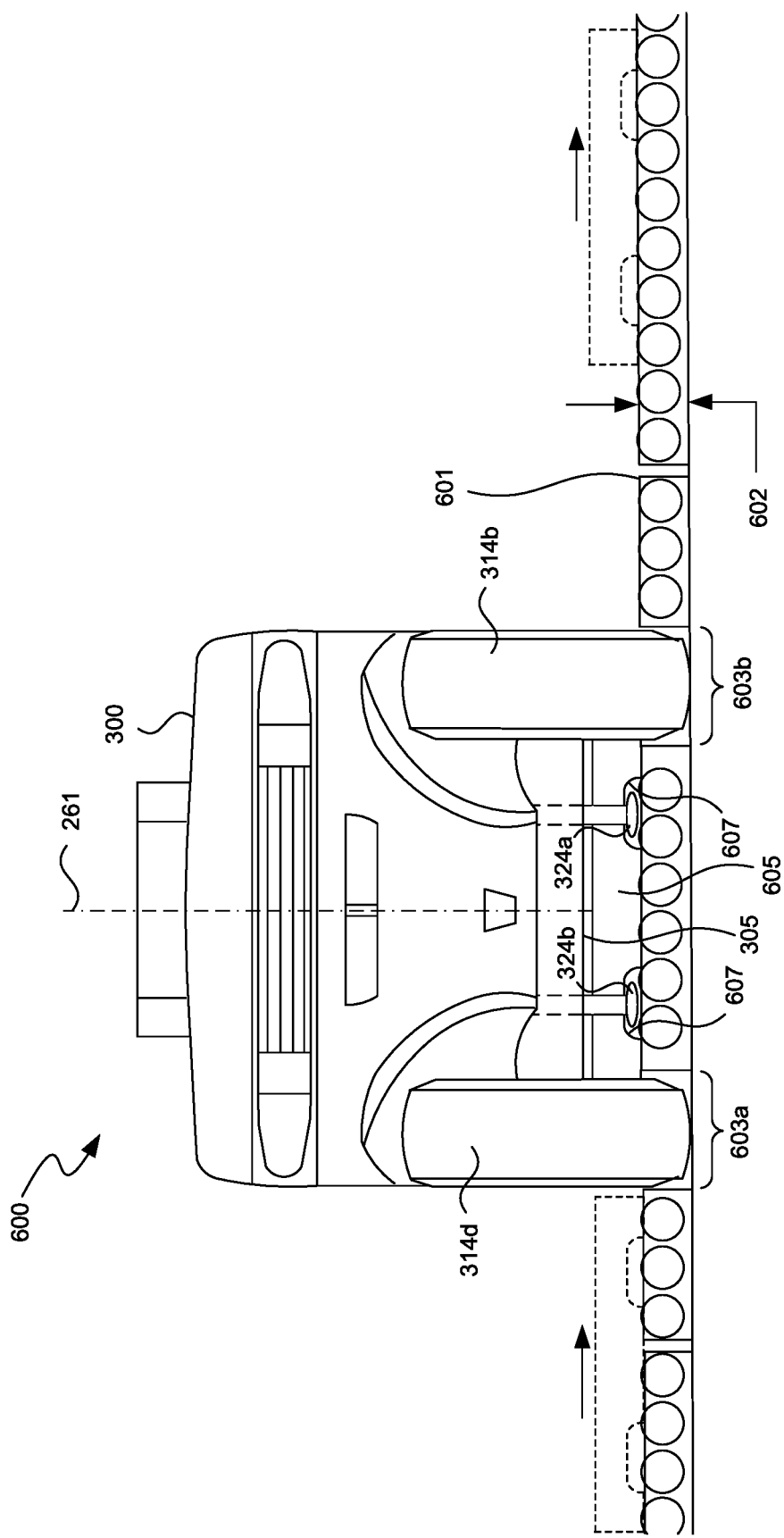
FIG. 6A is a partially schematic rear elevation view of an AMT at a dock station configured in accordance with some embodiments of the present technology.

FIG. 6A is a rear elevation view of an autonomous dock station system 600 including a pallet conveyor 601 and the AMT 300 configured in accordance with some embodiments of the present technology. The pallet conveyor 601 is configured to transport a pallet 605 to a pallet loading position 604. In some embodiments, the pallet conveyor 601 can include a motor connected to a conveyor line utilizing a series of rollers, belts, overlapping plates, and/or other suitable conveyer components well known in the art.

In some embodiments, the pallet loading position 604 can be centered on the dock station centerline 261 of the dock station 131 (FIGS. 2A and 2B). The pallet conveyor 601 can include wheel gaps or channels 603a and 603b which permit the AMT 300 to pass through the path of the pallet conveyor 601. The pallet conveyor 601 can be sized such that a height 602 of the pallet conveyor 601 is less than a clearance height 312 of the undercarriage 305 of the AMT 300 (FIG. 3B). This enables the AMT 300 to insert the forks 302 into pallet divots 607 and then drive forward over the conveyor 601 without impacting the pallet conveyor 601. The AMT 300 only needs to have a limited vertical movement range for the forks 302 (e.g., 6-12 inches) to raise the pallet 605 off the pallet conveyor 601 and then lower it to a safe height for traveling.

Figure 6C:
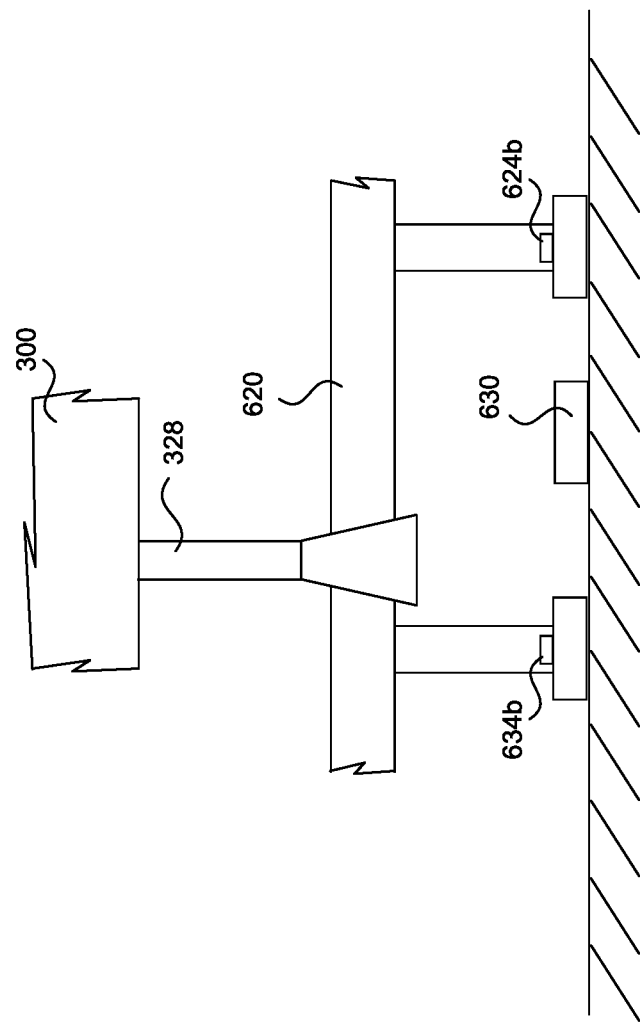
FIGS. 6B and 6C are front and side views, respectively, of a fixed guidance element engaged with a rail guide of an AMT for guiding movement of the AMT in accordance with some embodiments of the present technology.
Figure 6B:
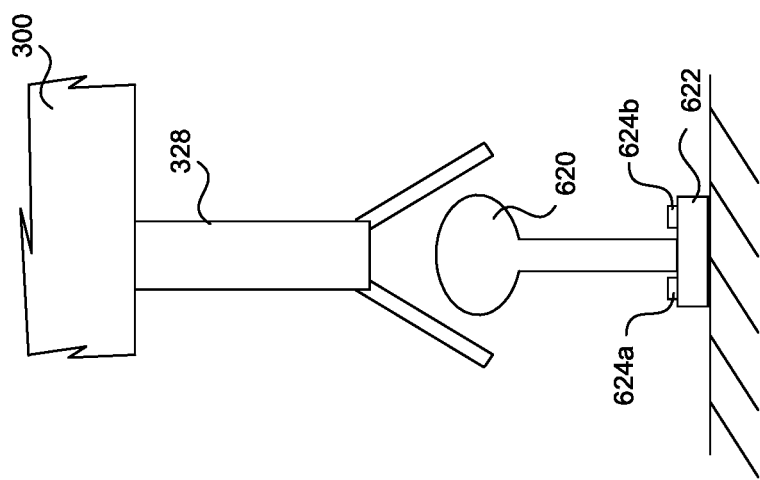

FIGS. 6B and 6C are front and side views, respectively, of the rail guide 328 of the AMT 300 engaged with a fixed guidance element or rail 620 for guiding movement of the AMT 300. In some embodiments, the rail 620 can be mounted to a surface of the dock station 131 (e.g., the deck 218 of the dock leveler 216, an adjacent floor, etc.) along a path, or a portion of a path, that the AMT 300 traverses during a trailer loading and/or unloading process (e.g., along a portion of the dock station centerline 261 (FIG. 2B)). The rail 620 can be positioned on the surface of the dock station using a plurality of suitable brackets 622 that are attached to the surface with fasteners 624a and 624b (e.g., bolts). In operation, the rail guide 328 movably engages the rail 620 as the AMT 300 traverses the path defined by the rail 620. In addition, in some embodiments a sensor target 630 (e.g., a metal medallion, RFID tag, etc.) can be fixed in, or to, the surface of the dock station at a particular location that corresponds to an action in a workflow procedure. When the fixed guidance sensor 326 on the AMT 300 (FIG. 3B) detects the target 630 and sends a corresponding signal to the truck control system 310, the truck control system 310 can take the corresponding action specified in the workflow procedure, such as raising or lowering the fork 302.

Figure 7A:
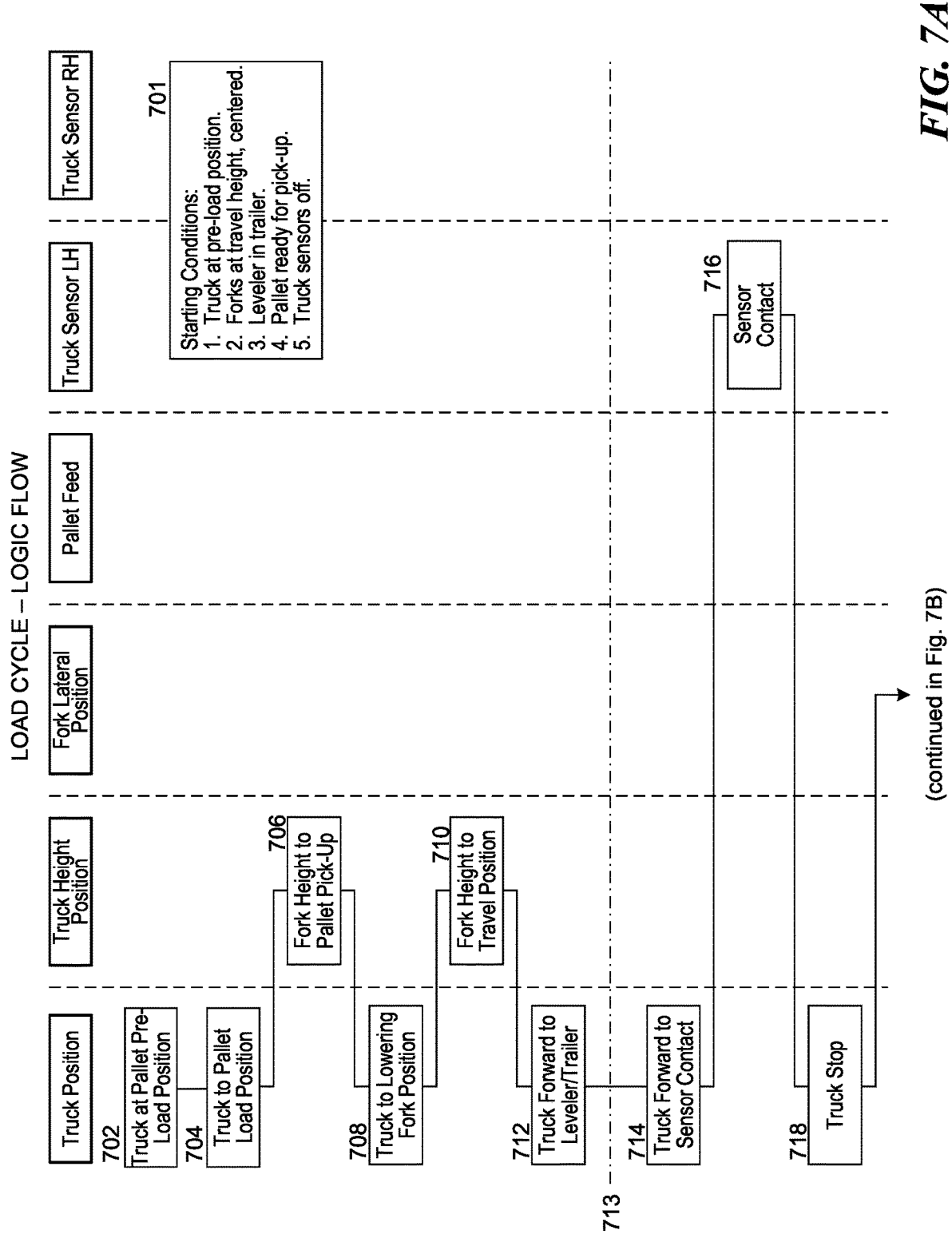
FIGS. 7A and 7B are flow diagrams illustrating an example workflow procedure for operating an AMT to automatically load a trailer, in accordance with some embodiments of the present technology.
Figure 7B:
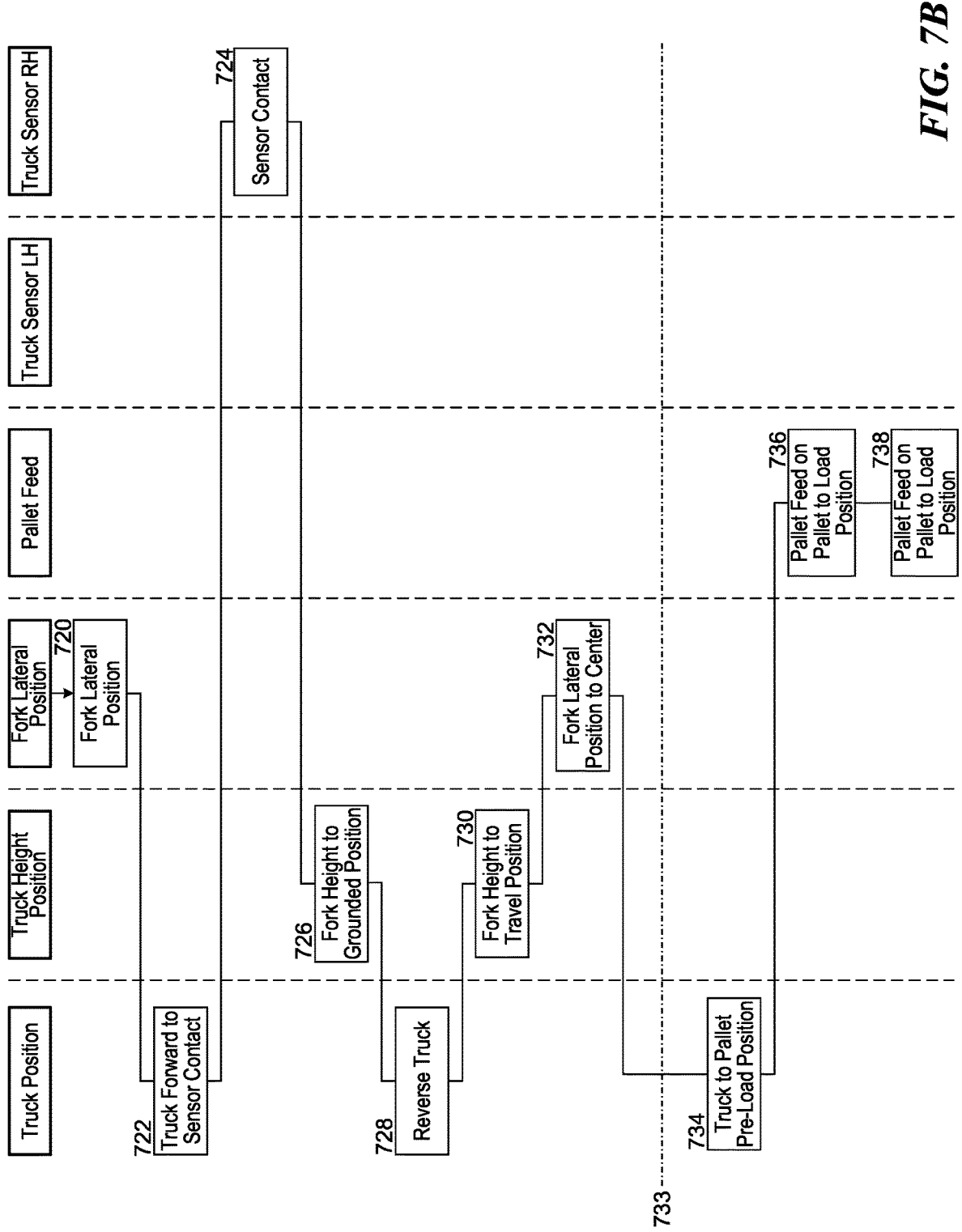
Figure 8A:
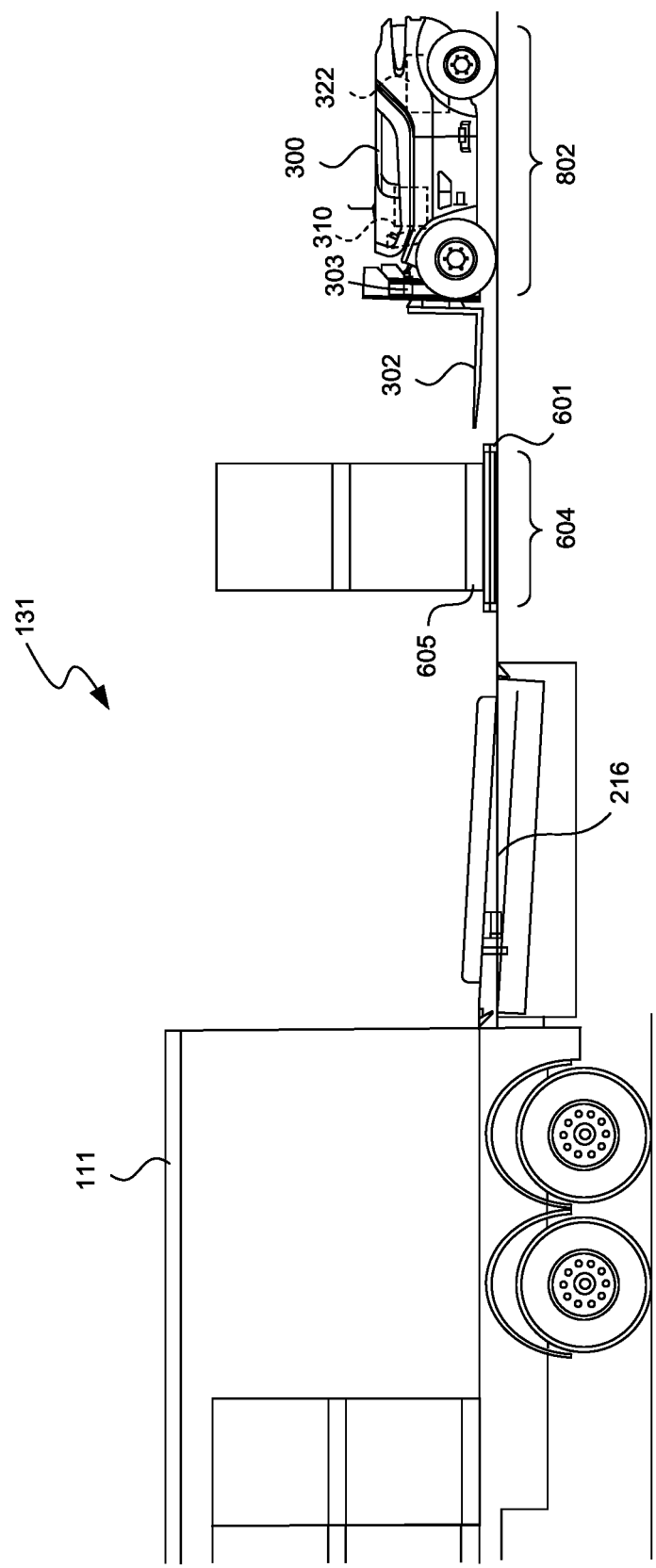
FIGS. 8A-8N are a series of partially schematic side elevation views illustrating a process for operating an AMT to automatically load a trailer, in accordance with some embodiments of the present technology.

FIGS. 7A and 7B are flow diagrams illustrating an example workflow procedure for using the AMT 300 to automatically load the trailer 111, in accordance with some embodiments of the present technology. FIGS. 8A-8N are a series of partially schematic side elevation views illustrating steps in the workflow procedure of FIGS. 7A and 7B, and FIGS. 9A-9L are a series of partially schematic top views illustrating steps in the workflow procedure of FIGS. 7A and 7B. In FIGS. 8A-8N, a sidewall of the trailer 111 is removed for purposes of illustration, and in FIGS. 9A-9L the roof of the trailer 111 is removed for purposes of illustration. Referring first to FIG. 7A, the workflow procedure can be preceded by actions to position the trailer 111 at the dock station 131 and engage the dock station 131 with the trailer 111 (FIGS. 1-2B). For example, the doors of the trailer 111 are opened and the trailer 111 is backed up to the dock station 131 by the tractor 112 (e.g., an OTR tractor or a special-use yard or terminal tractor, such as an autonomous tractor). The trailer presence sensor 260 detects the presence of the trailer 111 at the dock station 131 and the control panel 250 initiates a trailer engagement process. The trailer engagement process can include engaging the vehicle restraint 242 with the trailer 111 to prevent movement of the trailer 111 away from the dock station wall 212; opening the dock door 246; operating the dock leveler 216 to create a bridge between the dock station 131 and the interior of the trailer 111; and communicating with the central processing center 132 to indicate that the trailer 111 is at the dock station 131 and is ready for loading. The central processing center 132 can then communicate a load configuration and trailer configuration to the control panel 250 for use in the workflow procedure. The central processing center 132 also initiates operation of the pallet conveyor system 601, which moves the loaded pallet 605 to the pallet loading position 604 (FIG. 6A).

Figure 9A:
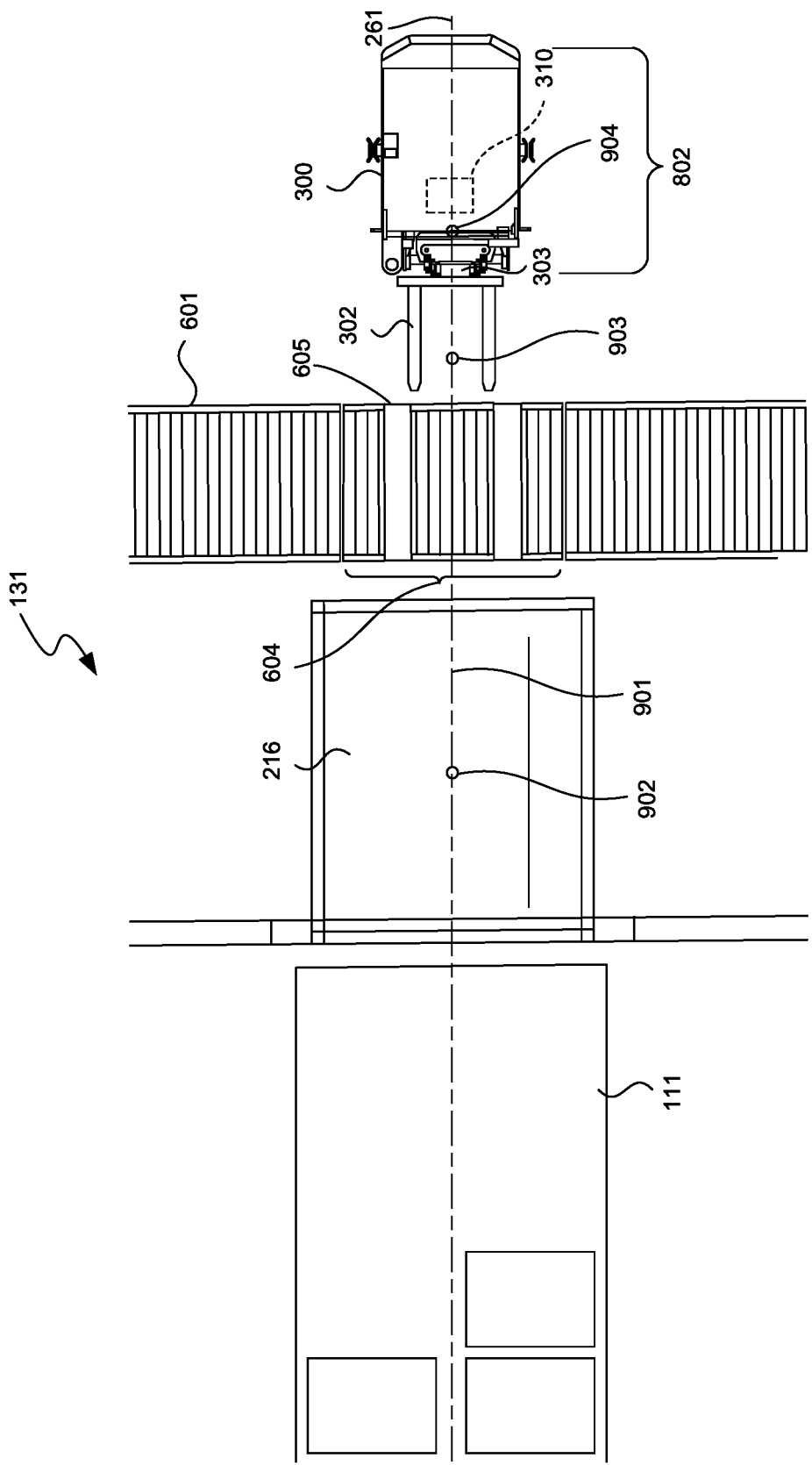

Referring to FIG. 7A together with FIGS. 8A and 9A, in addition to the pre-workflow actions described above, the workflow procedure can have starting conditions 701 for the workflow to begin. The workflow starting conditions 701 can include: 1) the AMT 300 is at a pallet-preload position 802 (FIGS. 8A and 9A; e.g., behind the pallet conveyor 601 or at another storage location); 2) the fork 302 is centered and positioned at a travel height; 3) the dock leveler 216 is positioned in the trailer 111; 4) the pallet 605 has been delivered by the pallet conveyor 601 to the pallet loading position 604; and 5) a trailer guidance system (e.g., including the sensor system 340) is turned off. In other embodiments, different starting conditions can be used.

The workflow procedure can begin at step 702 when the AMT 300 is at the pallet pre-load position 802. For example, this can be when the AMT 300 is at a different dock station or at a charging and/or storage location, which can be defined by a fixed guidance element e.g., the fixed guidance element 904 and/or a rail 901. The truck control system 310 can cause the fork boom 303 to move the fork 302 to a height above the height 602 on the pallet conveyor 601, for insertion into the divots 607 of the pallet 605 in the pallet load position 604 (FIG. 6A). In some embodiments, the fixed guidance elements 901-904 can be sensor targets that respond to EM radiation in predictable ways. For example, the sensor targets can be RFID tags that can be read by an RFID reader of the fixed guidance sensor 326 (FIG. 3B) or can be a particular type and amount of metal that the sensor 326 with a magnet can identify.

Figure 8B:
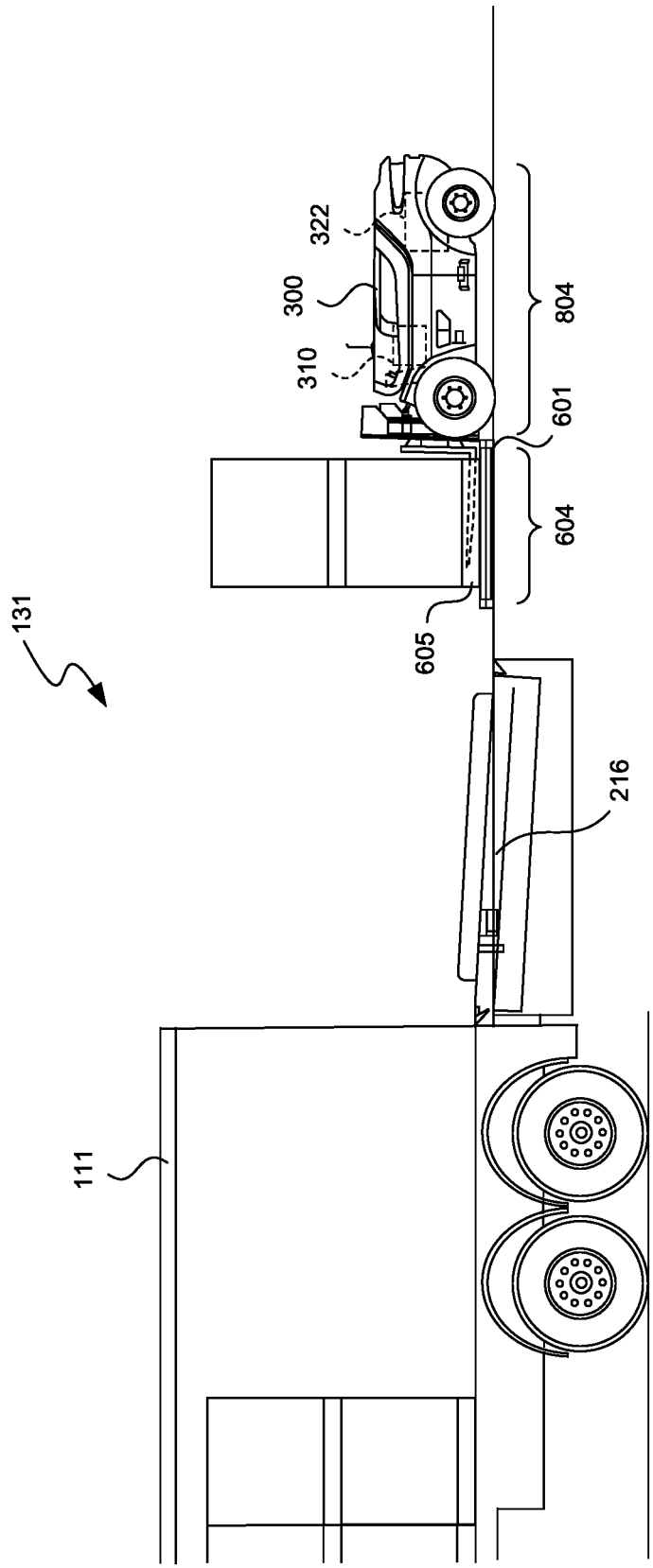
Figure 9B:
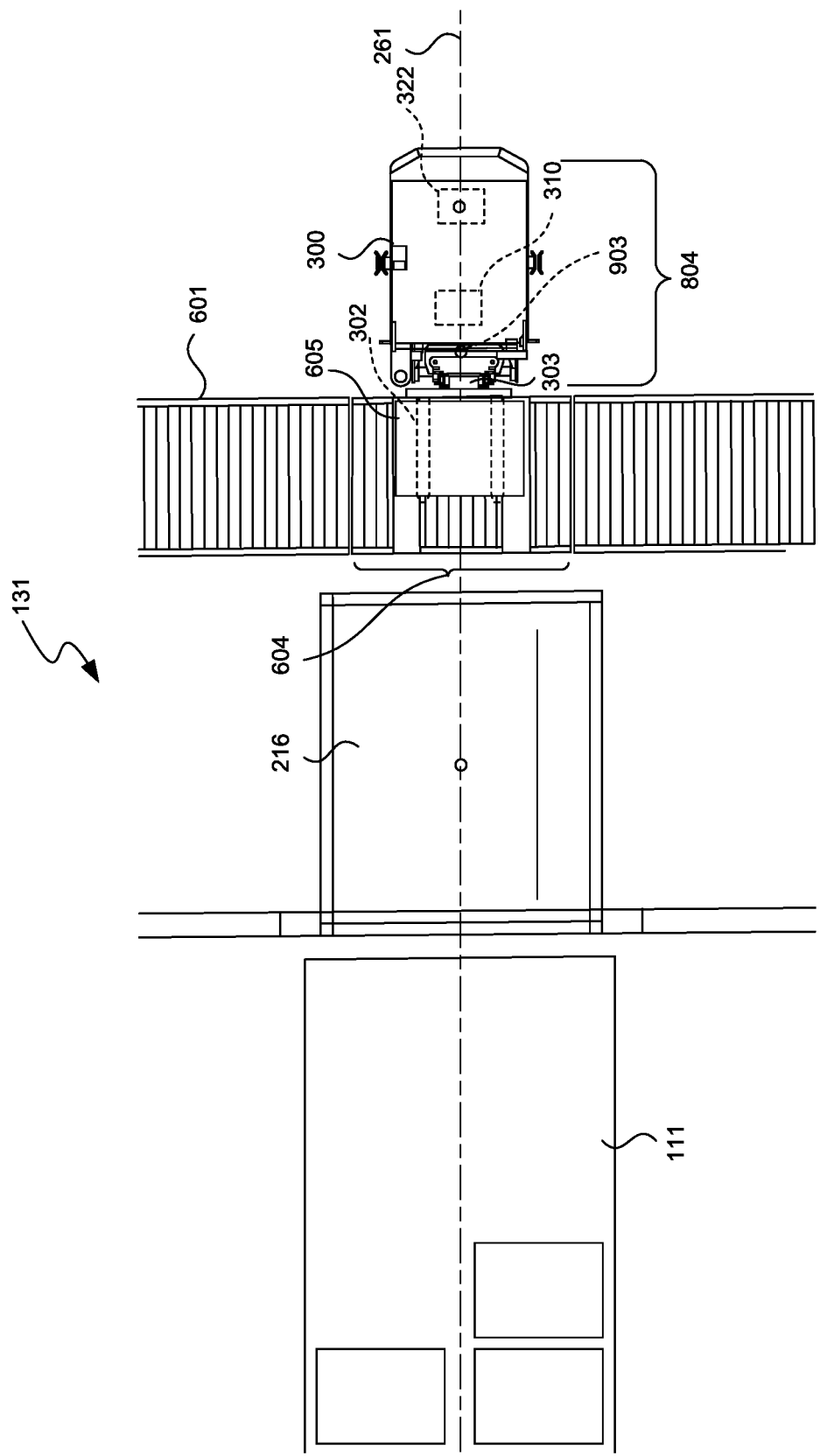

From the pallet pre-load position 802, the truck control system 310 and the workflow procedure can, at step 704, cause the drive system 322 of the AMT 300 to move the AMT 300 along the dock station centerline 261 from the pallet pre-load position 802 to a loading position 804 where the fork 302 of the AMT 300 is under the pallet 605 at the pallet load position 604 (shown in FIGS. 8B and 9B). The loading position 804 can be specified by one or more of the fixed guidance elements, e.g., the fixed guidance element

Figure 8C:
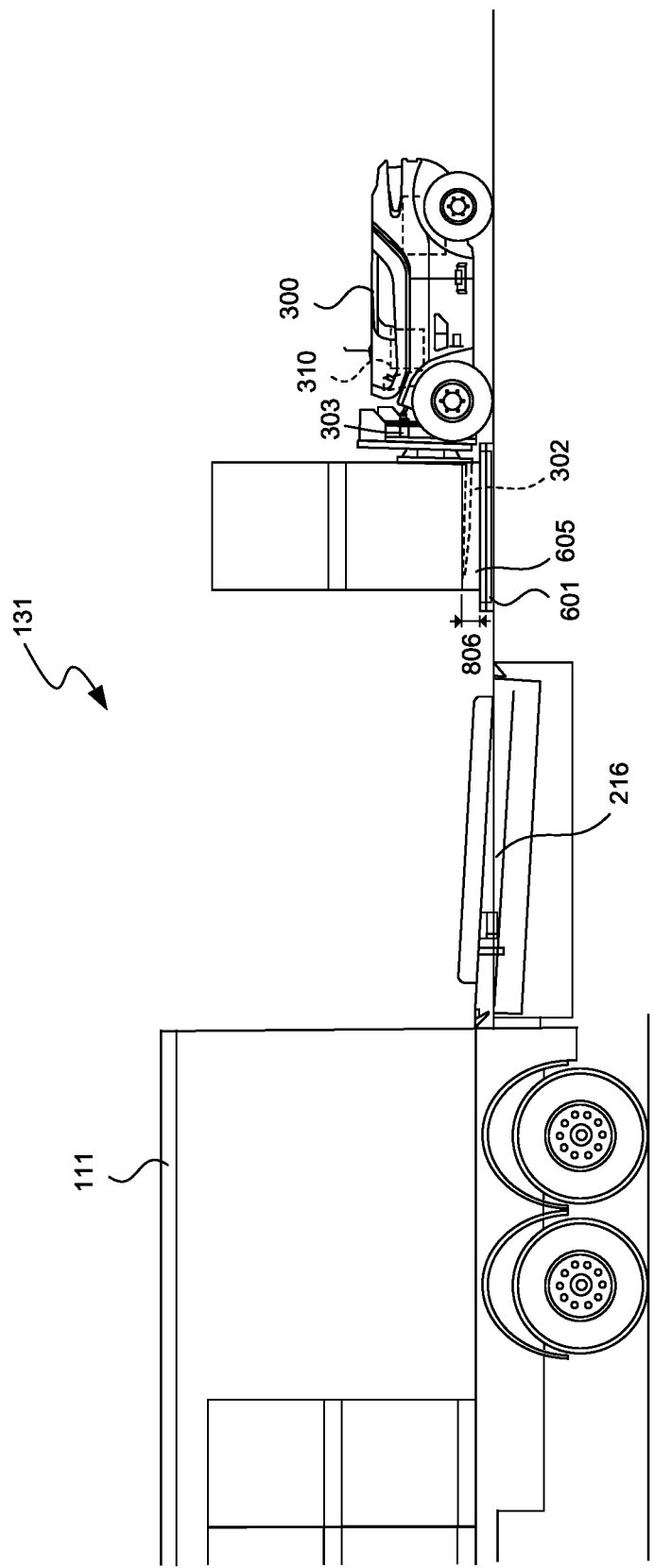

903. Next, the truck control system 310 and the workflow procedure can, at step 706, cause the fork boom 303 to raise the fork 302 a distance 806 to engage the fork 302 with the pallet 605 and lift the pallet 605 off the pallet conveyor 601 (as shown in FIG. 8C).

Figure 8D:
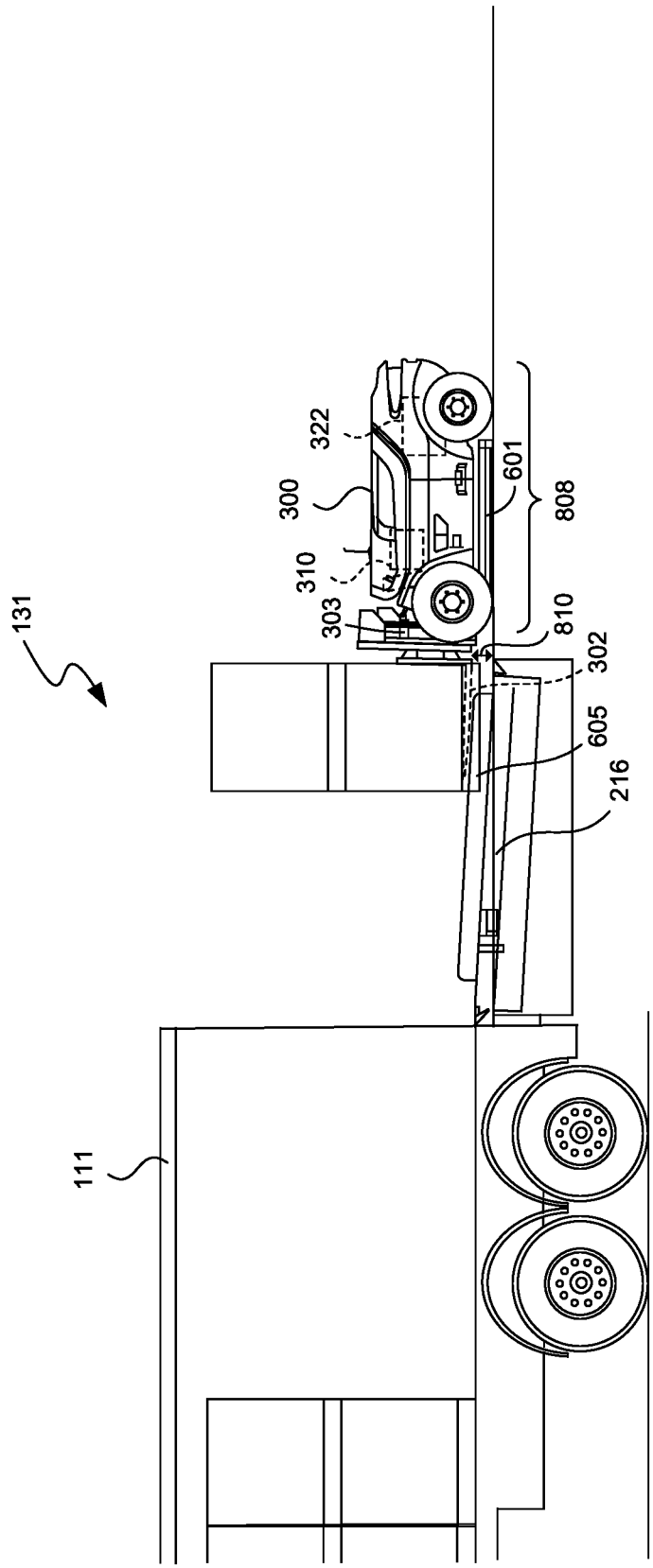
Figure 8E:
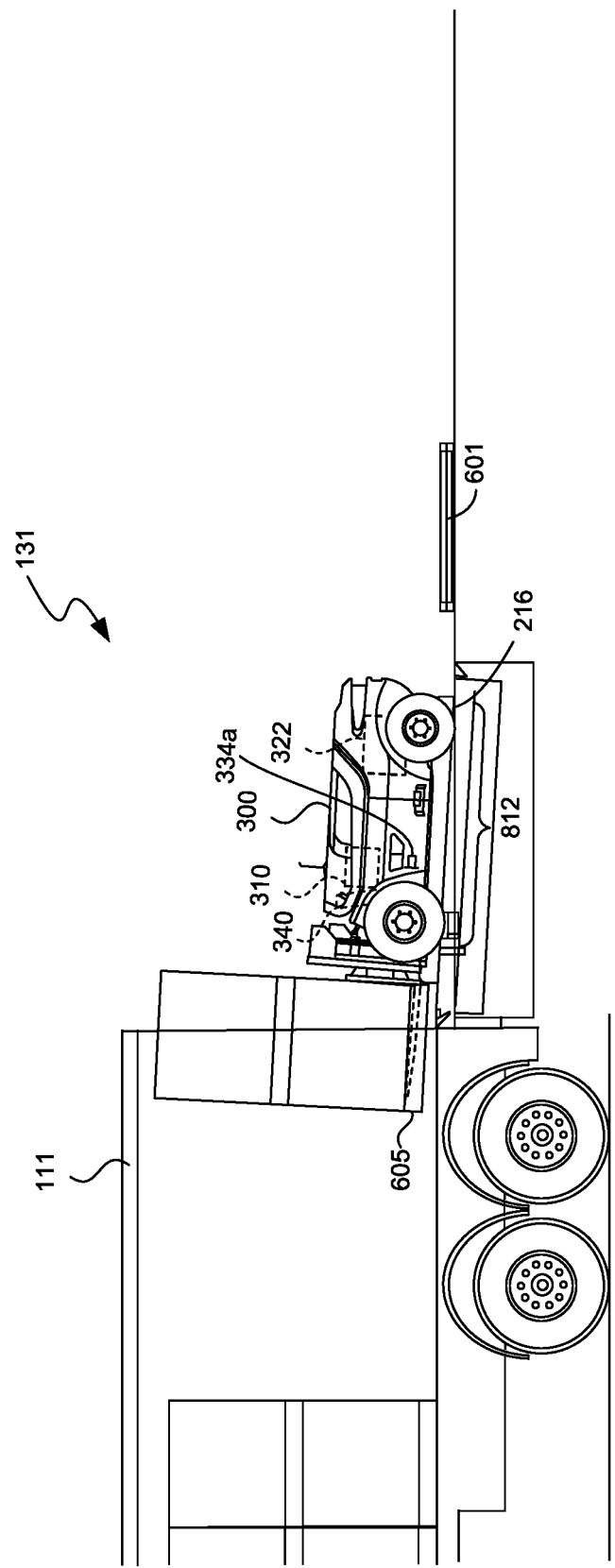
Figure 8F:
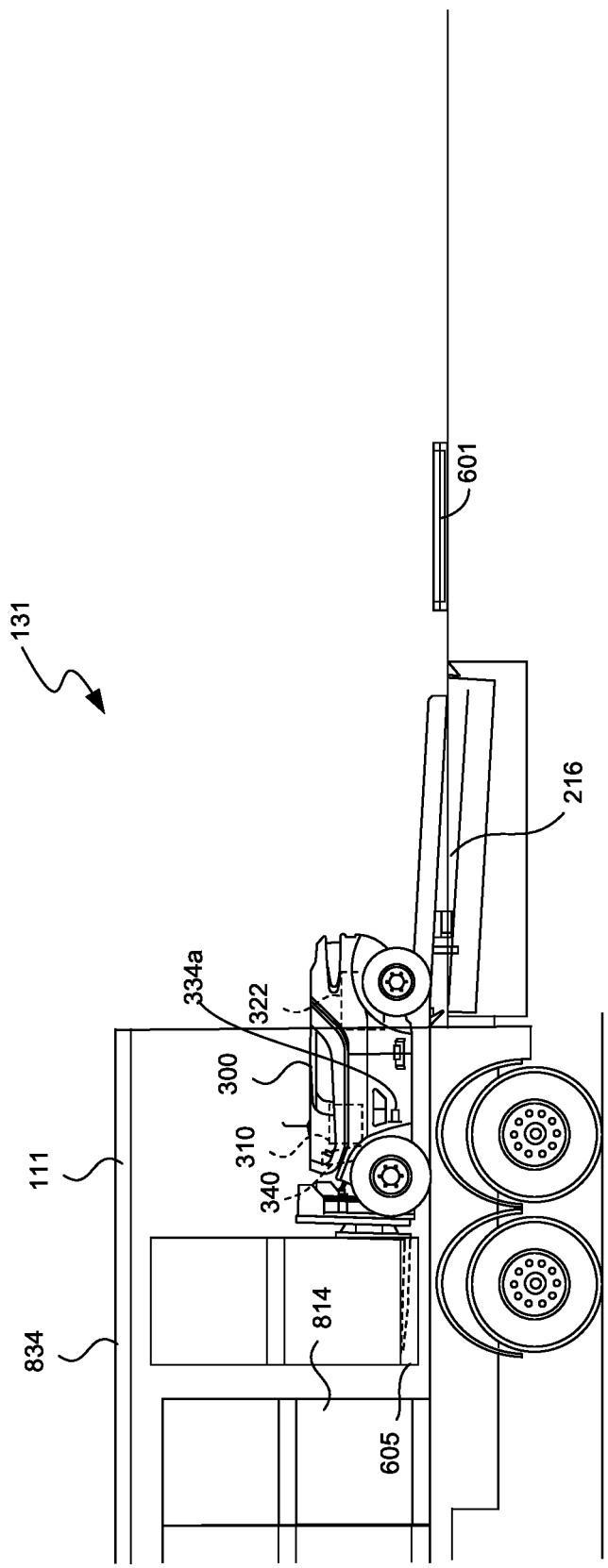
Figure 9C:
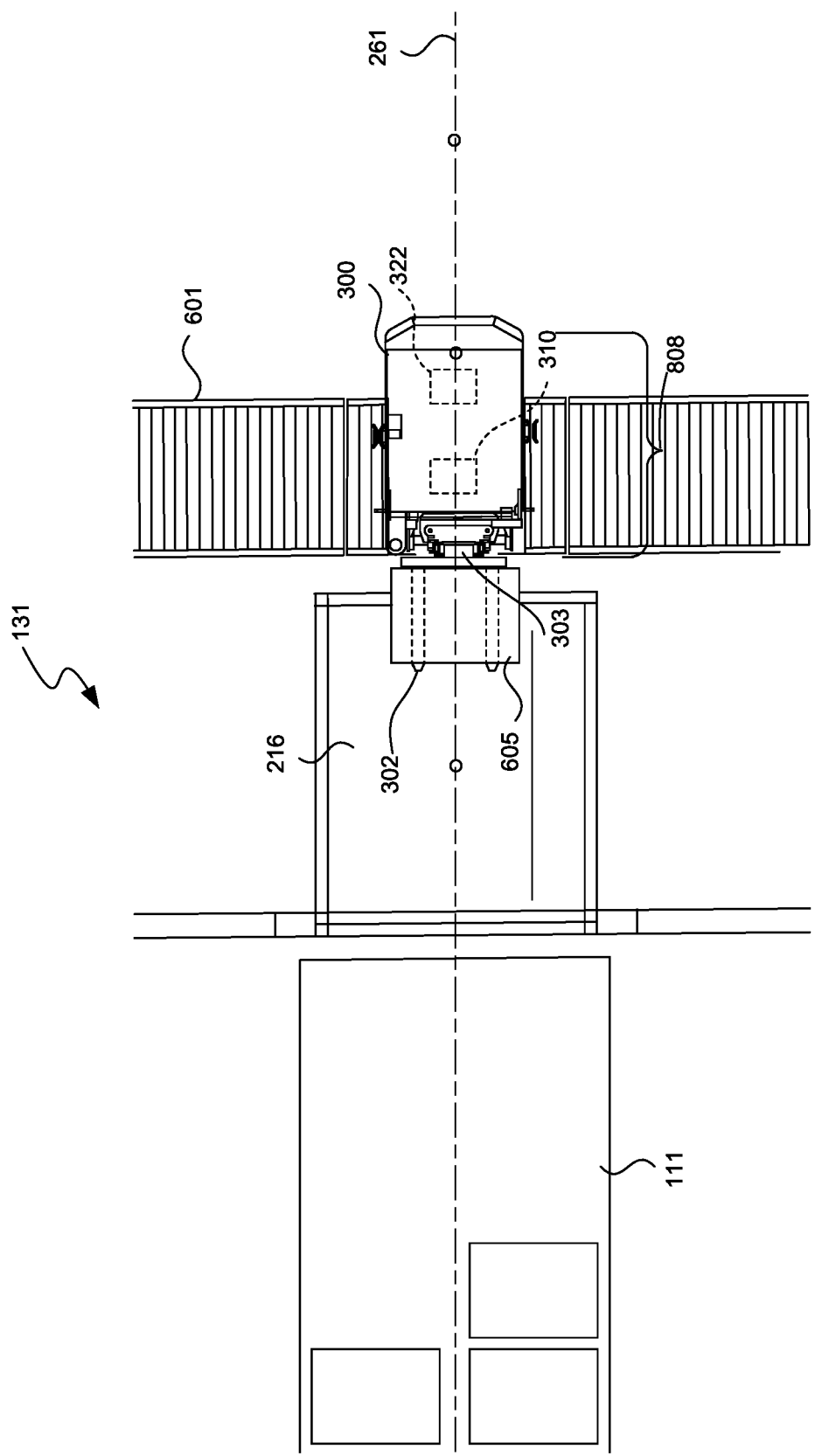
Figure 9D:
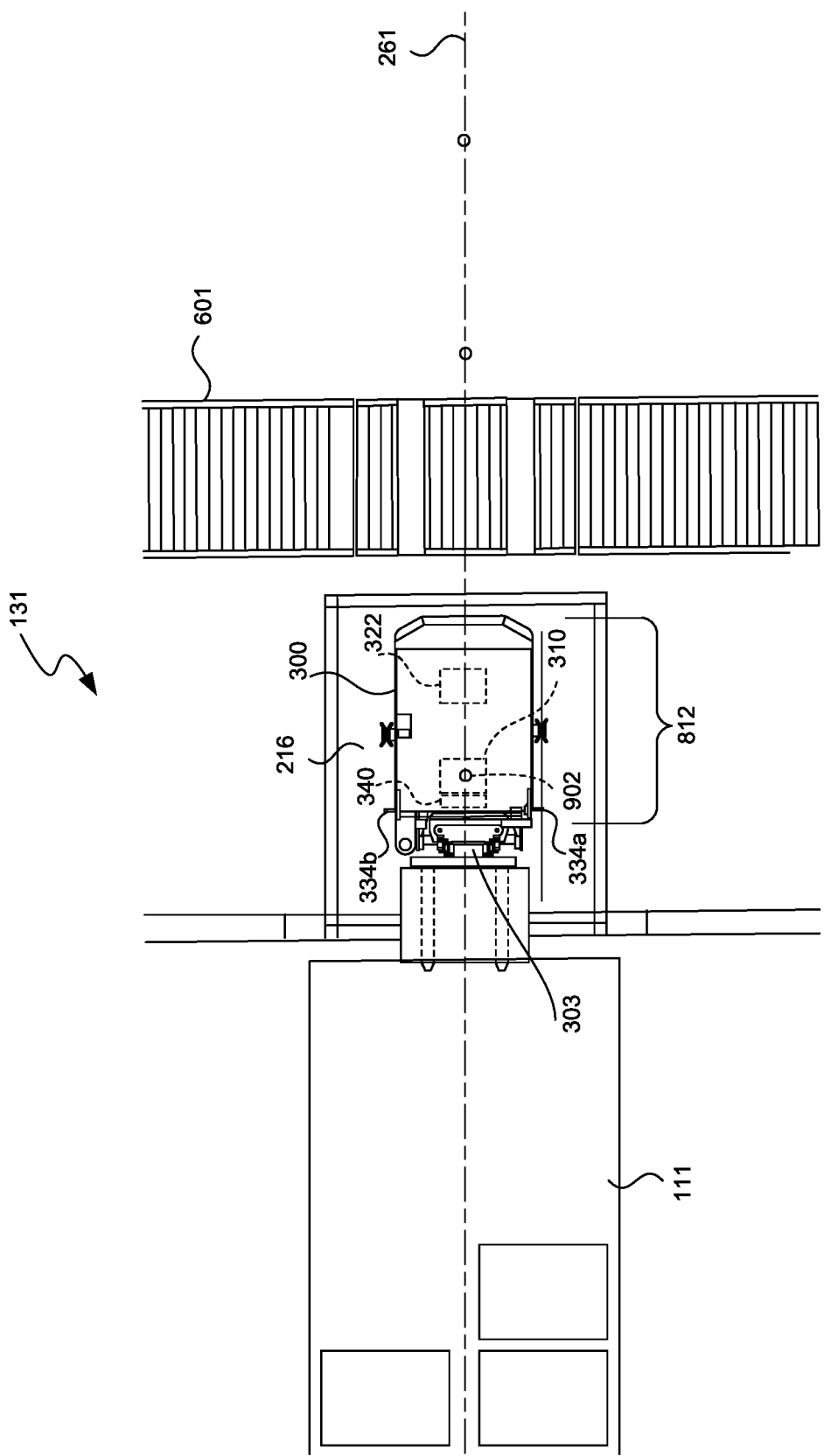

Once the pallet 605 is lifted off the pallet conveyor 601, the truck control system 310 and the workflow procedure can, at step 708, cause the drive system 322 of the AMT 300 to move the AMT 300 forward along the dock station centerline 261 from the pallet load position 604 to a lowering fork position 808 (shown in FIGS. 8D and 9C). When the AMT 300 is at the lowering fork position 808, the truck control system 310 and the workflow procedure can, at step 710, cause the fork boom 303 to lower the fork 302 to a traveling height 810 (a specified distance above the dock floor, e.g., about four inches).

When the fork 302 is at the traveling height 810, the truck control system 310 and the workflow procedure can, at step 712, cause the drive system 322 of the AMT 300 to move the AMT 300 forward along the dock station centerline 261 from the fork lowering position 808 to a guidance switch position 812 (show in FIGS. 8E and 9D), which can be specified by one of the fixed guidance elements, e.g., the fixed guidance element 902 on the dock leveler 216. At the guidance switch position 812, the truck control system 310 and the workflow procedure can transition guidance of the AMT 300 from using the facility guidance system and the fixed guidance elements to using a trailer guidance system based on, e.g., the sensor system 340 and the sensors 330a and 330b of the AMT 300. The transition of the truck control system 310 from using the facility guidance system to using the trailer guidance system is denoted by line 713 in FIG. 7A.

Figure 8G:
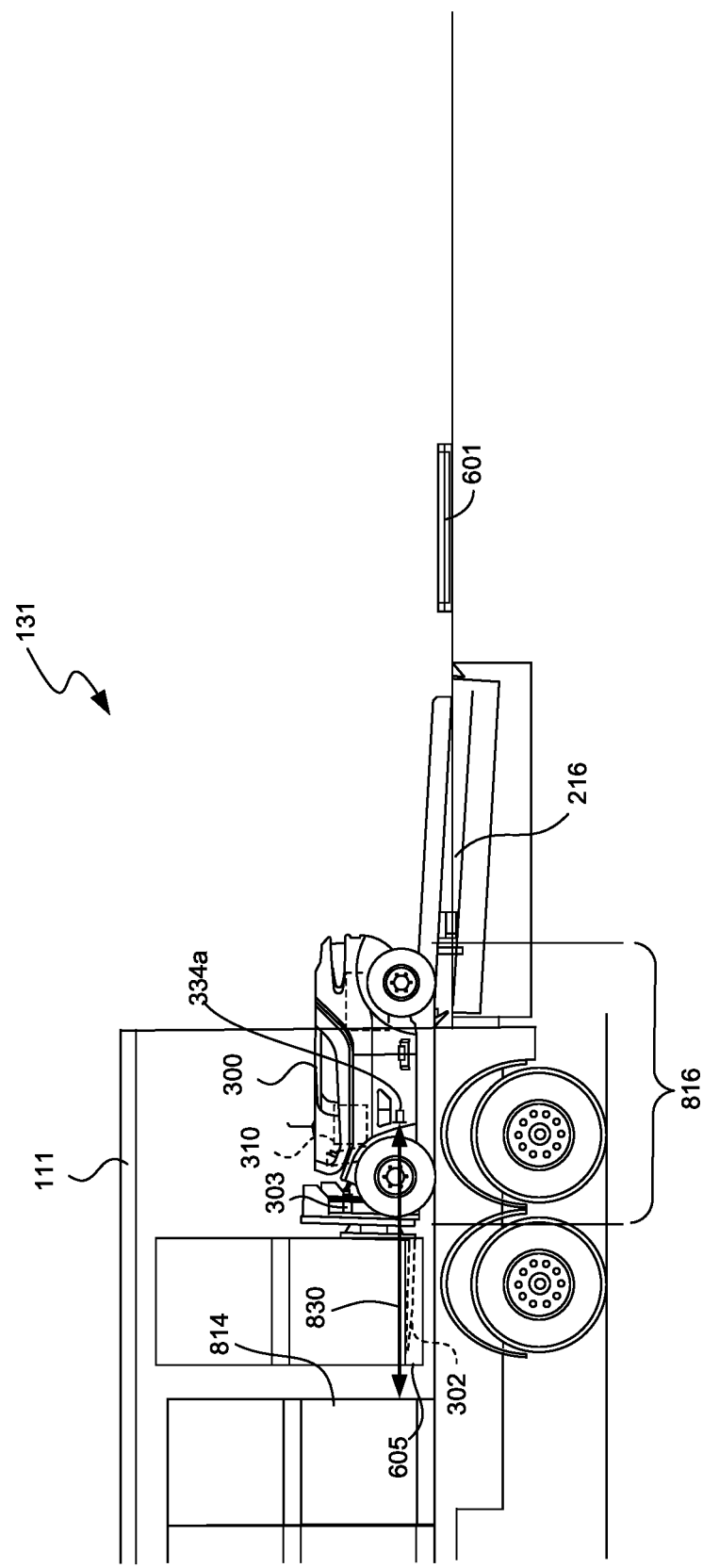
Figure 8H:
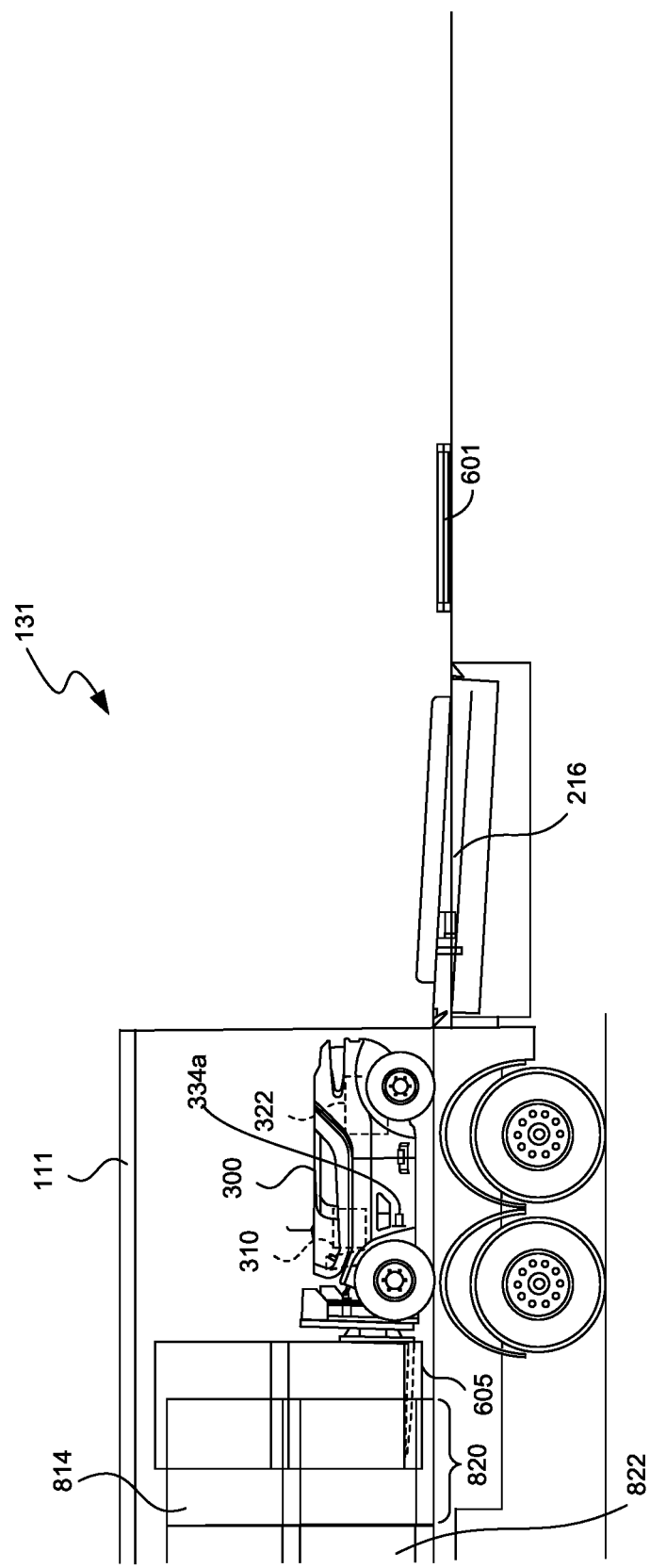
Figure 8I:
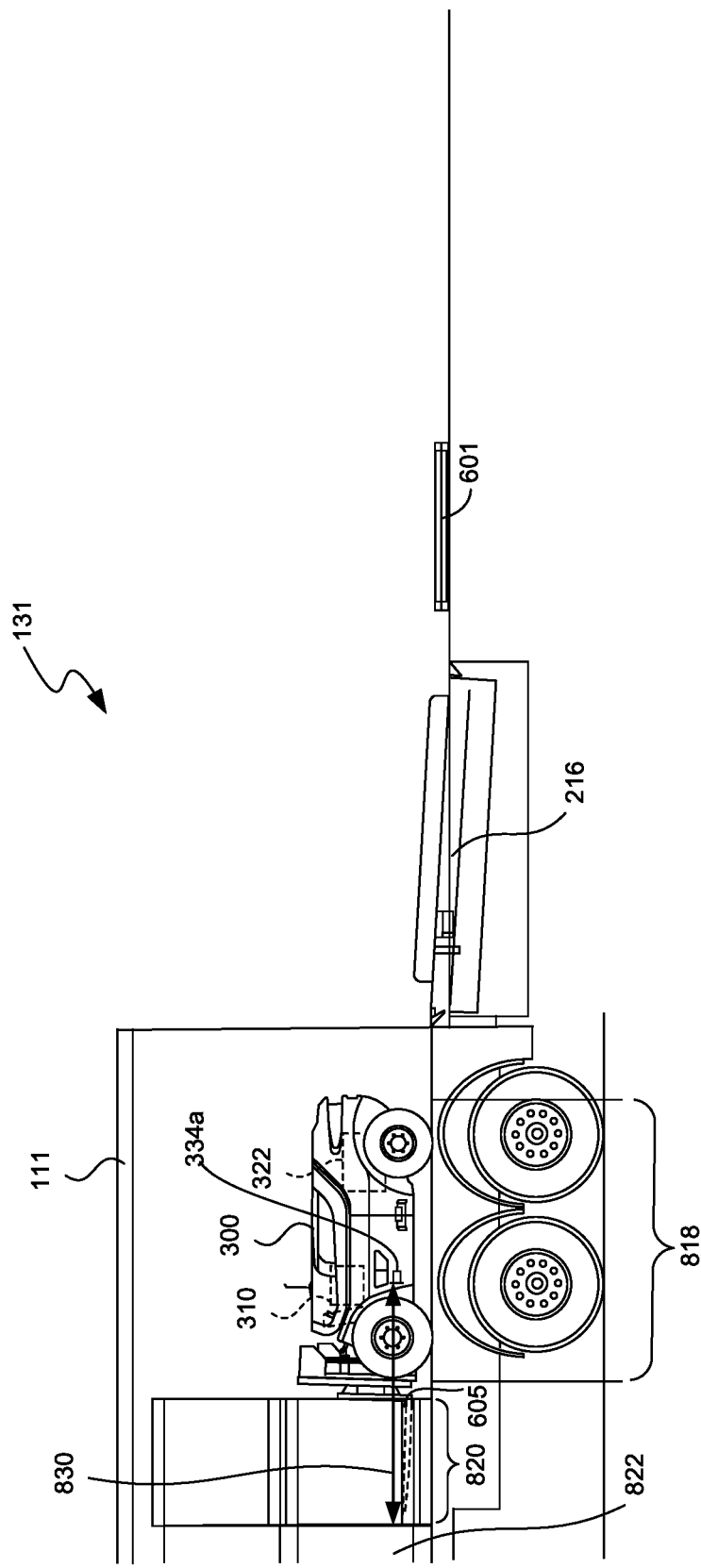
Figure 9E:
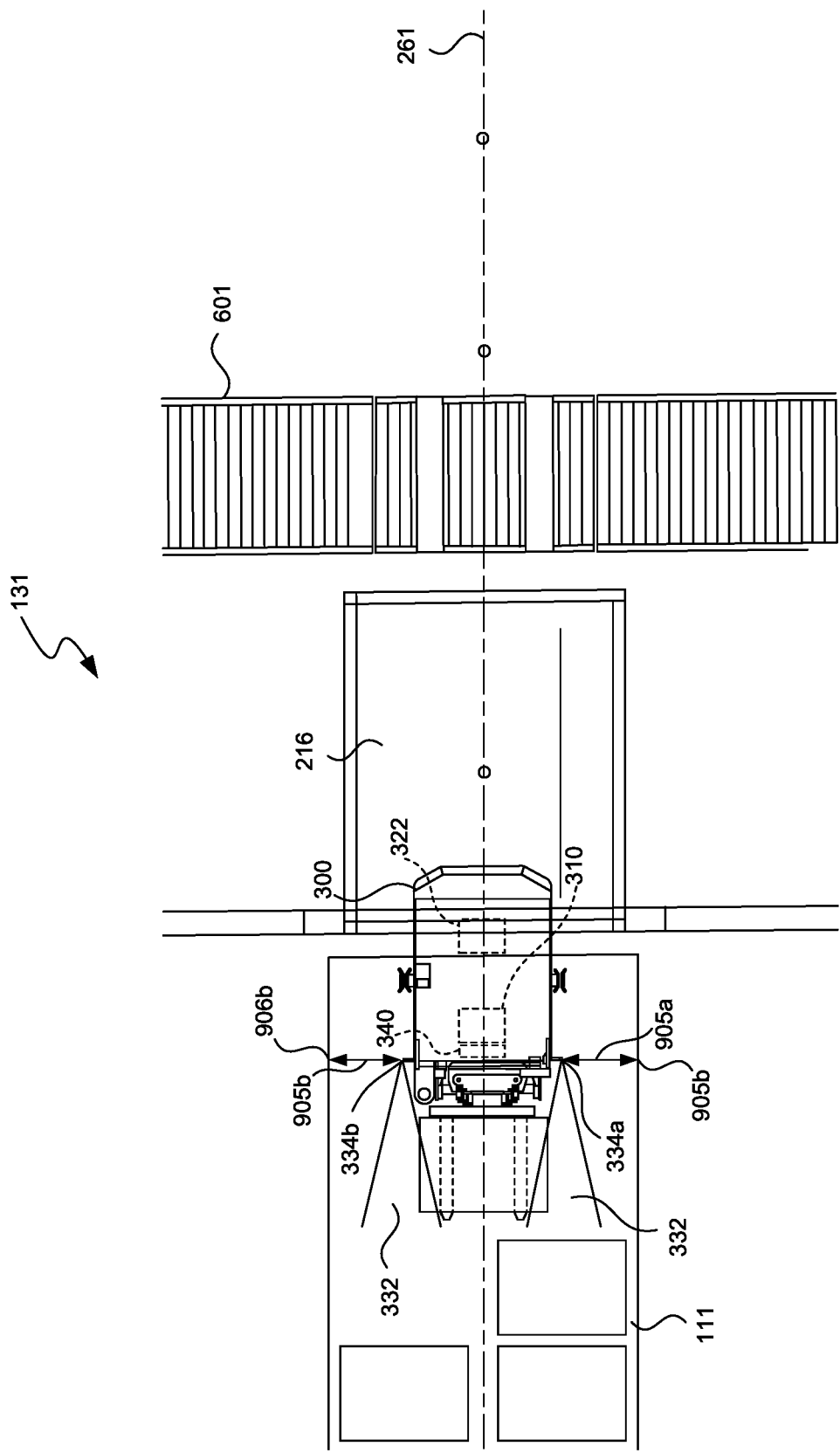
Figure 9F:
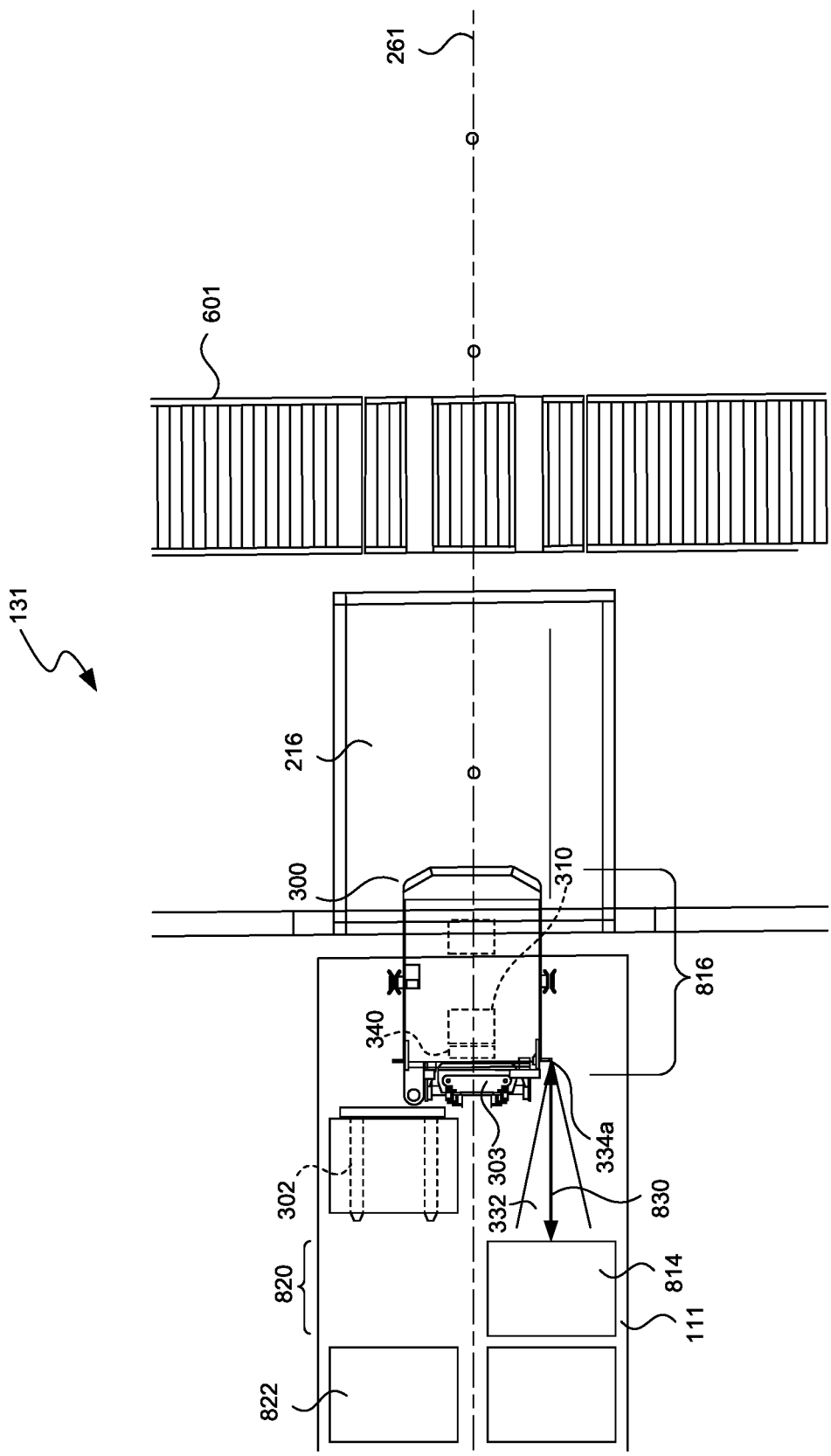
Figure 9H:
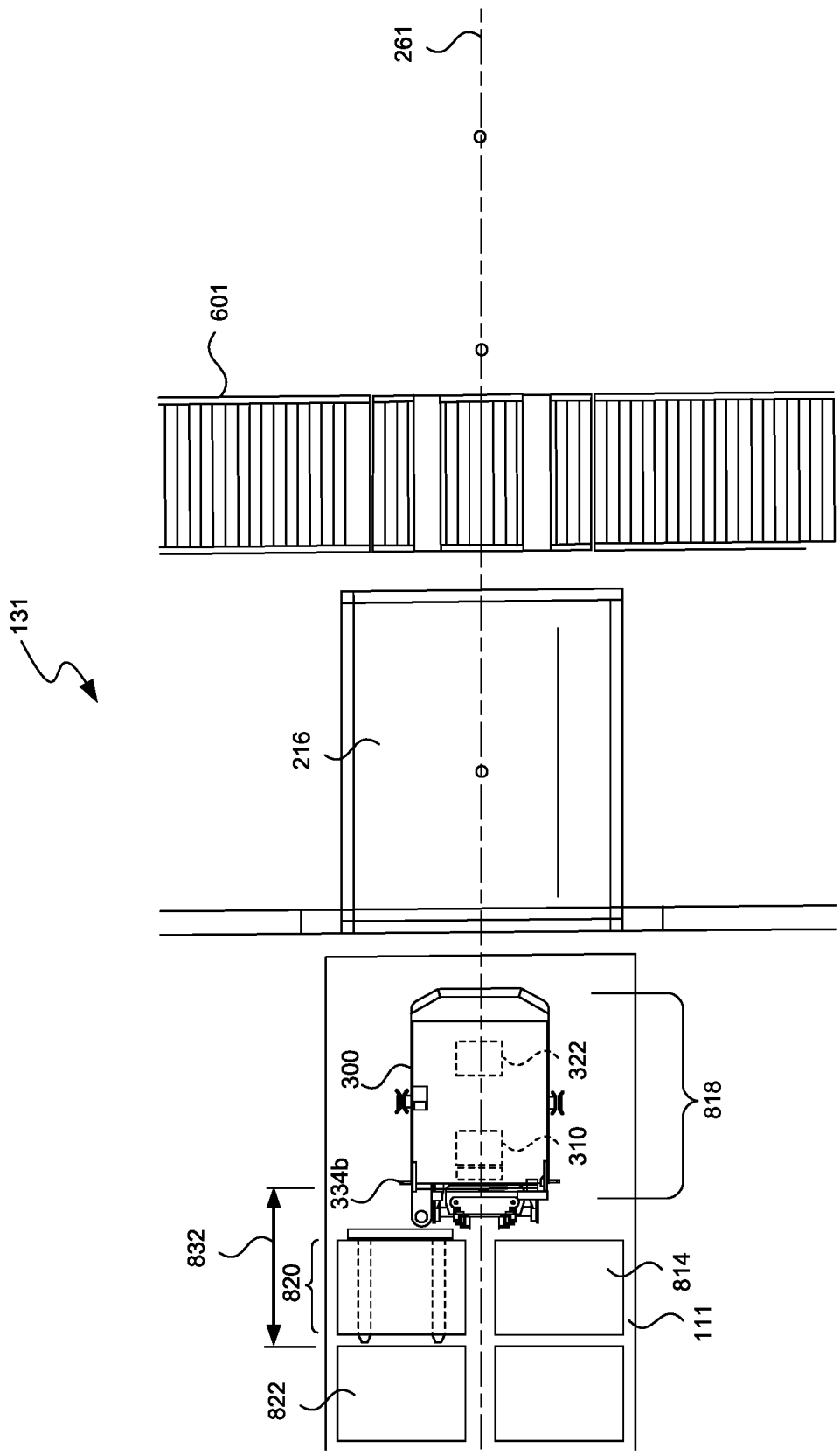

As described in greater detail below in reference to steps 714-724, once the AMT 300 enters the trailer 111, the truck control system 310 can identify a fork lateral position 816 (FIGS. 8G and 9F), a truck unloading position 818 (FIGS. 8I and 9H), and a pallet unloading position 820 (FIGS. 8H, 8I and 9H). The pallet unloading position 820 is a location in the trailer 111 where the AMT 300 will place the pallet 605. The fork lateral position 816 is a location in the trailer 111 where the AMT 300 will be positioned when it uses the fork boom 303 to move the fork 302 holding the pallet 605 laterally to be aligned with the pallet unloading position 820. The truck unloading position 818 is a location in the trailer 111 where the AMT 300 will be positioned when it uses fork boom 303 to lower the laterally positioned fork 302 to place the pallet 605 on the floor of the trailer 111 in the pallet unloading position 820. As described below, the truck control system 310 can determine these locations based on signals from the front sensors 330b and/or a record of where the AMT 300 deposited one or more previous pallets.

At step 714, the truck control system 310 and the workflow procedure can cause the drive system 322 to move the AMT 300 forward along the dock station centerline 261 within the trailer 111 (FIG. 9E). The truck control system 310 can use signals from the side sensors 330a to maintain the AMT 300 on or near the dock station centerline 261 by maintaining a first constant distance 905a and/or a second constant distance 905b to one or both inner side walls 906a and/or 906b of the trailer 111. As the truck control system 310 and the workflow procedure cause the AMT 300 to move forward along the dock station centerline 261, they can also, at step 716, determine when the front sensors 330b detect an obstruction 814 (e.g., stacked cargo) in an area 332 (FIG. 3D) forward of the AMT 300 (shown in FIGS. 8F and 9E).

The truck control system 310 and the workflow procedure can, at block 718, cause the drive system 322 of the AMT 300 to continue moving the AMT 300 forward along the dock station centerline 261 until the AMT 300 reaches the fork lateral position 816 (shown in FIGS. 8G and 9F). The truck control system 310 can identify the fork lateral position 816 as a position at a distance 830 from the obstruction 814 that is sufficient to prevent the pallet 605 on the fork 302 from colliding with the obstruction 814 (which can be increased by a safety margin). The distance 830 can be based on a known length of the pallet 605.

Alternatively, in some embodiments, the fork lateral position 816 can be determined based on a known length of the trailer 111 and/or a record of a distance from, e.g., the guidance switch position 812 to a position at which the AMT 300 deposited a previous pallet. In some embodiments, the truck control system 310 can rely on both a known distance and the front sensors 330b by, e.g., relying on the known distance to initially identify an expected obstruction location and relying on signals from the front sensors 330b to fine-tune the expected obstruction location and prevent a collision.

The truck control system 310 can analyze the sensed obstruction 814 to determine whether it is on both sides of the dock station centerline 261 or only on one side. In the case where the obstruction 814 is only on one side of the dock station centerline 261 (the case shown in, e.g., FIGS. 8G and 9F), this can indicate that there is an open space 820 for the pallet 605 on the other side of the centerline 261, which the truck control system 310 can identify as the pallet unload position 820. If the obstruction 814 is on both sides, this can indicate that the obstruction 814 is one of: the back of the trailer 111, two pallets positioned side-by-side, or another object taking up both sides of the trailer 111. In any of these conditions where both sides of the dock station centerline 261 are obstructed, the truck control system 310 can identify the pallet unload position 820 as being on a default side of the dock station centerline 261 (e.g., the truck control system 310 can by default select the left side of the dock station centerline 261 to place the pallet 605).

Figure 8J:
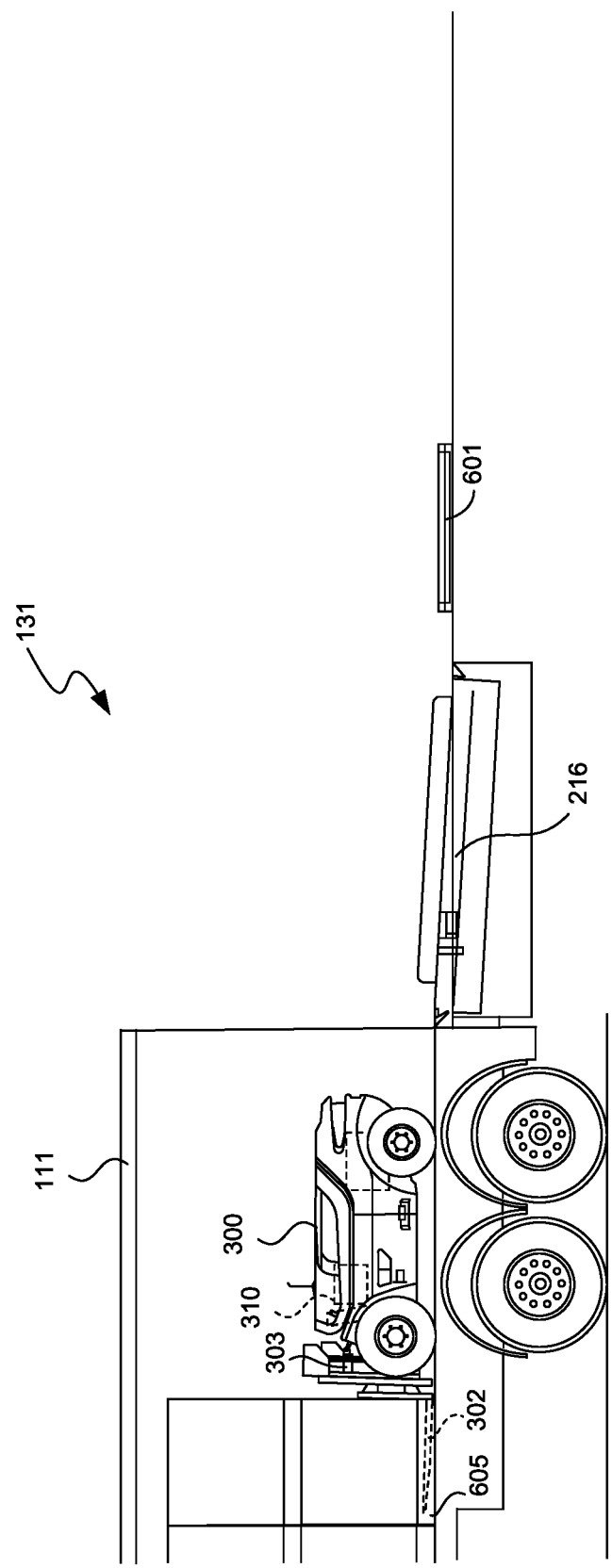

When the AMT 300 is at the fork lateral position 816, the workflow procedure, at step 720, can cause the fork boom 303 to move the fork 302 laterally (as shown in FIG. 9F) to align with the identified pallet unloading position 820. If (contrary to what is shown in FIG. 9F) both sides of the dock station centerline 261 are obstructed, then the AMT 300 will be in the truck unload position 818 and the fork 302 will be over the pallet unload position when the fork 302 is in the position shown in FIG. 9F. However, when only one side of the dock station centerline 261 is obstructed as shown in FIG. 9F, the fork 302 is a pallet-distance in front of the pallet unload position 820. In this case, the truck control system 310 and the workflow procedure can, at step 722, cause the drive system 322 to move the AMT 300 forward (as shown in FIGS. 8H and 9G) until the AMT 300 is in the truck unloading position 818 and the fork 302 is over the pallet unload position 820 (as shown in FIGS. 8I and 9H). The truck control system 310 can determine the AMT 300 is in the truck unloading position 818 by making a measurement, based on a signal from one or more of the front sensors 330b received at step 724, indicating that the AMT 300 is the specified distance 832 (e.g., based on the length of the pallet 605 plus a safety margin) from a second obstruction 822. The AMT 300 is now in the truck unload position 818 and the fork 302 holding the pallet 605 is now over the pallet unload position 820. The truck control system 310 and the workflow procedure can, at step 726, cause the fork boom 303 to lower the fork 302 (as shown in FIG. 8J) to position the pallet 605 on the floor of the trailer 111 and disengage the fork 302 from the pallet 605. This can be a specified lowering distance (e.g., four inches) or a determination, based on pressure sensors positioned on, e.g., the fork boom 303, that the fork 302 is no longer supporting the weight of the pallet 605.

Figure 8K:
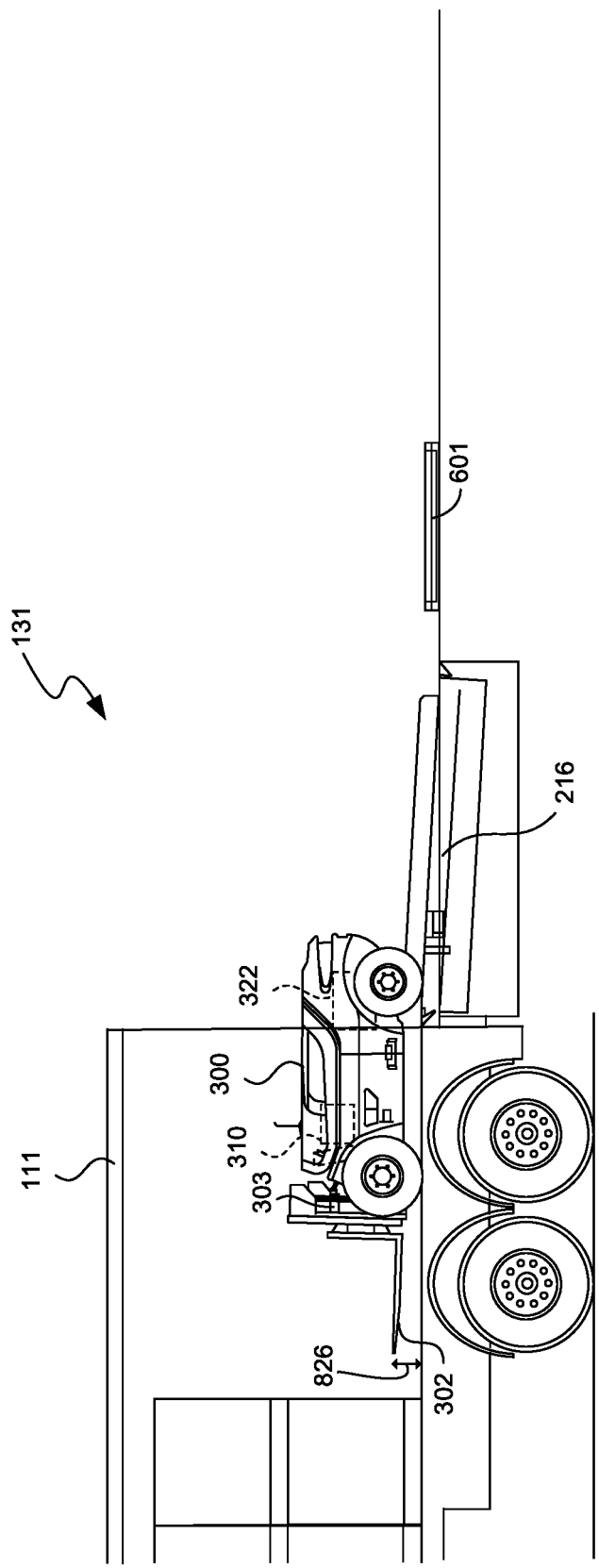
Figure 9I:
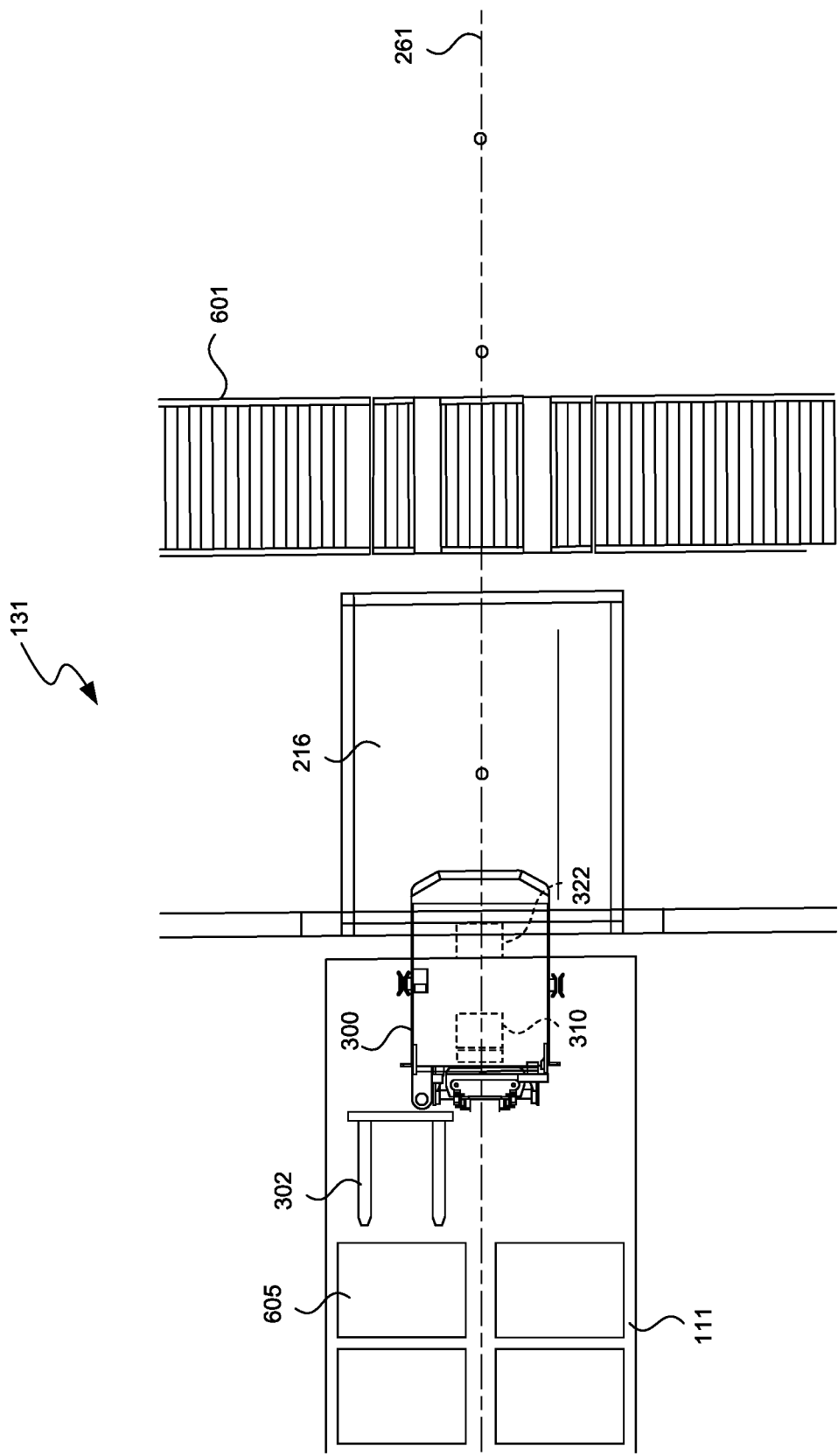
Figure 9J:
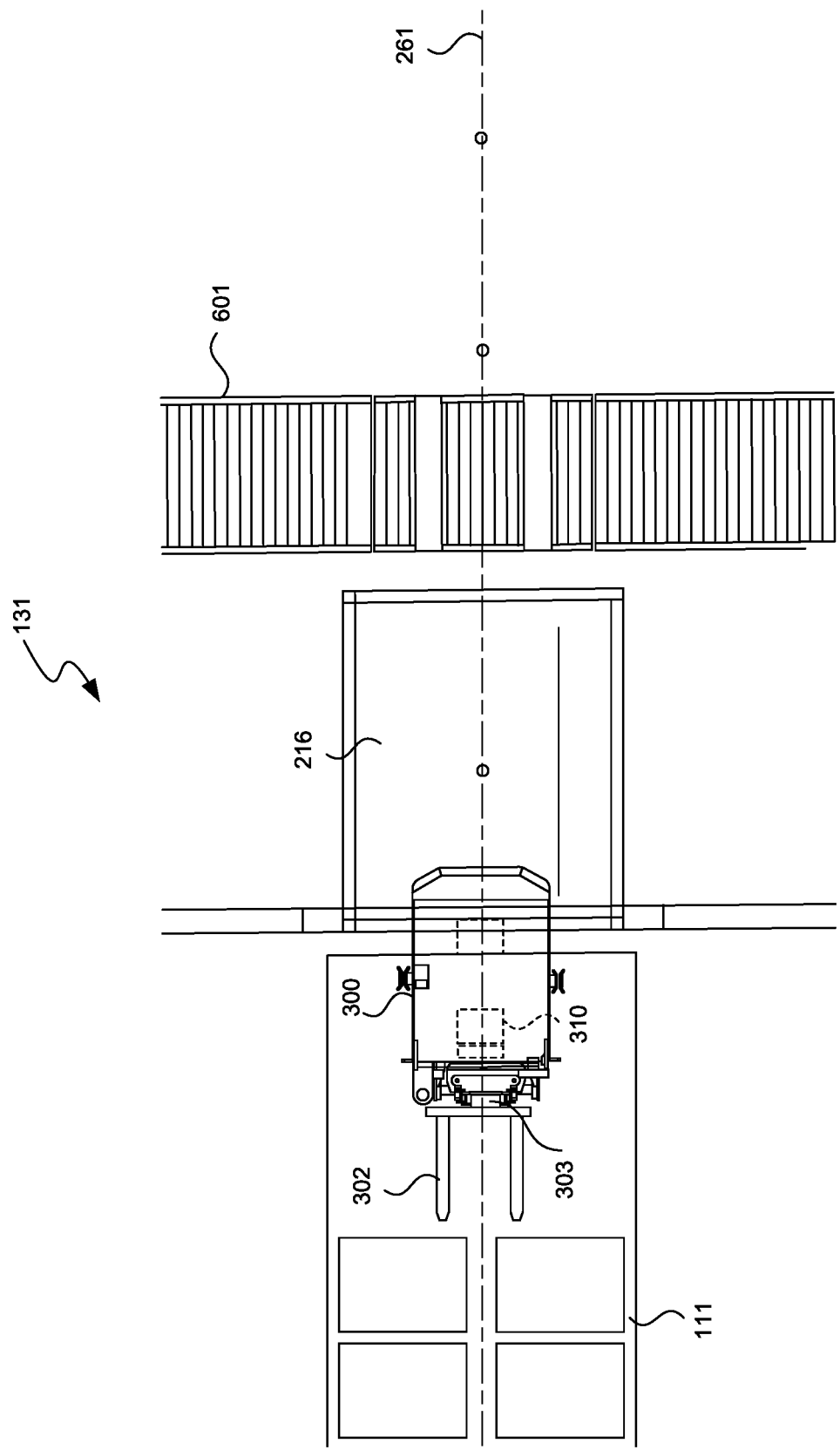

When the fork 302 is no longer supporting the pallet 605, the truck control system 310 and the workflow procedure can, at step 728, cause the drive system 322 of the AMT 300 to move the AMT 300 backward along the dock station centerline 261 a specified amount, e.g., an amount based on the length of the pallet 605 (plus a safety margin), allowing the fork 302 to clear the pallet 605 (as shown in FIG. 9I). The truck control system 310 and the workflow procedure can then, at steps 730 and 732, cause the fork boom 303 to move the height of the fork 302 to a reverse traveling height 826 (as shown in FIG. 8K) and to a center position (as shown in FIG. 9J). The reverse travelling height 826 can be a height which is above the height 602 allowing the fork 302 clear the pallet conveyor 601.

Figure 8L:
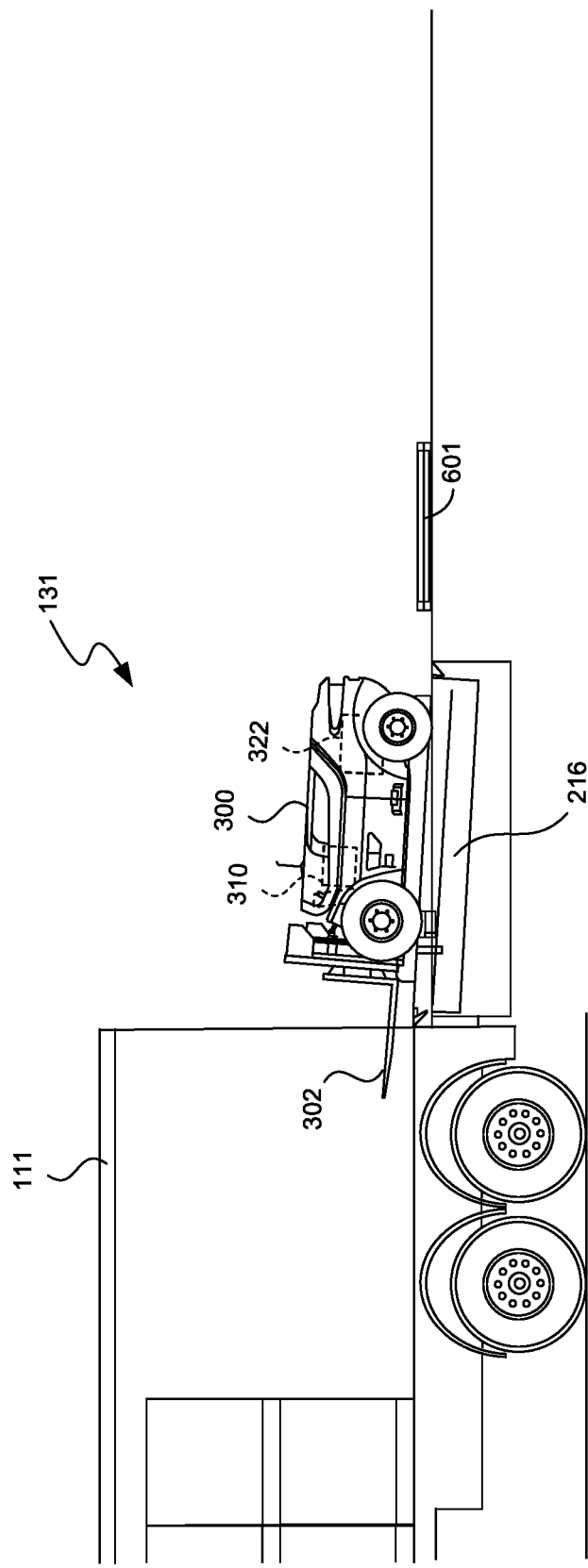
Figure 8M:
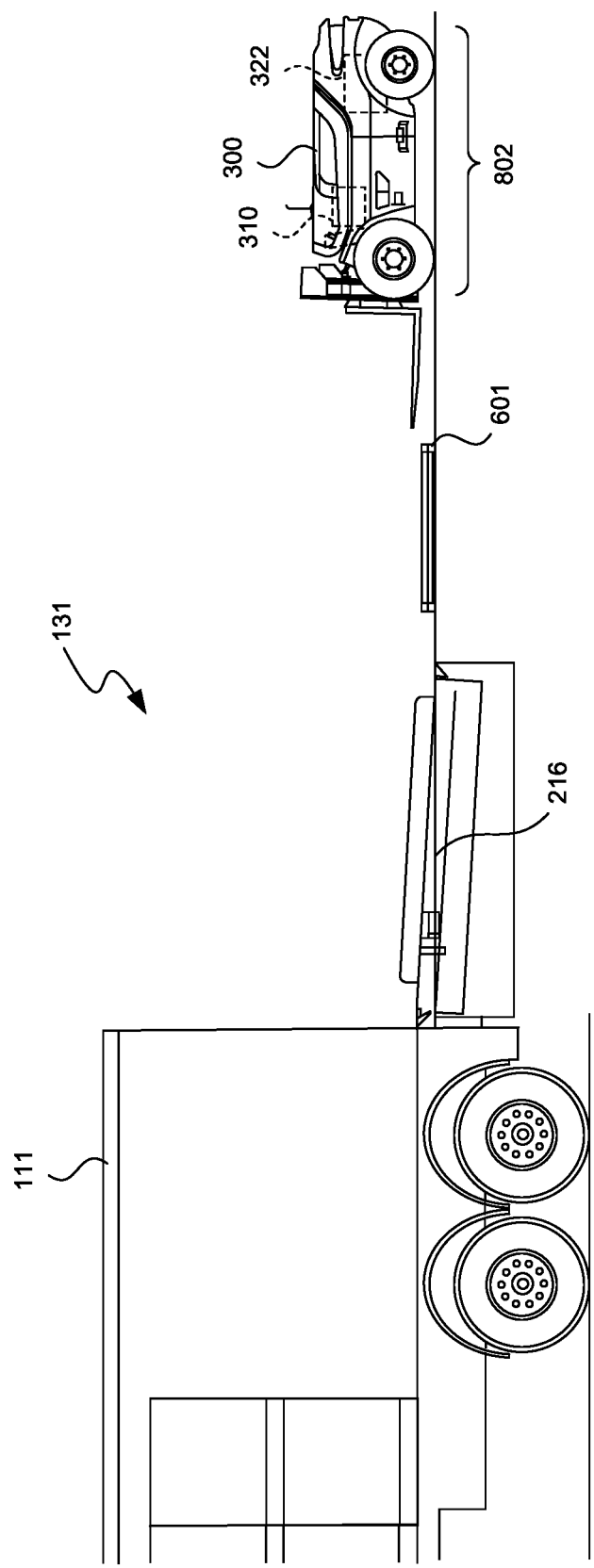
Figure 8N:
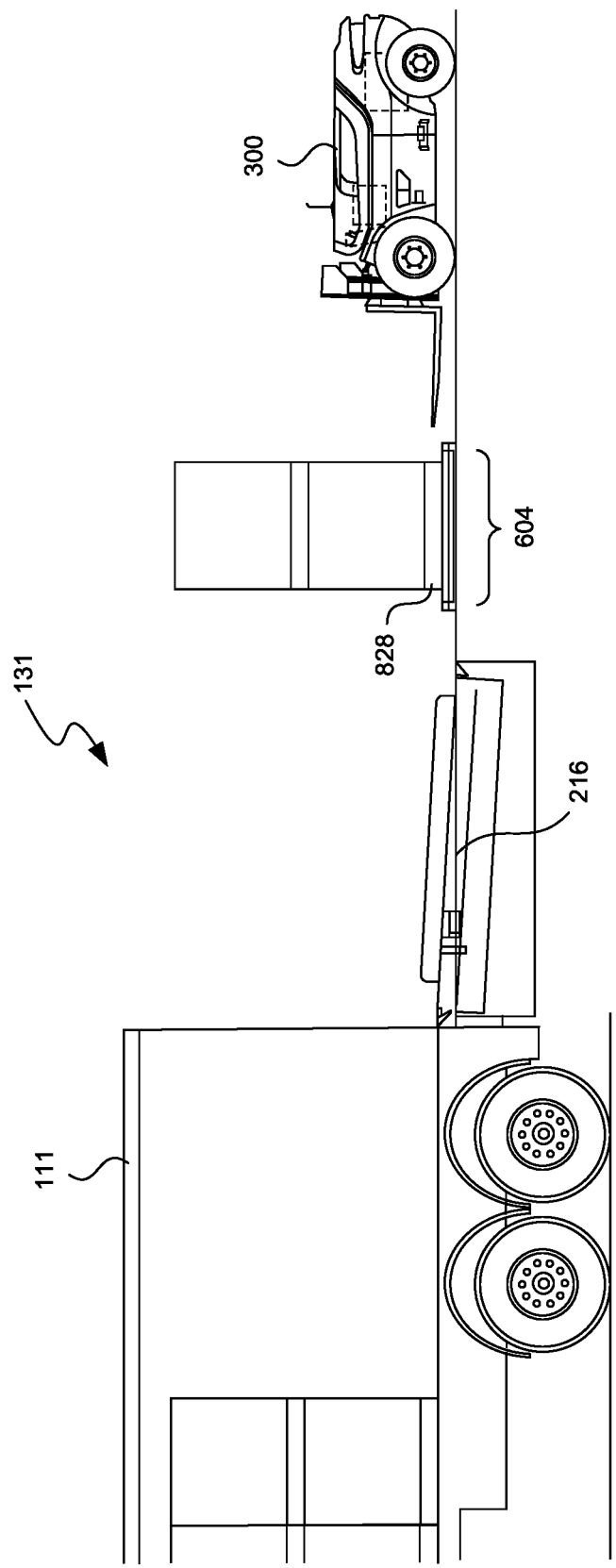
Figure 9K:
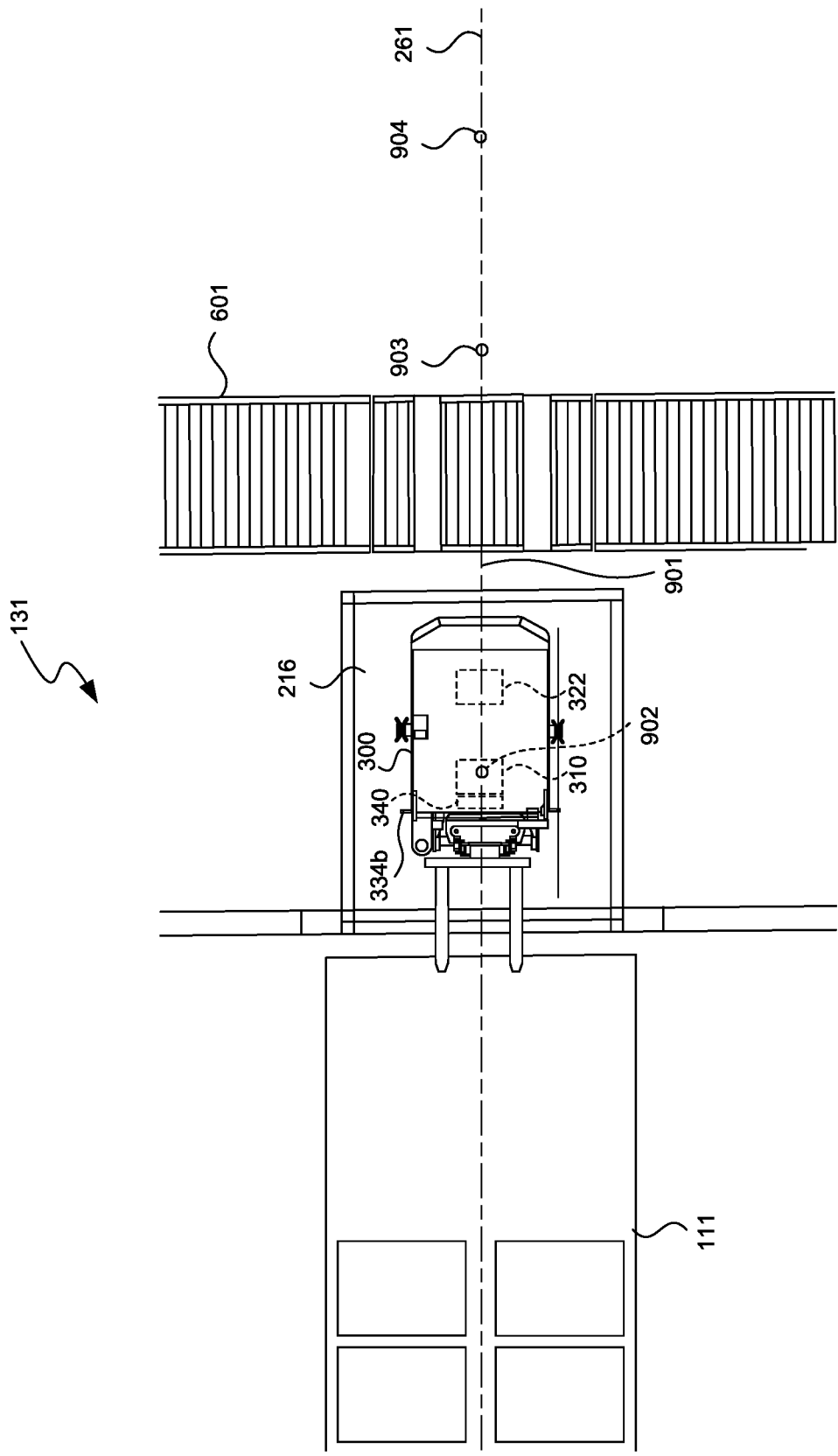
Figure 9L:
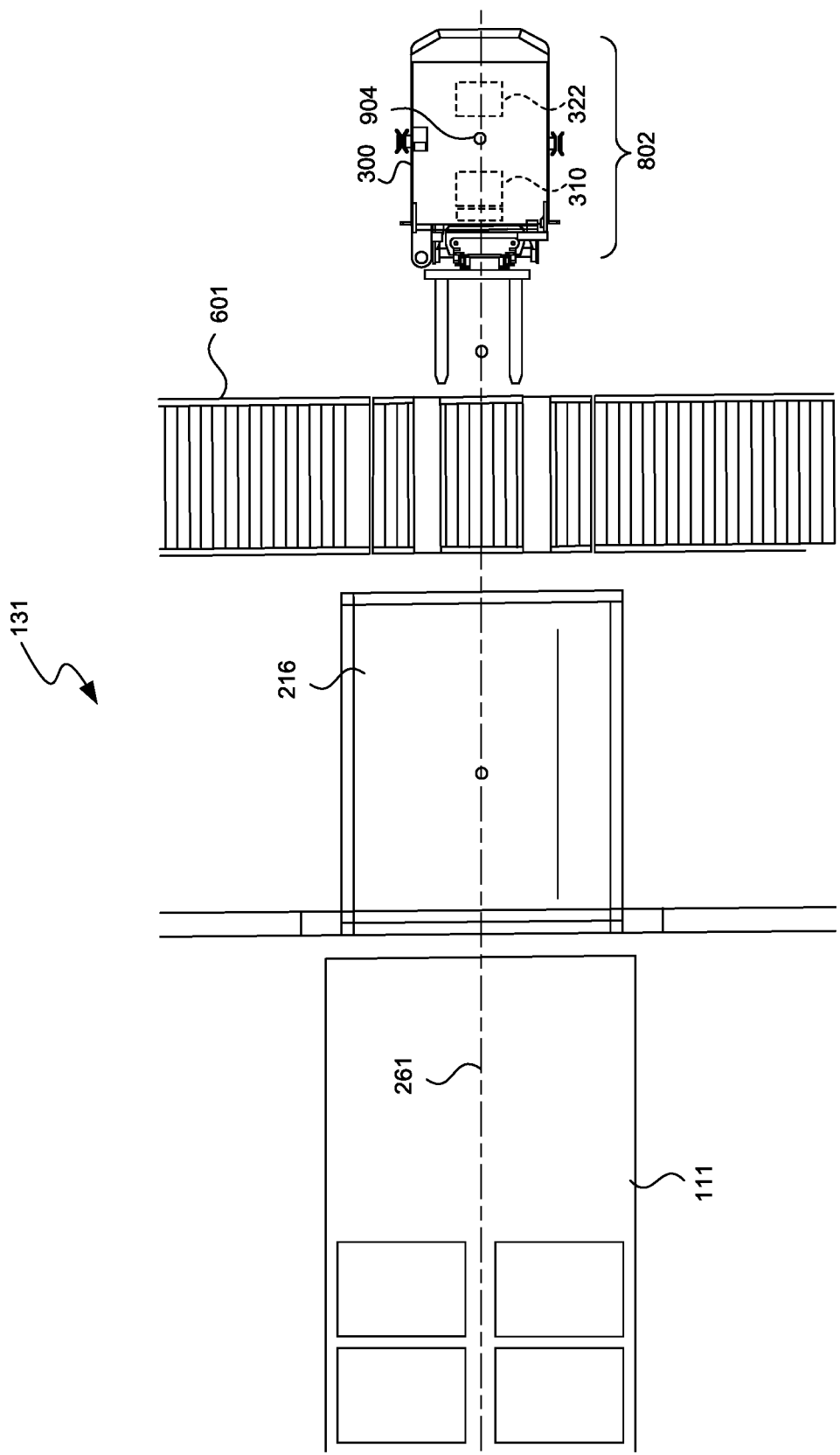

With the fork 302 repositioned for reverse travel, the truck control system 310 and the workflow procedure can, at step 734, cause the drive system 322 to move the AMT 300 backward along the dock station centerline 261. As indicated by line 733, as the AMT 300 exits the trailer 111 (as shown in FIGS. 8L and 9K), the truck control system 310 and the workflow procedure can cause the truck control system 310 to transition guidance of the AMT 300 from being based on the trailer guidance system (e.g., based on the sensors 330a and 330b), to being based on the facility guidance system (e.g., based on the fixed guidance elements 901-904). After the AMT 300 exits the trailer 111, the truck control system 310 and the workflow procedure can continue to cause the drive system 322 to further move the AMT 300 backward along the dock station centerline 261, using the fixed guidance elements 901-904, until the AMT 300 returns to the initial pallet pre-load position 802, as indicated by the fixed guidance element 904 (as shown in FIGS. 8M and 9L).

When the AMT 300 has crossed the pallet conveyor 601 toward the pre-load position 802, the pallet conveyor 601 can operate to move another pallet 828 to the pallet loading position 604 at step 736. When the next pallet 828 is in the pallet loading position 604 on the pallet conveyor 601 (as shown in FIG. 8N), the pallet conveyor 601 can turn off at step 738. The workflow procedure can then repeat, starting back at step 702. The truck control system 310 can repeat the workflow procedure until the trailer 111 is loaded or the central processing center 132 commands a stop. The control panel 250 can then initiate a disengagement sequence for the trailer 111 as follows: the dock leveler 216 operates and returns to its stored position, the dock door 246 closes, the vehicle restraint 242 disengages from the trailer 111, and the terminal tractor 112 or OTR tractor pulls the trailer 111 away from the dock station 131.

In some embodiments, instead of automatically loading the trailer 111, when the trailer 111 arrives at the dock station 131 it can already be loaded, and the AMT 300 can follow an unloading workflow procedure for automatically unloading the trailer 111. The unloading workflow procedure can generally be the reverse of the loading workflow procedure described in detail above in relation to FIGS. 7A-9L, with, for example, the following differences. The AMT 300 does not lift the pallet 605 off the pallet conveyor 601, but instead proceeds from the pre-load position 802 to the guidance switch position 812 where guidance of the AMT 300 switches from a facility guidance system based on, e.g., the fixed guidance elements 901-904 to a trailer guidance system based on, e.g., the sensors 330a and 330b and the sensor system 340 of the AMT 300. After the switch, the AMT 300 moves forward into the trailer 111. When the AMT 300 identifies an obstruction 814 (e.g., a loaded cargo pallet), the truck control system 310 controls the fork boom 303 to lower the fork 302 and align the fork 302 with the pallet divots. The truck control system 310 then controls the drive system 322 to move the AMT 300 forward so that the fork 302 engages the pallet. The truck control system 310 then controls the fork boom 303 to raise the fork 302 to the traveling height, lifting a pallet off a floor of the trailer 111.

If the obstruction 814 was only on one side of the dock station centerline 261, the truck control system 310 also controls the fork boom 303 to move the fork 302 to a laterally centered position. If the obstruction 814 was on both sides of the dock station centerline 261, the truck control system 310 controls the drive system 322 to move the AMT 300 backward so that the lifted pallet and the fork 302 clear the obstruction on the other side of the dock station centerline 261, at which point the truck control system 310 controls the fork boom 303 to move the fork 302 to the laterally centered position. The truck control system 310 then controls the drive system 322 to move the AMT 300 in reverse to the guidance switch position 812 to switch back from using the trailer guidance system to using the facility guidance system. The truck control system 310 then controls the drive system 322 to continue moving the AMT 300 in reverse until it reaches the lowering fork position 808, at which the truck control system 310 controls the fork boom 303 to raise the fork 302 so the loaded pallet is above the height 602. The truck control system 310 then controls the drive system 322 to move the AMT 300 in reverse until it reaches the loading position 804, at which the truck control system 310 controls the fork boom 303 to lower the fork 302 so that the loaded pallet is placed on the pallet conveyor 601 at the loading position 604. Finally, the truck control system 310 controls the drive system 322 to move the AMT 300 in reverse to disengage the pallet and return to the pre-load position 802.

Figure 10:
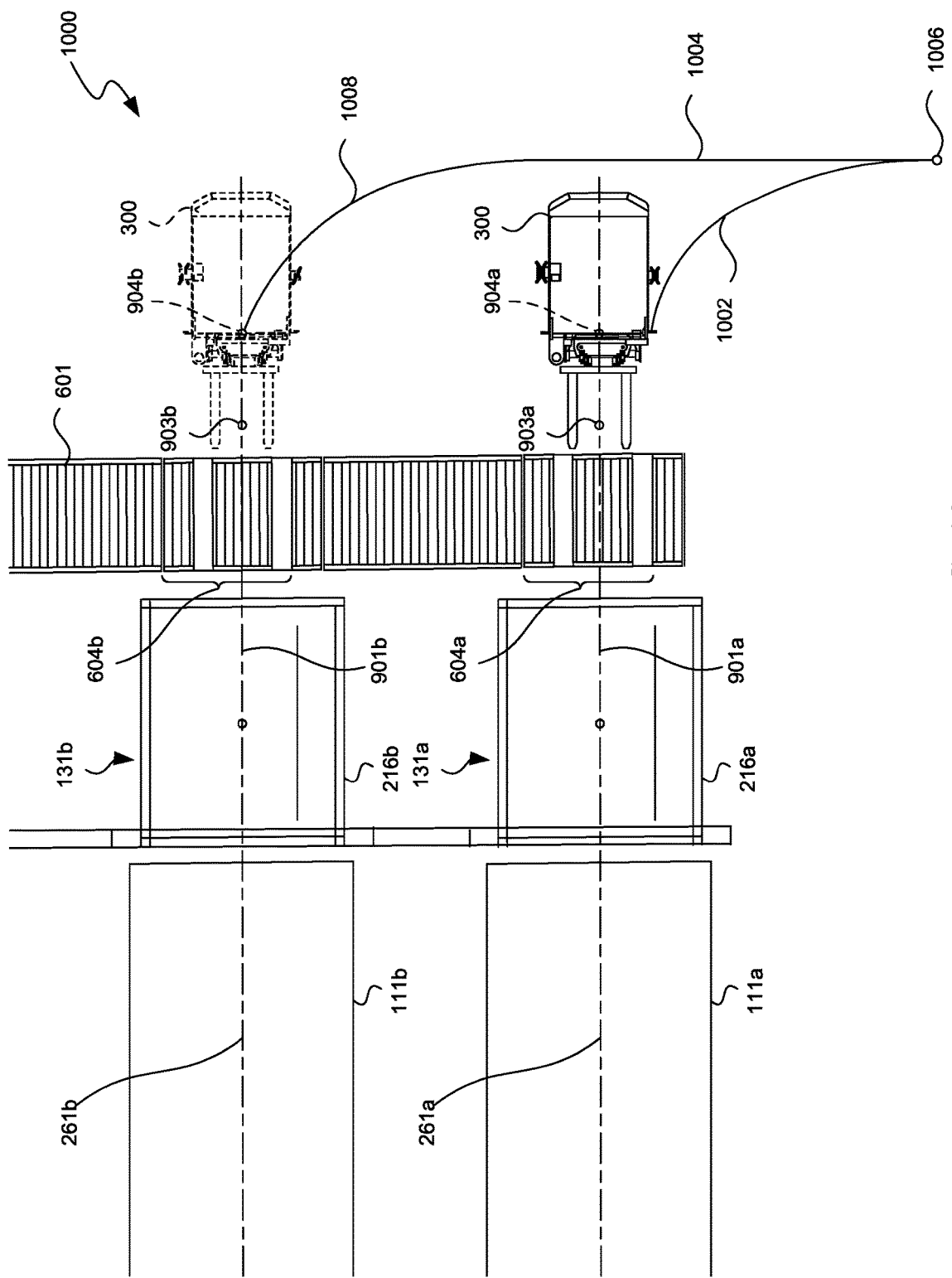
FIG. 10 is a partially schematic top view of two dock stations at which an AMT uses a facility guidance system to navigate between the dock stations, in accordance with some embodiments of the present technology.

FIG. 10 shows a partially schematic top view of an autonomous dock station system 1000 in which the AMT 300 uses a facility guidance system to navigate between multiple dock stations 131 (identified individually as a first dock station 131a and a second dock station 131b). The first dock station 131a includes a first dock leveler 216a that provides access to a first trailer 111a. The first dock station 131a is bisected by a first dock station centerline 261a, along which runs a first rail 901a of the facility guidance system. From an initial position specified by a first fixed guidance element 904a, the AMT 300 can follow the workflow procedures described above in reference to FIGS. 7A-9L to automatically load the first trailer 111a by lifting loaded pallets off the pallet conveyor 601 at a first pallet loading position 604a and moving them into the first trailer 111a.

The second dock station 131b includes a second dock leveler 216b that provides access to a second trailer 111b. The second dock station 131b is bisected by a second dock station centerline 261b, along which runs a second rail 901b of the facility guidance system. From an initial position specified by a second fixed guidance element 904b, the AMT 300 can follow the workflow procedures described above in reference to FIGS. 7A-9L to automatically load the second trailer 111b by lifting pallets off the pallet conveyor 601 at a second pallet loading position 604b and moving them into the second trailer 111b.

The facility guidance system of the autonomous dock station system 1000 can further include inter-station fixed guidance elements 1002-1008 for guiding the AMT 300 between the first dock station 131*a* and the second dock station 131*b*. In the illustrated embodiment, the inter-station fixed guidance element 1002 is a curved rail that connects the first fixed guidance element 904*a* to the fixed guidance element 1006. Like the first and second fixed guidance elements 904*a* and 904*b*, the inter-station fixed guidance element 1006 can be a sensor target. The inter-station fixed guidance element 1004 is a straight rail connecting the inter-station fixed guidance element 1006 to the inter-station fixed guidance element 1008, which is a curved rail that connects to the second fixed guidance element 904*b* at the second dock station 131*b*.

The AMT 300 can move between the first fixed guidance element 904*a* of the first dock station 131*a* and the second fixed guidance element 904*b* of the second dock station 131*b* by following the inter-station fixed guidance elements 1002-1008. For example, the AMT 300 can start at the first fixed guidance element 904*a* facing the first trailer 111*a*. The AMT 300 can then move in reverse following the curved rail of the inter-station fixed guidance element 1002 until it reaches the sensor target 1006. At that point, the AMT 300 can begin moving forward, following the rails of the inter-station fixed guidance elements 1004 and 1008, until the AMT 300 reaches the second fixed guidance element 904*b* of the second dock station 131*b*. The AMT 300 can reverse this process as needed to move from the second fixed guidance element 904*b* of the second dock station 131*b* to the first fixed guidance element 904*a* of the first dock station 131*a*. By moving between dock stations in the manner described above, the AMT 300 can follow workflow procedures to automatically load or unload multiple trailers at multiple dock stations. In other embodiments, other arrangements of fixed guidance elements (e.g., sensor targets and/or rails) can be used for AMT guidance between multiple dock stations in accordance with the present technology.

The central processing center 132 (FIG. 1), which controls delivering pallets to or from the various dock stations using the pallet conveyor 601, can signal to the AMT 300 which dock station to travel to for executing a current load or unload workflow procedure. Upon receiving such a signal, the AMT 300 can follow the inter-station fixed guidance elements 1002-1008 (e.g., following rails, moving between sensor targets, following visual indicators, etc.) to travel to the indicated dock station and perform the load or unload workflow procedure.

Figure 11:
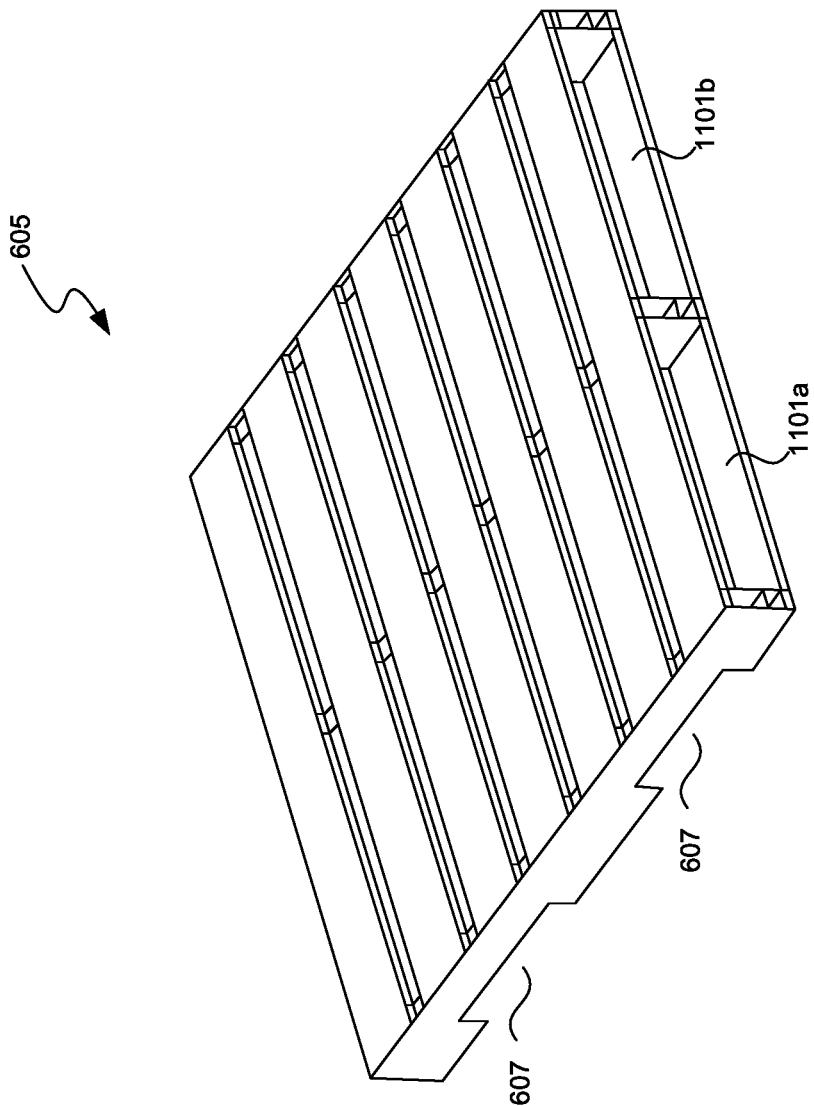
FIG. 11 is an isometric view of an example pallet which can be loaded for AMT transport, in accordance with some embodiments of the present technology.

FIG. 11 is an isometric view of the pallet 605 which can be loaded with cargo for the AMT 300 to transport in accordance with some embodiments of the present technology. The pallet 605 can be a conventional cargo pallet well known in the art and can include the divots 607 spaced apart by a distance corresponding to the distance 308 between the two tines 324*a* and 324*b* of the fork 302 (FIG. 3C) and sized such that the tines 324*a* and 324*b* of the fork 302 can fit through them and under the pallet 605 when the pallet 605 is resting on a surface. Thus, the fork 302 can engage the pallet 605 to lift it in a conventional manner well known in the art. In some embodiments, the length of pallet 605 can be the combination of lengths 1101*a* and 1101*b*, which combined can be shorter than length 309 of the fork 302.

Figure 12:
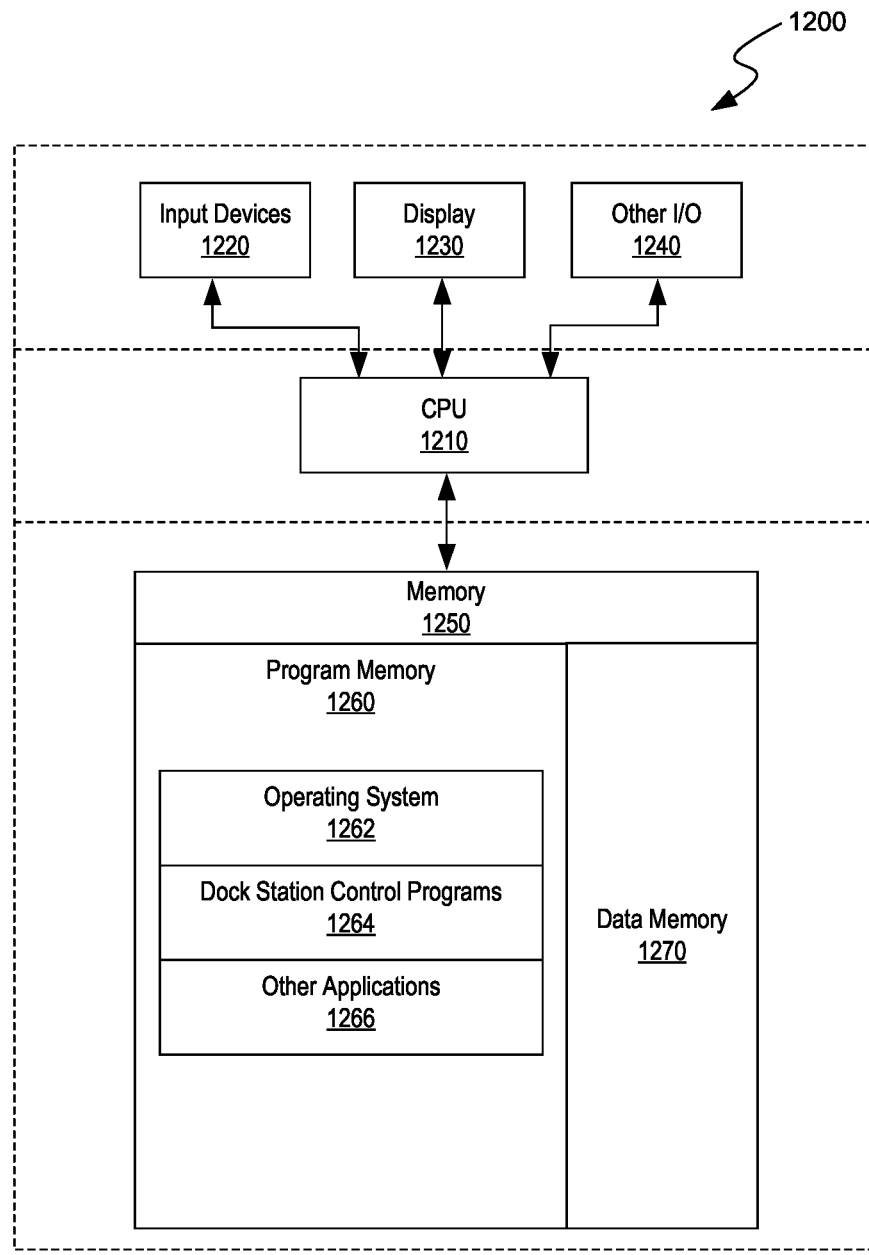
FIG. 12 is a block diagram illustrating an overview of an example processing device configured in accordance with some embodiments of the present technology.

FIG. 12 is a block diagram illustrating an overview of devices on which some embodiments of the disclosed technology can operate. The devices can comprise hardware components of a device 1200 that can operate in various parts of the autonomous dock station system. For example, various devices described above, such as the control panel 250, the central processing center 132, the truck control system 310 and others can include processing capabilities that can be implemented by including a version of the device 1200. While the device 1200 is described below as having components 1210-1270, some versions of the device 1200 can have more, fewer, or alternate components.

The device 1200 can include one or more input devices 1220 that provide input to the Processor(s) 1210 (e.g., CPU(s), GPU(s), HPU(s), etc.), notifying it of actions. The actions can be mediated by a hardware controller that interprets the signals received from the input device and communicates the information to the processors 1210 using a communication protocol. The input devices 1220 can include, for example, sensors, switches, steering controls, a mouse, a keyboard, a touchscreen, a touchpad, a wearable input device, a camera- or image-based input device, a microphone, or other user input devices.

The processors 1210 can be a single processing unit or multiple processing units in a device or distributed across multiple devices. The processors 1210 can be coupled to other hardware devices, for example, with the use of a bus, such as a PCI bus or SCSI bus. The processors 1210 can communicate with a hardware controller for devices. Some of the systems used in the autonomous dock station systems can include a display 1230, which can display text and graphics. In some embodiments, the display 1230 includes the input device as part of the display, such as when the input device is a touchscreen or is equipped with an eye direction monitoring system. In some embodiments, the display is separate from the input device. Examples of display devices are: an LCD display screen, an LED display screen, a projected, holographic, or augmented reality display (such as a heads-up display device or a head-mounted device), and so on. Other I/O devices 1240 can also be coupled to the processor, such as various types of sensors (e.g., pressure, LIDAR or other positioning sensors, heat, current, etc.) a network card, a video card, an audio card, a USB connection, a camera, a printer, speakers, various storage drives, etc.

In some embodiments, the device 1200 also includes a communication device capable of communicating wirelessly or wire-based with a network node. The communication device can communicate with another device or a server through a network using, for example, Bluetooth, WiFi, TCP/IP protocols, Zigbee or Z-Wave, etc. Device 1200 can utilize the communication device to distribute operations across multiple network devices.

The processors 1210 can have access to a memory 1250 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable memory, such as flash memory, hard drives, floppy disks, CDs, DVDs, magnetic storage devices, tape drives, and so forth. A memory is not a propagating signal divorced from underlying hardware; a memory is thus non-transitory. The memory 1250 can include program memory 160 that stores programs and software, such as an operating system 1262, dock station control programs 1264 (e.g., utilizing workflow procedures), and other application programs 1266. The memory 1250 can also include data memory 1270 storing data that can be provided to the program memory 1260 or any element of the device 1200.

FIG. 13 is a block diagram of a control system 1300 configured in accordance with an embodiment of the present technology. While the central processing center 132 is shown as being connected to the control panel 250, which is in turn connected to the truck control system 310, in various embodiments, any of these entities can be directly or indirectly networked to each other wirelessly and/or by various wired connections. For instance, building sensors 1308 (e.g., one or more of the active fixed guidance elements described above) may be in direct communication with equipment at the dock stations 131. In addition, in various embodiments, one or more of the depicted entities can be excluded and/or replaced with other elements. The connections between any of the central processing center 132, the AMT 300, the control panel 250, or various other depicted elements can include one or more of a local area network (LAN), a wide area network (WAN), or other wired or wireless networks. These networks may include the Internet or some other public or private network. The networks can include a wireless network, e.g., using WiFi, cellular, mesh networks (e.g., Zigbee, Z-Wave, Bluetooth, Thread), etc. The network (s) can be implemented using various standards such as IEEE 802.15.4 (e.g., Zigbee or Thread), IEEE 802.11x (e.g., wireless Lan, WiFi Beacons, Bluetooth SIG, BTLE, Bluetooth Beacons, Bluetooth Mesh), cellular network technologies, IEEE 802.16, etc.

The central processing center 132 can include one or more servers which receive requests and coordinate fulfillment of those requests. Though the central processing center 132 and other entities are depicted logically as a single element, the central processing center 132 can be a distributed computing environment encompassing multiple computing devices located at the same or at geographically disparate physical locations. The central processing center 132 can include one or more processors 1301, a program memory 1302, and a storage memory 1303.

The central processing center 132 can receive dock station status data from the control panel 250, the dock station components, and/or other entities. The central processing center 132 can receive AMT status data from the AMT 300 directly or via an intermediary, such as the control panel 250 and/or other entities. The processor 1301 can receive information from a facility ERP system 1306, the material handling systems 1307, dock stations 131, building sensors 1308, and truck control system 310, as well as from control functions 1305 and input/output actions 1304. The processor 1301 can also execute programs for controlling the AMT 300. For example, the central processing center 132 can provide workflow procedure instructions to the AMT 300, can instruct the AMT 300 to travel to particular dock stations using the facility guidance system, and/or can coordinate pallet delivery to or from the dock station via the pallet conveyor 601. The central processing center 132 can be operatively connected to multiple systems including but not limited to: the facility ERP system 1306, associated material handling systems 1307 (e.g., a yard management system, an interior vehicle autonomous management system, an inbound/outboard freight system, etc.), the dock stations 131, and the building sensors 1308 (which can include some or all of the fixed guidance elements of the facility guidance system). The building sensors 1308 may be connected through the individual dock station control panels 250, or they may be directly connected to the central processing center 132.

The control panel 250 can include one or more processors 1321, a program memory 1322, and a storage memory 1323. In some embodiments, the control panel 250 can facilitate communications between the AMT 300 and other entities such as the central processing system 132 and/or can execute the logic for a workflow procedure and provide corresponding instructions to the AMT 300. As described above, the control panel 250 can also control, either automatically or in response to dock operator input, other dock station equipment such as the dock leveler 216, the barrier gate 226, the door 246, the vehicle restraint 242, etc.

The truck control system 310 includes one or more processors 1331, a program memory 1332, and a storage memory 1333. The truck control system 310 can be operatively connected to various systems, including truck movement systems 1310, truck sensors 1320, and/or truck interface systems 1330. Truck movement systems 1310 can include, e.g., one or more of steering controls, power controls, throttle controls, boom controls, and/or braking controls. Truck sensors 1320 can include, e.g., one or more of a wheel rotation sensor system, a steering wheel angle sensor system, an engine torque monitor, a truck status monitoring system (e.g., a system for monitoring conditions of the AMT 300, such as a charge or fuel level, velocity, position, workflow step, etc.), a first truck alignment system (including, e.g., the fixed guidance sensor 326 (FIG. 3B) interfacing with the facility guidance system), a second truck alignment system (including, e.g., the side sensors 330*a* (FIG. 3E) interfacing with the trailer guidance system), and a forward-looking sensor system (including, e.g., the forward sensors 330*b* (FIG. 3E)). The truck interface systems 1330 can include a communication system, a sensor system, and a safety system.

Reference in this specification to "embodiments" (e.g., "some embodiments," "various embodiments," "one embodiment," "an embodiment," etc.) means that a particular feature, structure, or characteristic described in connection with the embodiment is included in at least one embodiment of the disclosure. The appearances of these phrases in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and embodiments have been described herein for purposes of illustration, but various modifications can be made without deviating from the scope of the embodiments and embodiments. The specific features and acts described above are disclosed as example forms of implementing the claims that follow. Accordingly, the embodiments and embodiments are not limited except as by the appended claims.

Any patents, patent applications, and other references noted above are incorporated herein by reference. Aspects can be modified, if necessary, to employ the systems, functions, and concepts of the various references described above to provide yet further embodiments. If statements or subject matter in a document incorporated by reference conflicts with statements or subject matter of this application, then this application shall control.

The components and steps illustrated in the Figures may be altered in a variety of ways. For example, the order of the logic may be rearranged, substeps may be performed in parallel, illustrated logic may be omitted, other logic may be included, etc. In some embodiments, one or more of the components described above can execute one or more of the described processes.

We claim:

1. A charging system for an automated material lift truck (AMT) at a loading dock station, the charging system comprising:
   a charging connection mounted to the AMT and electrically connected to an onboard power supply of the AMT, wherein the charging connection comprises a connection plate and a guide plate positioned in opposing relation to the connection plate, the connection plate and the guide plate defining a space therebetween, and wherein the connection plate is resiliently movable relative to the guide plate;
   a dock leveler configured to operably extend into a trailer positioned at the loading dock station, the dock leveler including—
      a deck portion; and
      at least one AMT charging rail extending from the deck portion and configured to contact the connection plate to electrically connect the power supply of the AMT to the AMT charging rail,
   wherein the AMT is configured to automatically connect the charging connection to the AMT charging rail when the AMT moves across the dock leveler.

2. The charging system of claim 1, wherein the AMT charging rail is configured to be operably received within the space and slidably contact the connection plate.

3. The charging system of claim 1, wherein the guide plate further comprises a first angled portion at a first end portion thereof and a second angled portion at a second end portion thereof, wherein each of the first and second angled portions of the guide plate extend outwardly from the space.

4. A charging system for an automated material lift truck (AMT) at a loading dock station, the charging system comprising:
   a charging connection mounted to the AMT and electrically connected to an onboard power supply of the AMT, wherein the charging connection comprises a connection plate and a biasing member resiliently coupling the connection plate to the AMT;
   a dock leveler configured to operably extend into a trailer positioned at the loading dock station, the dock leveler including—
      a deck portion; and
      at least one AMT charging rail extending from the deck portion and configured to contact the connection plate to electrically connect the power supply of the AMT to the AMT charging rail,
   wherein the biasing member is configured to bias the connection plate against the AMT charging rail as the AMT moves across the dock leveler to automatically connect the charging connection to the AMT charging rail.

5. The charging system of claim 4, wherein the charging connection further comprises an arm member extending from the AMT, and wherein the connection plate is resiliently coupled to the arm member by the biasing member.

6. The charging system of claim 5, wherein the arm member has a distal end portion, wherein the biasing member is operably coupled to the distal end portion and extends between the distal end portion and the connection plate.

7. The charging system of claim 6, wherein the connection plate further comprises a first angled portion at a first end portion thereof and a second angled portion at a second end portion thereof, wherein each of the first and second angled portions of the connection plate extend outwardly relative to the first and second angled portions of the guide plate.

8. The charging system of claim 5, wherein the charging connection is a first charging connection operably mounted to a first side portion of the AMT, the guide plate is a first guide plate, the connection plate is a first connection plate, and the at least one AMT charging rail is a first AMT charging rail, and wherein the charging system further comprises:
   a second charging connection operably mounted to a second side portion of the AMT opposite the first side portion and electrically connected to the onboard power supply of the AMT, the second charging connection including—
      a second guide plate; and
      a second connection plate positioned in opposing relation to and resiliently coupled to the second guide plate, the second connection plate and the second guide plate defining a space therebetween; and
   a second AMT charging rail extending from the deck portion and configured to be operably received within the space between the second connection plate and the second guide plate and contact the second connection plate to electrically connect the AMT power supply to the second AMT charging rail.

9. The charging system of claim 8, wherein the biasing member is a first biasing member and the arm member is a first arm member, and wherein the second charging connection further comprises:
   a second arm member extending from the AMT, the second arm member having a distal end portion; and
   a second biasing member operably coupled to the distal end portion of the second arm member, the second biasing member extending between the distal end portion of the second arm member and the second connection plate, wherein the second biasing member is configured to bias the second connection plate toward the second guide plate and against the second AMT charging rail as the AMT moves across the dock leveler.

10. The charging system of claim 8, wherein the first AMT charging rail provides a cathode connection for charging the power supply of the AMT, and wherein the second AMT charging rail provides an anode connection for charging the power supply of the AMT.

11. The charging system of claim 8, wherein the first and second AMT charging rails are spaced apart on the deck portion at a distance greater than the distance between the first guide plate and the second guide plate.

12. The charging system of claim 4, wherein the charging connection further comprises a guide plate fixedly mounted to the AMT and positioned in opposing relation to the connection plate, wherein the connection plate and the guide plate define a space therebetween, and wherein the biasing member resiliently couples the connection plate to the guide plate.

13. The charging system of claim 12, wherein the AMT charging rail is configured to be operably received within the space and slidably contact the connection plate.

14. A charging system for an automated material lift truck (AMT) at a loading dock station, the charging system comprising:
   a first charging connection operably mounted to a first side portion of the AMT and electrically connected to an onboard power supply of the AMT, the first charging connection having a first connection plate;
   a second charging connection operably mounted to a second side portion of the AMT opposite the first side portion and electrically coupled to the power supply of the AMT, the second charging connection having a second connection plate; and
   a dock leveler configured to operably extend into a trailer positioned at the loading dock station, the dock leveler including—
      a deck portion;
      a first AMT charging rail extending from the deck portion and configured to contact the first connection plate to electrically connect the power supply of the AMT to the first AMT charging rail; and
      a second AMT charging rail extending from the deck portion and configured to contact the second connection plate to electrically connect the power supply of the AMT to the second AMT charging rail,
   wherein the AMT is configured to automatically connect the first charging connection to the first AMT charging rail and/or second charging connection to the second AMT charging rail when the AMT moves across the dock leveler.

15. A charging system for an automated material lift truck (AMT) at a loading dock station, comprising:
   a first charging connection electrically connected to a power supply of the AMT, the first charging connection including—
      a first guide plate coupled to a first side of the AMT; and
      a first connection plate resiliently positioned in opposing relation [the connection plated does not have to be resiliently coupled to the guide plate] to the first guide plate, the first connection plate and the first guide plate defining a first space therebetween;
   a second charging connection electrically coupled to a power supply of the AMT, the second charging connection including—
      a second guide plate coupled to a second side of the AMT opposite the first side; and
      a second connection plate resiliently positioned in opposing relation to the second guide plate, the second connection plate and the second guide plate defining a second space therebetween; and
   a dock leveler including a deck portion having—
      a first AMT charging rail extending upwardly from the deck and providing a cathode connection for charging the power supply, the first AMT charging rail configured to be received within the first space and contact the first connection plate to electrically connect the first AMT charging rail to the AMT power supply, and
      a second AMT charging rail extending upwardly from the deck and providing an anode connection for charging the power supply, the second AMT charging rail configured to be received within the second space and contact the second connection plate to electrically connect the second AMT charging rail to the AMT power supply.

16. The charging system of claim 15, wherein the AMT is configured to automatically connect to the first and second charging connections to the first and second AMT charging rails, respectively, when the AMT moves across the dock leveler.

17. The charging system of claim 15, wherein:
   the first charging connection further comprises—
      a first arm member extending from the AMT, the first arm member having a distal end portion, and
      a first biasing member operably coupled to the distal end portion of the first arm member, the first biasing member extending between the distal end portion of the first arm member and the first connection plate,
   the second charging connection further comprises—
      a second arm member extending from the AMT, the second arm member having a distal end portion, and
      a second biasing member operably coupled to the distal end portion of the second arm member, the second biasing member extending between the distal end portion of the second arm member and the second connection plate,
   the first biasing member is configured to bias the first connection plate toward the first guide plate and against the first AMT charging rail as the AMT moves across the dock leveler, and
   the second biasing member is configured to bias the second connection plate toward the second guide plate and against the second AMT charging rail as the AMT moves across the dock leveler.

18. The charging system of claim 15, wherein the first and second guide plates each further comprise a first angled portion at first end portions thereof and a second angled portion at second end portions thereof, wherein each of the first and second angled portions of the first and second guide plate extend outwardly from the first and second space, respectively.

19. The charging system of claim 18, wherein the first and second connection plates each further comprise a first angled portion at first end portions thereof and a second angled portion at second end portions thereof, wherein each of the first and second angled portions of the first and second connection plate extend outwardly relative to the first and second angled portions of the first and second guide plates, respectively.

20. The charging system of claim 15, wherein the first and second AMT charging rails are spaced apart on the deck portion at a distance greater than the distance between the first guide plate and the second guide plate.

\* \* \* \* \*